(12) United States Patent
Iwaki et al.

(10) Patent No.: US 11,216,057 B2
(45) Date of Patent: Jan. 4, 2022

(54) DISPLAY DEVICE, ELECTRONIC DEVICE, AND OPERATION METHOD THEREOF

(71) Applicant: Semiconductor Energy Laboratory Co., Ltd., Atsugi (JP)

(72) Inventors: Yuji Iwaki, Kanagawa (JP); Shunpei Yamazaki, Tokyo (JP)

(73) Assignee: Semiconductor Energy Laboratory Co., Ltd., Atsugi (JP)

(*) Notice: Subject to any disclaimer, the term of this patent is extended or adjusted under 35 U.S.C. 154(b) by 0 days.

(21) Appl. No.: 16/845,140

(22) Filed: Apr. 10, 2020

(65) Prior Publication Data
US 2020/0241624 A1 Jul. 30, 2020

Related U.S. Application Data

(62) Division of application No. 15/784,533, filed on Oct. 16, 2017, now Pat. No. 10,620,689.

(30) Foreign Application Priority Data

Oct. 21, 2016 (JP) .................................. 2016-206479

(51) Int. Cl.
*G06F 1/3234* (2019.01)
*G02F 1/1343* (2006.01)
(Continued)

(52) U.S. Cl.
CPC .......... *G06F 1/3262* (2013.01); *G02F 1/1343* (2013.01); *G02F 1/13338* (2013.01);
(Continued)

(58) Field of Classification Search
CPC .. G06F 1/3262; G06F 3/04166; G06F 3/0445; G06F 3/0446; G06F 3/0443;
(Continued)

(56) References Cited

U.S. PATENT DOCUMENTS 6,714,268 B2 3/2004 Wang et al.
7,038,641 B2 5/2006 Hirota et al.
(Continued)

FOREIGN PATENT DOCUMENTS

EP 1798630 A 6/2007
EP 2787500 A 10/2014
(Continued)

OTHER PUBLICATIONS

Lee.J et al., "High ambient-contrast-ratio display using tandem reflective liquid crystal display and organic light-emitting device", Optics Express, Nov. 14, 2005, vol. 13, No. 23, pp. 9431-9438.
(Continued)

*Primary Examiner* — William D Titcomb
(74) *Attorney, Agent, or Firm* — Fish & Richardson P.C.

(57) ABSTRACT

A method for operating an electronic device with lower power consumption is provided. The electronic device includes a display device and a touch sensor. In the case where the touch sensor senses no touch, the touch sensor is brought into a resting state or operated so as to perform a sensing operation at a reduced drive frequency. Also in the case where the touch sensor constantly senses touches and an image on the display device is not changed, the touch sensor is brought into the resting state or operated so as to perform the sensing operation at a reduced drive frequency.

9 Claims, 28 Drawing Sheets

(51) Int. Cl.
    *G02F 1/1333* (2006.01)
    *G06F 3/045* (2006.01)
    *G06F 3/041* (2006.01)
    *G06F 3/044* (2006.01)
    *G06F 3/0488* (2013.01)

(52) U.S. Cl.
    CPC ............ *G06F 3/045* (2013.01); *G06F 3/0412* (2013.01); *G06F 3/0443* (2019.05); *G06F 3/0445* (2019.05); *G06F 3/0446* (2019.05); *G06F 3/0488* (2013.01); *G06F 3/04166* (2019.05)

(58) Field of Classification Search
    CPC ...... G06F 3/0412; G06F 3/045; G06F 3/0488; G02F 1/343
    USPC .......................................................... 715/863
    See application file for complete search history.

(56) References Cited

U.S. PATENT DOCUMENTS

| | | | |
|---|---|---|---|
| 7,084,936 B2 | 8/2006 | Kato | |
| 7,102,704 B2 | 9/2006 | Mitsui et al. | |
| 7,176,991 B2 | 2/2007 | Mitsui et al. | |
| 7,239,361 B2 | 7/2007 | Kato | |
| 7,248,235 B2 | 7/2007 | Fujii et al. | |
| 7,385,654 B2 | 6/2008 | Mitsui et al. | |
| 8,300,005 B2 | 10/2012 | Tateuchi et al. | |
| 8,605,059 B2 | 12/2013 | Kurokawa et al. | |
| 8,823,893 B2* | 9/2014 | Yamazaki | H01L 27/1225 349/43 |
| 8,860,687 B2 | 10/2014 | Mizuhashi et al. | |
| 9,030,427 B2 | 5/2015 | Yasumatsu | |
| 9,099,042 B2 | 8/2015 | Sugiyama et al. | |
| 9,182,843 B2 | 11/2015 | Munechika | |
| 9,218,081 B2 | 12/2015 | Yamazaki et al. | |
| 9,244,323 B2 | 1/2016 | Yamazaki | |
| 9,620,525 B2 | 4/2017 | Yamazaki | |
| 9,626,889 B2* | 4/2017 | Iwaki | G09G 3/20 |
| 9,778,725 B2 | 10/2017 | Kuroiwa et al. | |
| 9,823,837 B2 | 11/2017 | Yokoyama et al. | |
| 9,847,380 B2 | 12/2017 | Yamazaki et al. | |
| 10,121,053 B2* | 11/2018 | He | G06K 9/00087 |
| 10,521,575 B2* | 12/2019 | Baek | G06F 1/3265 |
| 2003/0107688 A1 | 6/2003 | Yamagishi | |
| 2003/0201960 A1 | 10/2003 | Fujieda | |
| 2006/0072047 A1 | 4/2006 | Sekiguchi | |
| 2007/0075935 A1* | 4/2007 | Mesmer | G09G 3/3233 345/76 |
| 2008/0180618 A1 | 7/2008 | Fujieda | |
| 2010/0171905 A1 | 7/2010 | Huang et al. | |
| 2011/0037725 A1* | 2/2011 | Pryor | G01C 21/3664 345/174 |
| 2011/0149185 A1* | 6/2011 | Yamazaki | H01L 29/78609 349/39 |
| 2011/0216043 A1 | 9/2011 | Tamura et al. | |
| 2015/0020033 A1 | 1/2015 | Newham et al. | |
| 2015/0035777 A1* | 2/2015 | Hirakata | G06F 3/0412 345/173 |
| 2015/0077429 A1 | 3/2015 | Eguchi et al. | |
| 2015/0144920 A1 | 5/2015 | Yamazaki et al. | |
| 2015/0261259 A1* | 9/2015 | Endo | G02F 1/13338 361/679.06 |
| 2015/0261340 A1* | 9/2015 | Krah | G06F 3/0446 345/174 |
| 2015/0301636 A1* | 10/2015 | Akimoto | G06F 3/04184 345/173 |
| 2016/0019019 A1* | 1/2016 | Ikeda | G06F 3/0412 345/173 |
| 2016/0054607 A1* | 2/2016 | Ishizaki | G02F 1/13338 349/12 |
| 2016/0117033 A1 | 4/2016 | Yamazaki et al. | |
| 2016/0147401 A1 | 5/2016 | Cha | |
| 2016/0259459 A1* | 9/2016 | Yang | G06F 21/00 |
| 2016/0260086 A1* | 9/2016 | Cho | G06Q 20/322 |
| 2016/0349557 A1 | 12/2016 | Shishido et al. | |
| 2017/0039977 A1 | 2/2017 | Yamazaki | |
| 2017/0040553 A1* | 2/2017 | Watabe | H01L 51/5004 |
| 2017/0220182 A1* | 8/2017 | Schwartz | G06F 3/04164 |
| 2017/0220188 A1 | 8/2017 | Iwaki | |
| 2018/0004343 A1* | 1/2018 | Shin | G06F 3/0412 |
| 2018/0097040 A1 | 4/2018 | Yamazaki et al. | |
| 2018/0113501 A1* | 4/2018 | Iwaki | G06F 3/0488 |
| 2018/0113547 A1* | 4/2018 | Miyake | G06F 3/0446 |

FOREIGN PATENT DOCUMENTS

| | | |
|---|---|---|
| JP | 2001-066593 A | 3/2001 |
| JP | 2002-196702 A | 7/2002 |
| JP | 2004-296162 A | 10/2004 |
| JP | 2007-163891 A | 6/2007 |
| JP | 2007-232882 A | 9/2007 |
| JP | 2008-225381 A | 9/2008 |
| JP | 2011-048196 A | 3/2011 |
| JP | 2011-237696 A | 11/2011 |
| JP | 2013-120319 A | 6/2013 |
| JP | 2013-221965 A | 10/2013 |
| JP | 2014-106865 A | 6/2014 |
| JP | 2014-211850 A | 11/2014 |
| JP | 2015-121567 A | 7/2015 |
| JP | 2015-127951 A | 7/2015 |
| WO | WO-2007/041150 | 4/2007 |
| WO | WO-2010/098199 | 9/2010 |
| WO | WO-2011/062085 | 5/2011 |
| WO | WO-2013/080444 | 6/2013 |

OTHER PUBLICATIONS

Shieh.H, "Transflective display by Hybrid OLED and LCD", LEOS 2005 (IEEE Lasers and Electro-Optics Society Annual Meeting), Oct. 22, 2005, pp. 650-651, IEEE.

* cited by examiner

100

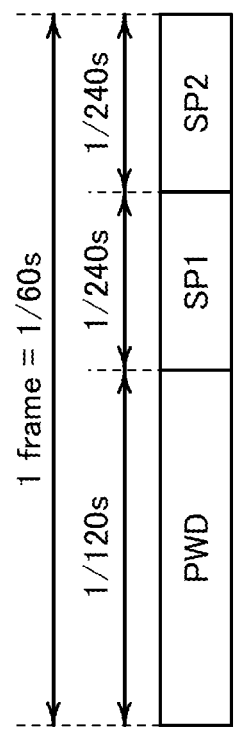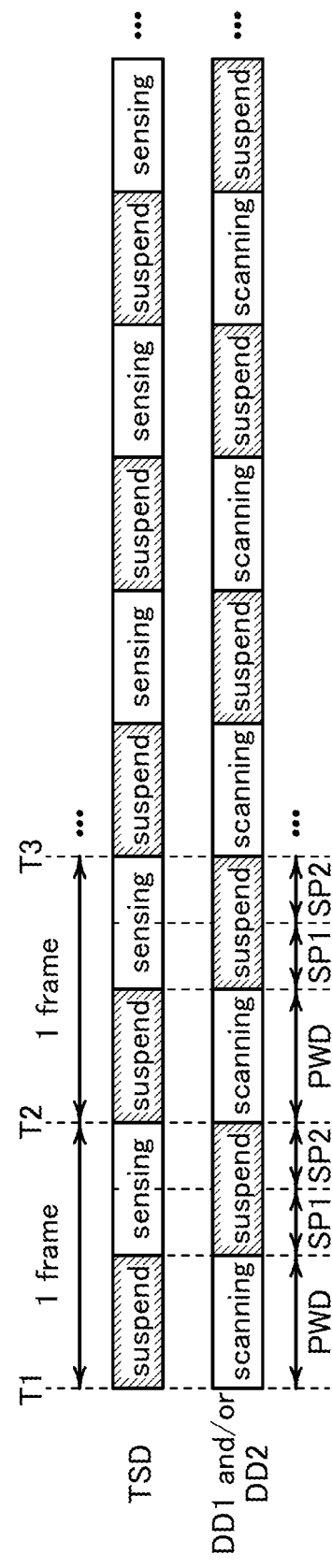

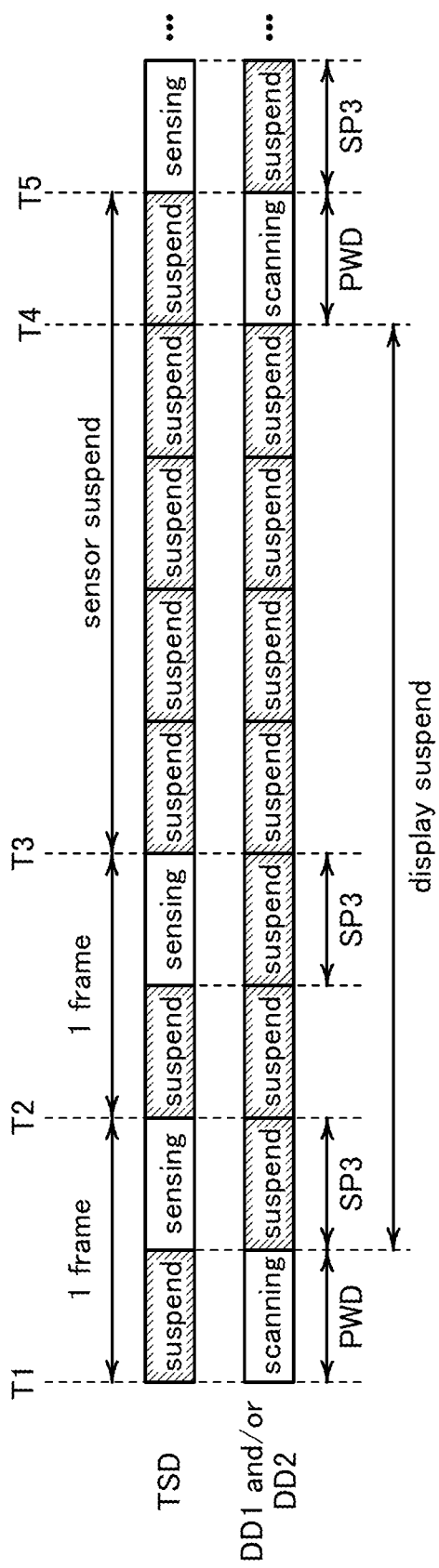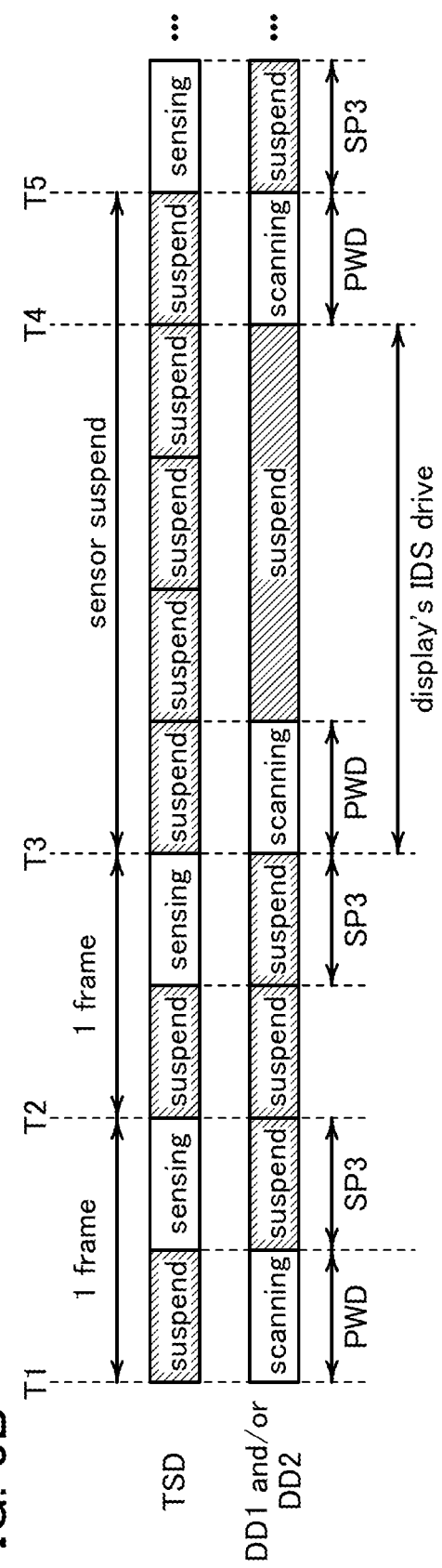

101

102

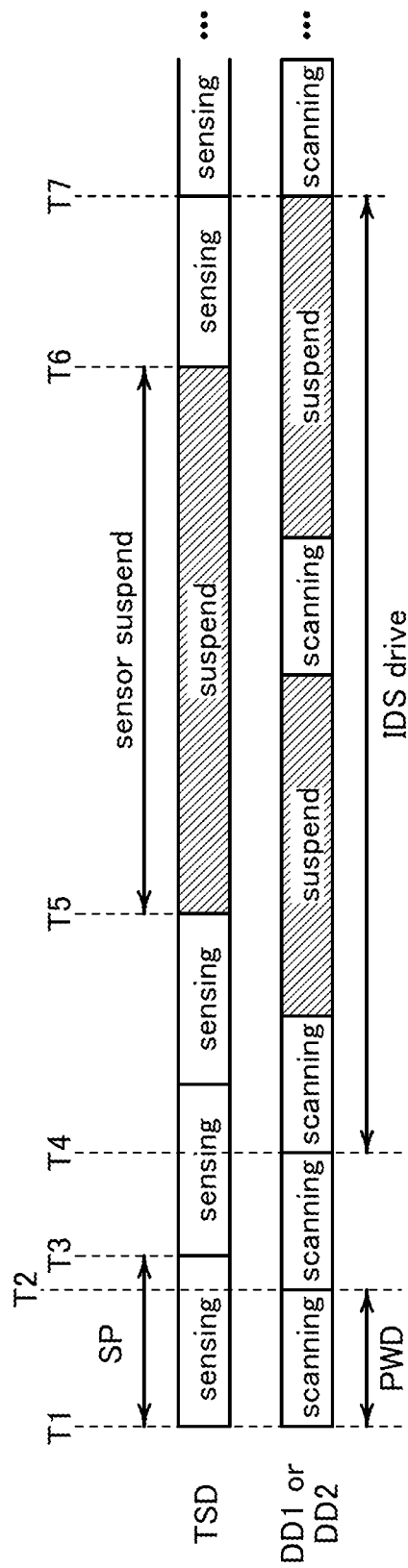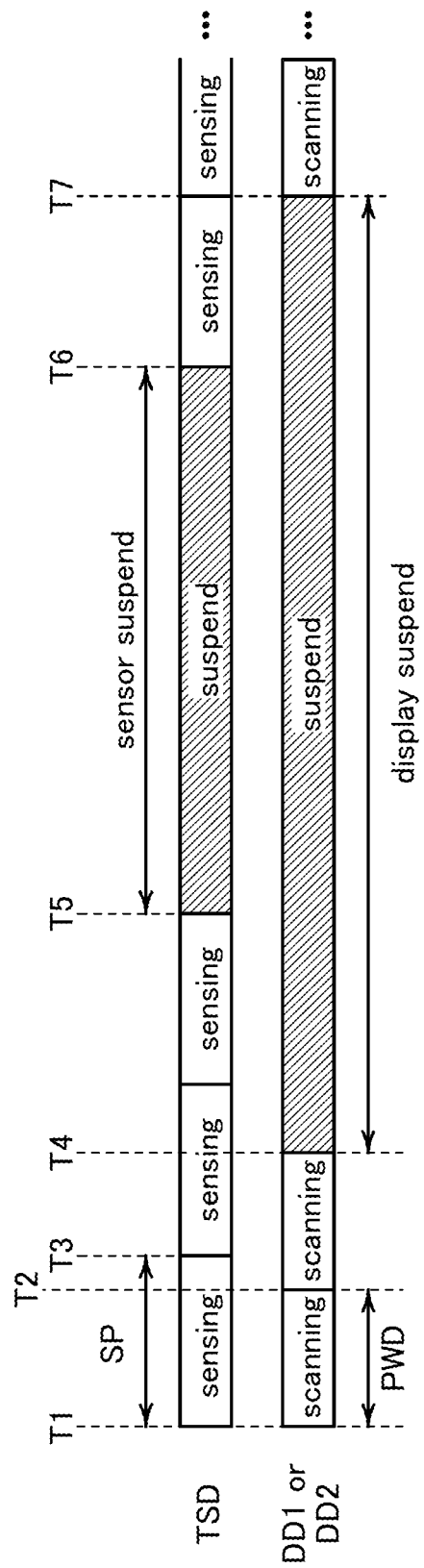

DISPLAY DEVICE, ELECTRONIC DEVICE, AND OPERATION METHOD THEREOF

CROSS-REFERENCE TO RELATED APPLICATIONS

This application is a divisional of U.S. application Ser. No. 15/784,533, filed Oct. 16, 2017, now allowed, which claims the benefit of a foreign priority application filed in Japan as Serial No. 2016-206479 on Oct. 21, 2016, both of which are incorporated by reference.

BACKGROUND OF THE INVENTION

1. Field of the Invention

One embodiment of the present invention relates to a display device, an electronic device, or an operation method thereof.

Note that one embodiment of the present invention is not limited to the above technical field. The technical field of the invention disclosed in this specification and the like relates to an object, a method, or a manufacturing method. Furthermore, one embodiment of the present invention relates to a process, a machine, manufacture, or a composition of matter. Specifically, examples of the technical field of one embodiment of the present invention disclosed in this specification include a semiconductor device, a display device, a liquid crystal display device, a light-emitting device, a power storage device, an imaging device, a memory device, a processor, an electronic device, a method for driving any of them, a method for manufacturing any of them, a method for testing any of them, and a system including any of them.

2. Description of the Related Art

Display devices included in mobile phones such as smartphones, tablet information terminals, notebook personal computers (PC), portable game consoles, and the like have undergone various improvements in recent years. For example, there have been developed display devices with features such as higher resolution, higher color reproducibility (higher NTSC ratio), a smaller driver circuit, and lower power consumption.

For example, an improved display device has a function of automatically adjusting the brightness of an image displayed on the display device in accordance with ambient light. An example of such a display device is a display device having a function of displaying an image with reflected ambient light and a function of displaying an image with light emitted from a light-emitting element. In this structure, the brightness of an image displayed on the display device can be adjusted in the following manner: the display device is set to a display mode for displaying an image with the use of reflected light (hereinafter referred to as a first mode) when ambient light is sufficiently strong, whereas the display device is set to a display mode for displaying an image with the use of light emitted from a light-emitting element (hereinafter referred to as a second mode) when ambient light is weak. In other words, the display device can display images in a display mode that is selected from the first mode, the second mode, and a mode using both the first and second modes (hereinafter referred to as hybrid display or a third mode) in accordance with the intensity of ambient light measured with an illuminometer (also referred to as an illuminance sensor in some cases).

As an example of a display device having a function of displaying an image with light emitted from a light-emitting element and a function of displaying an image with reflected ambient light, Patent Documents 1 to 3 each disclose a display device in which one pixel includes a pixel circuit for controlling a liquid crystal element and a pixel circuit for controlling a light-emitting element.

In this specification, such a display which includes a light-emitting element (e.g., an organic EL element, an inorganic EL element, or a nitride semiconductor light-emitting diode) and a reflective element (a reflective liquid crystal element) as display elements is referred to as an ER-hybrid display (an emissive OLED and reflective LC hybrid display or an emission/reflection hybrid display). A display which includes a transmissive liquid crystal element and a reflective liquid crystal element as display elements is referred to as a TR-hybrid display (a transmissive LC and reflective LC hybrid display or a transmission/reflection hybrid display). In addition, a display device which includes a light-emitting element and a reflective element as display elements is referred to as a hybrid display device, and a display including the hybrid display device is referred to as a hybrid display.

REFERENCE

[Patent Document]

[Patent Document 1] United States Patent Application Publication No. 2003/0107688
[Patent Document 2] PCT International Publication No. WO2007/041150
[Patent Document 3] Japanese Published Patent Application No. 2008-225381

SUMMARY OF THE INVENTION

When a display device includes a touch sensor portion as an input interface, a user can operate an electronic device including the display device by touching a display screen or making a touch gesture. As examples of a method for providing the touch sensor portion, there is a method in which a touch sensor unit is placed over the display screen of the display device (out-cell) and a method in which the touch sensor unit is provided inside the display device (on-cell). Furthermore, a display device including a liquid crystal element can have a touch sensor function when a common electrode of the liquid crystal element is used as a touch sensor electrode (full-in-cell).

In an active matrix display device including a liquid crystal element, when a transistor whose channel formation region includes a metal oxide is used as a transistor included in a pixel circuit of the display device, the transistor can have an extremely low off-state current. That is, image data written to the liquid crystal element can be retained for a long time.

Here, a description is made on a display device with a full-in-cell touch sensor in which the transistor whose channel formation region includes a metal oxide is used as a transistor included in a pixel circuit and a common electrode of the liquid crystal element is also used as a touch sensor electrode. In the case of the full-in-cell structure, an image writing period and a touch sensing period are provided. A touch sensor portion is preferably in a resting state while image data is written to the liquid crystal element. This is because the writing of the image data causes a noise. During the touch sensing period, although the transistor is in the resting state in order that the liquid crystal element can retain image data, the touch sensor portion keeps sensing even without the user's touch. Therefore, a large amount of power might be consumed for the sensing.

An object of one embodiment of the present invention is to provide a novel display device. Another object of one embodiment of the present invention is to provide an electronic device including a novel display device. Another object of one embodiment of the present invention is to provide a method for operating the display device or the electronic device.

Another object of one embodiment of the present invention is to provide a display device with low power consumption. Another object of one embodiment of the present invention is to provide a novel driving method for touch sensing.

Note that an object of one embodiment of the present invention is not limited to the above objects. The above objects do not preclude the existence of other objects. The other objects are the ones that are not described above and will be described below. The objects that are not described above can be derived from the description of the specification, the drawings, or the like by those skilled in the art. One embodiment of the present invention achieves at least one of the above objects and the other objects. One embodiment of the present invention does not necessarily achieve all the above objects and the other objects.

(1) One embodiment of the present invention is a method for operating an electronic device including a display device and a touch sensor. The method includes a first step, a second step, a third step, and a fourth step. The first step includes a first judgment step of judging whether the touch sensor has sensed a touch in a first period, a step of proceeding to the second step in the case where the first judgment step confirms that no touch has been sensed, and a step of proceeding to the third step in the case where the first judgment step confirms that a touch has been sensed. The second step includes a step of bringing the touch sensor into a resting state or operating the touch sensor at a reduced drive frequency. The third step includes a second judgment step of judging whether the display device has been brought into a resting state or has operated at a reduced drive frequency, and a step of proceeding to the fourth step in the case where the second judgment step confirms that the display device has been brought into the resting state or has operated at the reduced drive frequency. The fourth step includes a third judgment step of judging whether touches have been constantly sensed, and a step of proceeding to the second step in the case where the third judgment step confirms that touches have been constantly sensed.

(2) Another embodiment of the present invention is a method for operating an electronic device including a display device and a touch sensor. The method includes a first step and a second step. The first step includes a first judgment step of judging whether the touch sensor has sensed a touch in a first period, and a step of proceeding to the second step in the case where the first judgment step confirms that no touch has been sensed. The second step includes a step of bringing the touch sensor into a resting state or operating the touch sensor at a reduced drive frequency.

(3) Another embodiment of the present invention is a method for operating an electronic device including a display device and a touch sensor. The method includes a first step, a second step, and a third step. The first step includes a first judgment step of judging whether the display device has been brought into a resting state or has operated at a reduced drive frequency, and a step of proceeding to the second step in the case where the first judgment step confirms that the display device has been brought into the resting state or has operated at the reduced drive frequency. The second step includes a second judgment step of judging whether touches have been constantly sensed, and a step of proceeding to the third step in the case where the second judgment step confirms that touches have been constantly sensed. The third step includes a step of bringing the touch sensor into a resting state or operating the touch sensor at a reduced drive frequency.

(4) Another embodiment of the present invention is a method for operating an electronic device including a display device and a touch sensor. The display device includes a display portion and an illuminance sensor. The illuminance sensor has a function of measuring the illuminance of external light to divide the display portion into a first region which is not shaded and a second region which is shaded. The luminance of an image displayed in the first region of the display portion is increased. No image is displayed in the second region of the display portion, or the luminance of an image displayed in the second region of the display portion is reduced.

(5) Another embodiment of the present invention is a method for operating an electronic device including a display device and a touch sensor. The display device includes a display portion. The touch sensor has a function of dividing the display portion into a first region in which no touch is sensed and a second region in which a touch is sensed. The luminance of an image displayed in the first region of the display portion is increased. No image is displayed in the second region of the display portion, or the luminance of an image displayed in the second region of the display portion is reduced.

(6) Another embodiment of the present invention is the operation method according to any one of (1) to (5). In the operation method, the display device includes a reflective liquid crystal element and either a light-emitting element or a transmissive liquid crystal element.

(7) Another embodiment of the present invention is the operation method according to (6). In the operation method, the electronic device has a full-in-cell structure in which the reflective liquid crystal element and the touch sensor share one electrode.

(8) Another embodiment of the present invention is the operation method according to any one of (1) to (7). In the operation method, the display device includes a transistor whose channel formation region includes a metal oxide.

(9) Another embodiment of the present invention is the operation method according to any one of (1) to (8). In the operation method, the display device includes a transistor whose channel formation region includes silicon.

According to one embodiment of the present invention, a novel display device can be provided. According to another embodiment of the present invention, an electronic device including a novel display device can be provided. According to another embodiment of the present invention, a method for operating the display device or the electronic device can be provided.

According to another embodiment of the present invention, a display device with low power consumption can be provided. According to another embodiment of the present invention, a novel driving method for touch sensing can be provided.

Note that an effect of one embodiment of the present invention is not limited to the above effects. The above effects do not preclude the existence of other effects. The other effects are the ones that are not described above and will be described below. The effects that are not described above can be derived from the description of the specification, the drawings, or the like by those skilled in the art. One embodiment of the present invention is to have at least one of the above effects and the other effects. Therefore, one embodiment of the present invention does not necessarily have the above effects.

BRIEF DESCRIPTION OF THE DRAWINGS

FIG. 2A illustrates an operation example of an electronic device in one frame period, and FIG. 2B illustrates an example of the timing of transition between a driving state and a resting state of the electronic device.

FIGS. 5A and 5B illustrate examples of the timing of transition between a driving state and a resting state of an electronic device.

FIGS. 10A and 10B illustrate examples of the timing of transition between a driving state and a resting state of an electronic device.

DETAILED DESCRIPTION OF THE INVENTION

In this specification, hybrid display (display in the third mode) refers to a method for displaying text and/or an image, in which reflected light and self-emitted light are used together in one panel to complement each other's color tone or light intensity. Alternatively, hybrid display refers to a method for displaying text and/or an image with the use of light from a plurality of display elements in one pixel or one sub-pixel. Note that a hybrid display device performing hybrid display may locally include a pixel or a sub-pixel performing display using one of a plurality of display elements and a pixel or a sub-pixel performing display using two or more of the plurality of display elements.

In this specification and the like, hybrid display satisfies at least one of the above descriptions.

Furthermore, a hybrid display device includes a plurality of display elements in one pixel or one sub-pixel. As an example of the plurality of display elements, a reflective element that reflects light and a self-luminous element that emits light can be given. Note that the reflective element and the self-luminous element can be controlled independently. The hybrid display device has a function of displaying text and/or an image on a display portion with the use of reflected light and/or self-emitted light.

In this specification and the like, an "image" is a term including both a still image and a moving image. In other words, in this specification and the like, an "image" can refer to either a still image or a moving image. Furthermore, a "moving image" can refer to a video or the like.

In this specification and the like, a metal oxide means an oxide of metal in a broad sense. Metal oxides are classified into an oxide insulator, an oxide conductor (including a transparent oxide conductor), an oxide semiconductor (also simply referred to as an OS), and the like. For example, a metal oxide used for an active layer of a transistor is called an oxide semiconductor in some cases. That is, a metal oxide included in a channel formation region of a transistor that has at least one of an amplifying function, a rectifying function, and a switching function can be referred to as a metal oxide semiconductor or shortly as an OS. Furthermore, an OS FET refers to a transistor including a metal oxide or an oxide semiconductor.

In this specification and the like, a metal oxide containing nitrogen is also called a metal oxide in some cases. Moreover, a metal oxide containing nitrogen may be called a metal oxynitride.

Embodiment 1

In this embodiment, a display device, a touch sensor portion, and an operation method thereof will be described.

Configuration Example

Figure 1:
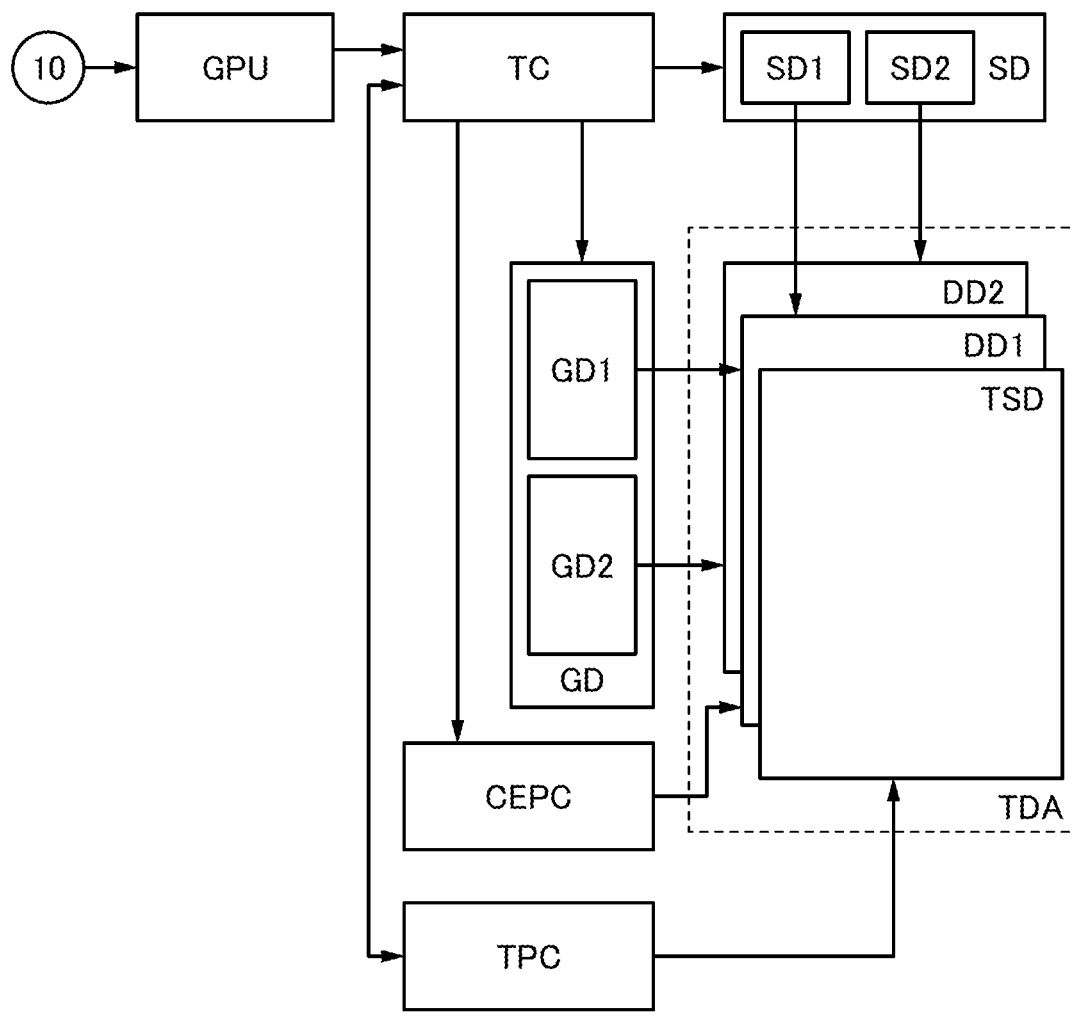
FIG. 1 is a block diagram illustrating a configuration example of an electronic device.

FIG. 1 is a block diagram illustrating a configuration example of an electronic device described in this embodiment.

In this embodiment, an electronic device 100 is a hybrid display device in which a common electrode of a reflective liquid crystal element is also used as a touch sensor electrode of a touch sensor portion and an OS FET is used as a transistor included in a pixel circuit. The electronic device 100 includes a graphics processing unit GPU, a timing controller TC, a common electrode potential setting circuit CEPC, a touch panel controller TPC, a gate driver portion GD, a source driver portion SD, and a touch sensor display portion TDA.

The gate driver portion GD includes a first gate driver GD1 and a second gate driver GD2. The source driver portion SD includes a first source driver SD1 and a second source driver SD2. The touch sensor display portion TDA includes a first display device DD1, a second display device DD2, and a touch sensor portion TSD. The first display device DD1 includes a reflective liquid crystal element, and the second display device DD2 includes either a light-emitting element or a transmissive liquid crystal element.

The graphics processing unit GPU has a function of generating image data by rendering data 10 transmitted from the outside. Here, the term "outside" refers to a host device, a receiver, or the like provided in the electronic device 100, for example. Furthermore, the graphics processing unit GPU has a function of transmitting the image data to the timing controller TC. Note that the electronic device 100 may include a central processing unit (CPU) instead of the graphics processing unit GPU.

The timing controller TC has a function of scaling, in accordance with the number of pixels in the first display device DD1 and/or the second display device DD2, the image data transmitted from the graphics processing unit GPU. The scaled image data is transmitted to the source driver portion SD. Furthermore, the timing controller TC has a function of generating data control signals based on the image data transmitted from the graphics processing unit GPU. The data control signals are transmitted to the source driver portion SD, the gate driver portion GD, and the common electrode potential setting circuit CEPC.

The common electrode potential setting circuit CEPC has functions of switching the polarity of the reflective liquid crystal included in the pixel circuit and changing a potential applied to the common electrode (touch sensor electrode), in response to the data control signal transmitted from the timing controller TC. Specifically, in this specification and the like, the function of changing a potential applied to the common electrode (touch sensor electrode) refers to switching between a step of inputting a common potential to the common electrode (touch sensor electrode) to drive the first display device DD1 and a step of inputting a pulse signal for the touch sensor to the common electrode (touch sensor electrode) to make the touch sensor portion TSD perform a sensing operation.

The gate driver portion GD has a function of transmitting, in response to the data control signal transmitted from the timing controller TC, selection signals of the display elements to the first display device DD1 and the second display device DD2 at a drive frequency based on the data control signal. Specifically, a selection signal from the first gate driver GD1 is transmitted to the first display device DD1 as a signal for selecting the reflective liquid crystal element, and a selection signal from the second gate driver GD2 is transmitted to the second display device DD2 as a signal for selecting the light-transmitting element (transmissive liquid crystal element). Depending on the data control signal, the gate driver portion GD can be brought into a resting state.

The source driver portion SD has a function of transmitting the scaled image data (hereinafter referred to as an image signal) transmitted from the timing controller TC, to the first display device DD1. The image signal is transmitted at a drive frequency based on the data control signal which is also transmitted from the timing controller TC. Specifically, an image signal from the first source driver SD1 is transmitted to the first display device DD1 as image data displayed by the reflective liquid crystal element, and an image signal from the second source driver SD2 is transmitted to the second display device DD2 as image data displayed by the light-transmitting element (transmissive liquid crystal element). Depending on the data control signal, the source driver portion SD can be brought into a resting state.

Note that the first display device DD1 and the second display device DD2 may have the same drive frequency or different drive frequencies.

The touch panel controller TPC receives the data control signal from the timing controller TC and thus can make the touch sensor portion TSD perform the sensing operation at a drive frequency based on the data control signal. Depending on the data control signal, the touch sensor portion TSD can be brought into a resting state. Furthermore, the touch panel controller TPC has a function of controlling a touch sensor driver and a sensing circuit which are included in the touch sensor portion TSD. A signal which includes touch information sensed by the sensing circuit is processed by the touch panel controller TPC and transmitted to a main computer such as a host device.

In a block diagram in this specification and the like, components are functionally classified and shown by blocks that are independent from each other. However, in an actual circuit or the like, such components are sometimes hard to classify functionally, and there is a case where one circuit is responsible for a plurality of functions or a case where a plurality of circuits are responsible for one function. Therefore, blocks illustrated in a block diagram do not necessarily show components described in the specification, which can be explained with another term as appropriate depending on the situation.

For example, in the electronic device 100 in FIG. 1, the first display device DD1 and the touch sensor portion TSD are separately illustrated. However, since the common electrode of the liquid crystal element is also used as the touch sensor electrode of the touch sensor portion, the common electrode (touch sensor electrode) is a common component shared by the first display device DD1 and the touch sensor portion TSD in FIG. 1. Accordingly, the expression "the first display device DD1 includes a common electrode (touch sensor electrode)" can be replaced with the expression "the touch sensor portion TSD includes a common electrode (touch sensor electrode).

Although FIG. 1 illustrates an example in which the electronic device 100 is a hybrid display device and thus includes the second display device DD2, one embodiment of the present invention is not limited to the hybrid display device. In this sense, one embodiment of the present invention may be the electronic device 100 which does not include the second display device DD2, the second gate driver, and the second source driver and is provided with the touch sensor display portion TDA including only the first display device DD1 and the touch sensor portion TSD.

Operation Example 1

Next, a method for driving the electronic device 100 will be described.

FIGS. 2A and 2B schematically illustrate examples of the timing of writing image data to the first display device DD1 and/or the second display device DD2 and the timing of sensing of the touch sensor portion TSD. In FIG. 2A, one frame period includes an image writing period PWD, a sensing period SP1, and a sensing period SP2. As illustrated in FIG. 2A, writing of image data to the first display device DD1 and/or the second display device DD2 and sensing of the touch sensor portion are performed in one frame period. Note that one frame period is 1/60 s.

The image writing period PWD is a period in which image data is written to the display elements of the first display device DD1 and/or the second display device DD2, and accounts for 1/2 (1/120 s) of one frame period. In the full-in-cell structure in which the common electrode is used as a touch sensor electrode, a common potential is applied to the common electrode (touch sensor electrode) of the liquid crystal element and image data is written to the liquid crystal element in the image writing period PWD. Meanwhile, the touch sensor portion is not available for sensing and thus in the resting state.

Each of the sensing periods SP1 and SP2 is a period in which the touch sensor portion TSD of the electronic device 100 performs a sensing operation, and accounts for 1/4 (1/240 s) of one frame period. That is, in FIG. 2A, the sensing operation is performed twice in one frame period. In the full-in-cell structure in which the common electrode is used as a touch sensor electrode, a touch sensing pulse signal is applied to the common electrode (touch sensor electrode) of the liquid crystal element and the touch sensor is driven in the sensing period SP1 and the sensing period SP2. Meanwhile, the liquid crystal element of the first display device DD1 retains the data written previously, and thus, writing is not performed. In other words, a selection signal does not need to be transmitted to the liquid crystal element; therefore, the gate driver for the first display device DD1 and/or the gate driver for the second display device DD2 are in the resting (non-scanning) state.

In the full-in-cell touch sensor display portion TDA, in the case where no image is displayed on the first display device DD1 and an image is displayed on the second display device DD2 (second mode), the first display device DD1 is in the resting (non-scanning) state also in the image writing period PWD. In the full-in-cell touch sensor display portion TDA, in the case where no image is displayed on the second display device DD2 and an image is displayed on the first display device DD1 (first mode), the second display device DD2 is in the resting (non-scanning) state also in the image writing period PWD FIG. 2B illustrates examples of the driving state, the resting state, and the state transition timing of the first display device DD1 and/or the second display device DD2 and the touch sensor portion TSD which are driven in accordance with the timing chart of one frame period in FIG. 2A.

As illustrated in FIG. 2B, one frame period lasts from Time T1 to Time T2, and the image writing operation of the first display device DD1 and/or the second display device DD2 is performed once in every frame period. During the writing operation (image writing period PWD), the touch sensor portion TSD is in the resting state. After the image writing operation of the first display device DD1 and/or the second display device DD2 is terminated, the first display device DD1 and/or the second display device DD2 transition from the driving state to the resting state.

When the first display device DD1 and/or the second display device DD2 are brought into the resting state, the touch sensor portion TSD transitions from the resting state to the driving state. At this time, the touch sensor portion performs a sensing operation in the sensing period SP1 and the sensing period SP2. After the sensing operation is terminated, the touch sensor portion TSD transitions from the driving state to the resting state. At this time, the first display device DD1 and/or the second display device DD2 transition from the resting state to the driving state.

At Time T2, the driving in one frame period including the above operations is terminated. In FIG. 2B, after Time T2, the driving in one frame period illustrated in FIG. 2A is repeated in a manner similar to that of the operations from Time T1 to Time T2. Note that in FIG. 2B, operations in one frame period are performed from Time T2 to Time T3.

The timing illustrated in FIG. 2A is set on the assumption of a 4.91-inch display device with 1280×720 pixels (HD). The lengths of the image writing period PWD, the sensing period SP1, and the sensing period SP2 may be changed depending on the size of the touch sensor display portion TDA, namely the number of pixels in the first display device DD1 and the second display device DD2 or the size of the touch sensor portion TSD.

FIGS. 3A to 3D illustrate examples of the operation timing of the electronic device 100 in one frame period, which are different from the examples in FIGS. 2A and 2B.

Figure 3A:
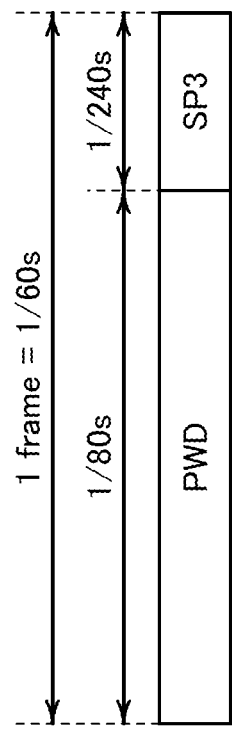
FIGS. 3A to 3D each illustrate an operation example of an electronic device in one frame period.

In FIG. 3A, one frame period includes an image writing period PWD and a sensing period SP3. The image writing period PWD in FIG. 3A accounts for 1/2 (1/120 s) of one frame period, and the sensing period SP3 in FIG. 3A accounts for 1/2 (1/120 s) of one frame period. In the sensing period SP3 in FIG. 3A, the sensing operation is performed once. That is, the number of sensing operations in the timing chart in FIG. 3A is smaller than that in the timing chart in FIG. 2A. When the reduction in the number of sensing operations does not affect the sensitivity of the touch sensor portion TSD, the operation timing in FIG. 3A with a smaller number of sensing operations enables lower power consumption of the touch sensor portion TSD than the operation timing in FIG. 2A.

Figure 3B:
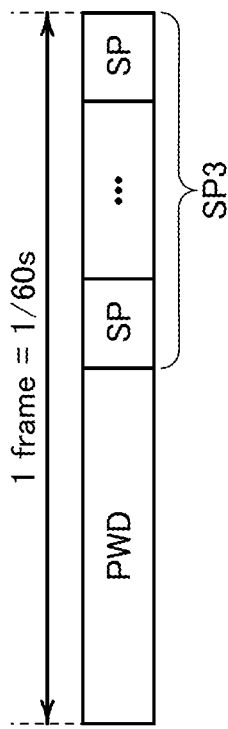

In FIG. 3B, one frame period includes an image writing period PWD and a sensing period SP3. The image writing period PWD in FIG. 3B accounts for 3/4 (1/80 s) of one frame period, and the sensing period SP3 in FIG. 3B accounts for 1/4 (1/240 s) of one frame period. In the sensing period SP3 in FIG. 3B, the sensing operation is performed once. That is, the image writing period PWD in the timing chart in FIG. 3B is longer than that in the timing chart in FIG. 2A; therefore, the operation timing in FIG. 3B is suitable for a display device with a larger number of pixels and/or a larger size.

Figure 3C:
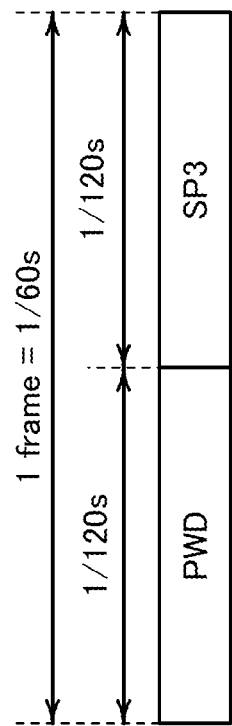

In FIG. 3C, one frame period includes an image writing period PWD and a sensing period SP3. The image writing period PWD in FIG. 3C accounts for 1/4 (1/240 s) of one frame period, and the sensing period SP3 in FIG. 3C accounts for 3/4 (1/80 s) of one frame period. In the sensing period SP3 in FIG. 3C, the sensing operation is performed once. That is, the image writing period PWD in the timing chart in FIG. 3C is shorter than that in the timing chart in FIG. 2A; therefore, the operation timing in FIG. 3C is suitable for a display device with a smaller number of pixels and/or a smaller size.

Figure 3D:
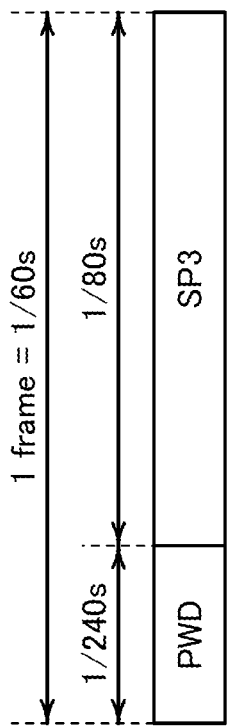

In FIG. 3D, one frame period includes an image writing period PWD and a sensing period SP3. In FIG. 3D, the sum of the length of the image writing period PWD and the length of the sensing period SP3 in one frame period is 1/60 s; however, there is no limitation on the length of the image writing period PWD and the length of the sensing period SP3. The sensing period SP3 in FIG. 3D includes a plurality of sensing periods SP, and the sensing operation is performed once in every sensing period SP. In other words, in the operation timing chart in FIG. 3D, a plurality of sensing operations is performed in one frame period, which is a suitable method for the improvement in the sensitivity of the touch sensor portion TSD. Note that one frame period in FIG. 2A corresponds to that in FIG. 3D, when the number of sensing periods SP in one frame period is set to two and the lengths of the image writing period PWD and the sensing period SP3 are each set to 1/120 s.

Operations in one frame period of one embodiment of the present invention are not limited to the examples of the operations in one frame period in FIGS. 3A to 3D. For example, in one frame period of one embodiment of the present invention, the sensing period SP3 may come first and be followed by the image writing period PWD.

Operation Example 2

Figure 4A:
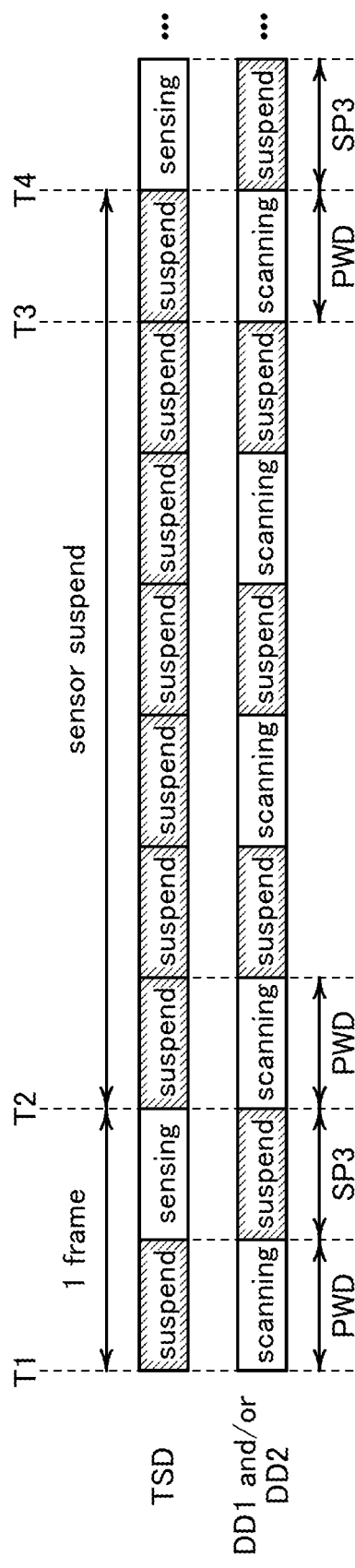
FIGS. 4A and 4B illustrate examples of the timing of transition between a driving state and a resting state of an electronic device.

FIG. 4A illustrates examples that are different from those in FIG. 2B, namely examples of the driving state, the resting state, and the state transition timing of the first display device DD1 and/or the second display device DD2 and the touch sensor portion TSD in the electronic device 100. Note that the operation timing in one frame period in FIG. 4A corresponds to any one of the operation timings in FIGS. 3A to 3D; in accordance with this timing, the normal operation of the electronic device 100 is performed.

As illustrated in FIG. 4A, one frame period lasts from Time T1 to Time T2, and the image writing operation of the first display device DD1 and/or the second display device DD2 is performed once in the one frame period. During the writing operation (image writing period PWD), the touch sensor portion TSD is in the resting state. After the image writing operation of the first display device DD1 and/or the second display device DD2 is terminated, the first display device DD1 and/or the second display device DD2 transition from the driving state to the resting state.

When the first display device DD1 and/or the second display device DD2 are brought into the resting state, the touch sensor portion TSD transitions from the resting state to the driving state. At this time, the touch sensor portion performs a sensing operation in the sensing period SP3. At Time T2, i.e., after the termination of the sensing operation, the touch sensor portion TSD transitions from the driving state to the resting state. At this time, the first display device DD1 and/or the second display device DD2 transition from the resting state to the driving state.

In the case where no operation by the user, i.e. no touch, is sensed for a certain period until Time T2, the touch sensor portion TSD is brought into the resting state at Time T2 regardless of the operation timing in one frame period. Note that the length of the period in which the touch sensor portion TSD is in the resting state may be arbitrarily determined by the user or preset in the electronic device 100, for example. In FIG. 4A, the touch sensor portion TSD keeps the resting state for three frame periods (from Time T2 to Time T3). In this specification, a long resting state of the touch sensor portion TSD, such as the above-mentioned state in the period from Time T2 to Time T3 is referred to as a long suspended mode.

Strictly speaking, the resting state of the touch sensor portion TSD does not end at Time T3. From Time T3, the operation in any one of the timing charts in FIGS. 3A to 3D is performed; therefore, the resting state of the touch sensor portion TSD does not end at Time T3 and lasts until the termination of the image writing period PWD starting at Time T3 (until Time T4). Thus, in this specification, not only the state in the period from Time T2 to Time T3 but also the state in the period from Time T2 to Time T4 can be referred to as a long suspended mode.

After Time T3, the operations in the normal one frame period are repeated in a manner similar to that in FIG. 2B. In the case where no operation by the user, i.e. no touch, is sensed for a certain period, the touch sensor portion TSD transitions to the long suspended mode as in the period from Time T2 to Time T3.

Figure 4B:
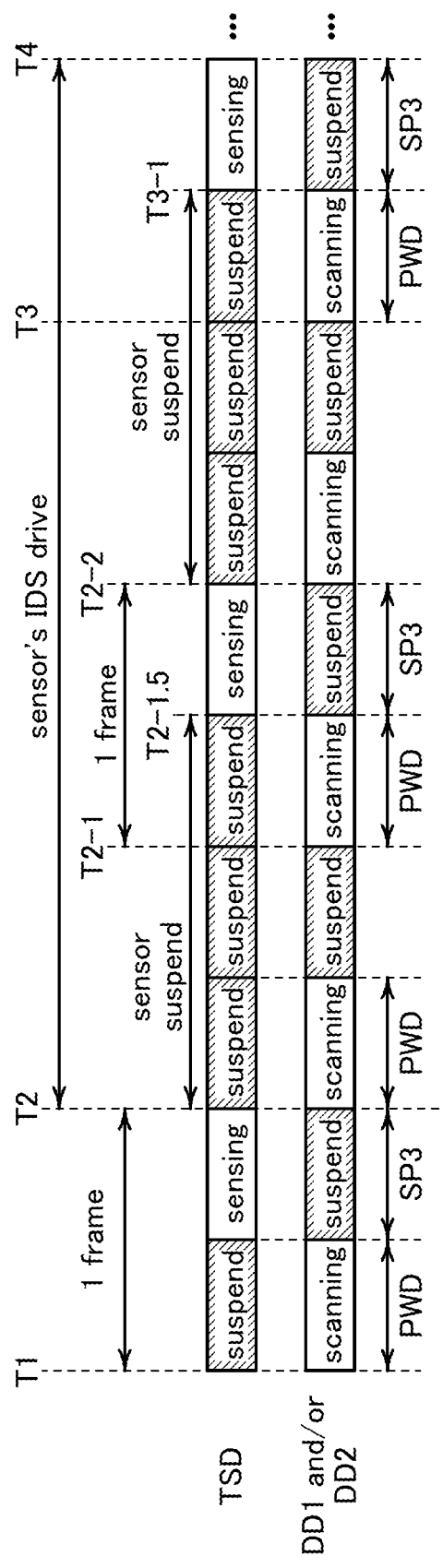

In FIG. 4A, the touch sensor portion TSD is in the long suspended mode from Time T2 to Time T4; however, the operation timing of one embodiment of the present invention is not limited thereto. For example, as illustrated in FIG. 4B, in the middle of the period in the long suspended mode, the touch sensor portion TSD may operate on the basis of the operation timing in the normal one frame period. In FIG. 4B, the touch sensor portion TSD is in the long suspended mode from Time T2 to Time T2-1.5, operates on the basis of the operation timing in the normal one frame period from Time T2-1 to Time T2-2, and is again in the long suspended mode from Time T2-2 to Time T3-1. In FIG. 4B, from Time T2 to Time T4, the touch sensor portion TSD has one sensing period per two frame periods (one sensing operation every 1/30 s), i.e. operates at a drive frequency of 30 Hz. Depending on circumstances or situation, the touch sensor portion TSD may operate at a drive frequency that is lower than 60 Hz and is not 30 Hz. In this specification, the operation at a low drive frequency is referred to as idling stop (IDS) driving. Note that the IDS driving of a display device will be described in detail in Embodiment 4.

Operation Example 3

FIG. 5A illustrates examples that are different from those in FIG. 2B and FIGS. 4A and 4B, namely examples of the driving state, the resting state, and the state transition timing of the first display device DD1 and/or the second display device DD2 and the touch sensor portion TSD in the electronic device 100. Note that the operation timing in one frame period in FIG. 5A corresponds to any one of the operation timings in FIGS. 3A to 3D.

As illustrated in FIG. 5A, one frame period lasts from Time T1 to Time T2, and the image writing operation of the first display device DD1 and/or the second display device DD2 is performed once in the one frame period. During the writing operation (image writing period PWD), the touch sensor portion TSD is in the resting state. After the image writing operation of the first display device DD1 and/or the second display device DD2 is terminated, the first display device DD1 and/or the second display device DD2 transition from the driving state to the resting state.

When the first display device DD1 and/or the second display device DD2 are brought into the resting state, the touch sensor portion TSD transitions from the resting state to the driving state. At this time, the touch sensor portion performs a sensing operation in the sensing period SP3. At Time T2, i.e., after the termination of the sensing operation, the touch sensor portion TSD transitions from the driving state to the resting state.

Here, the following case will be described: the touch sensor portion TSD transitions to the long suspended mode when operations by the user, i.e. touches, are constantly sensed until Time T2 and the first display device DD1 and/or the second display device DD2 are brought into the long resting state from Time T2. For example, the long resting state of the first display device DD1 and/or the second display device DD2 can be triggered when the graphics processing unit GPU of the electronic device 100 illustrated in FIG. 1 compares the previous frame with the present frame and finds no difference in grayscale or color tone in every pixel. In FIG. 5A, the first display device DD1 and/or the second display device DD2 are in the long resting state from Time T2 to Time T4.

The operation of the touch sensor portion TSD transitions to the long suspended mode after the first display device DD1 and/or the second display device DD2 are brought into the long resting state. In FIG. 5A, the long suspended mode lasts from Time T3 to Time T5.

After Time T4, the operations in one frame period are repeated in a manner similar to that in FIG. 2B. In the case where operations by the user, i.e. touches, are constantly sensed and the first display device DD1 and/or the second display device DD2 are brought into the long resting state, the touch sensor portion TSD transitions to the long suspended mode as in the period from Time T3 to Time T5.

In FIG. 5A, the first display device DD1 and/or the second display device DD2 are in the long resting state from Time T2 to Time T4; however, the operation timing of one embodiment of the present invention is not limited thereto. As illustrated in FIG. 5B, for example, without bringing the first display device DD1 and/or the second display device DD2 into the long resting state, image rewriting may be performed at a reduced frequency when the touch sensor portion TSD is in the long suspended mode. In FIG. 5B, from Time T3 to Time T4, the first display device DD1 and/or the second display device DD2 have one image writing period per two frame periods (one writing every 1/30 s), i.e. operate at a drive frequency of 30 Hz. Depending on circumstances or situation, the first display device DD1 and/or the second display device DD2 may operate at a drive frequency that is lower than 60 Hz and is not 30 Hz. That is, the IDS driving of the first display device DD1 and/or the second display device DD2 may be performed at a reduced drive frequency. The IDS driving of a display device will be described in detail in Embodiment 4.

The above-described operation method in FIG. 5B is effective in the case where the touch sensor portion TSD is in the long suspended mode for a long time. Since image data retained in display pixels of the first display device DD1 and/or the second display device DD2 is regularly refreshed, the display quality of the touch sensor display portion TDA can be improved.

As an example of the case where operations by the user, i.e. touches, are constantly sensed and the first display device DD1 and/or the second display device DD2 are brought into the resting state (or the IDS driving is performed) from Time T2, the case where the user keeps touching the display screen and a displayed image does not change can be assumed. Examples of an application that satisfies this assumption include e-book reader software, a browser, moving image reproduction software, and a file browser.

While the user is running any of the above applications in the electronic device 100, the user may keep touching the touch sensor display portion TDA with a finger to operate the electronic device 100 quickly. For example, while the user performs a touch operation to scroll an image displayed on a browser running as an application, the touch operation may be temporarily stopped in the state in which the finger touches the touch sensor display portion TDA and the scroll of the displayed image may be paused. In this case, with the finger touching the touch sensor display portion TDA, the user browses the displayed image with the scroll paused. After finishing browsing the displayed image, the user moves the finger which has touched the touch sensor display portion TDA again and scrolls the displayed image. In this manner, in the case where the user temporarily pauses a touch operation of the electronic device 100 with a finger touching the touch sensor display portion TDA and browses a displayed image, the electronic device 100 preferably operates in the manner described in Operation Example 3.

The touch sensor portion TSD continues the sensing operation during the touch operation such as the scroll of the display screen. When the user temporarily pauses the touch operation with the finger touching the touch sensor display portion TDA and browses the displayed image, the displayed image does not change. Therefore, the first display device DD1 and/or the second display device DD2 are brought into the resting state (or the IDS driving is performed). At this time, even though the finger touches the touch sensor display portion TDA, this touch is not regarded as an input to the electronic device 100; therefore, the touch sensor portion TSD preferably operates in the long suspended mode (or the idling stop driving is preferably performed).

The power consumption for the sensing operation in the electronic device 100 can be reduced by applying Operation Examples 1 to 3 to the operation of the electronic device 100.

This embodiment can be combined with any of the other embodiments in this specification as appropriate.

Embodiment 2

In this embodiment, a display device and a touch sensor portion which are different from those in Embodiment 1 and an operation method thereof will be described.

Configuration Example 1

Figure 6:
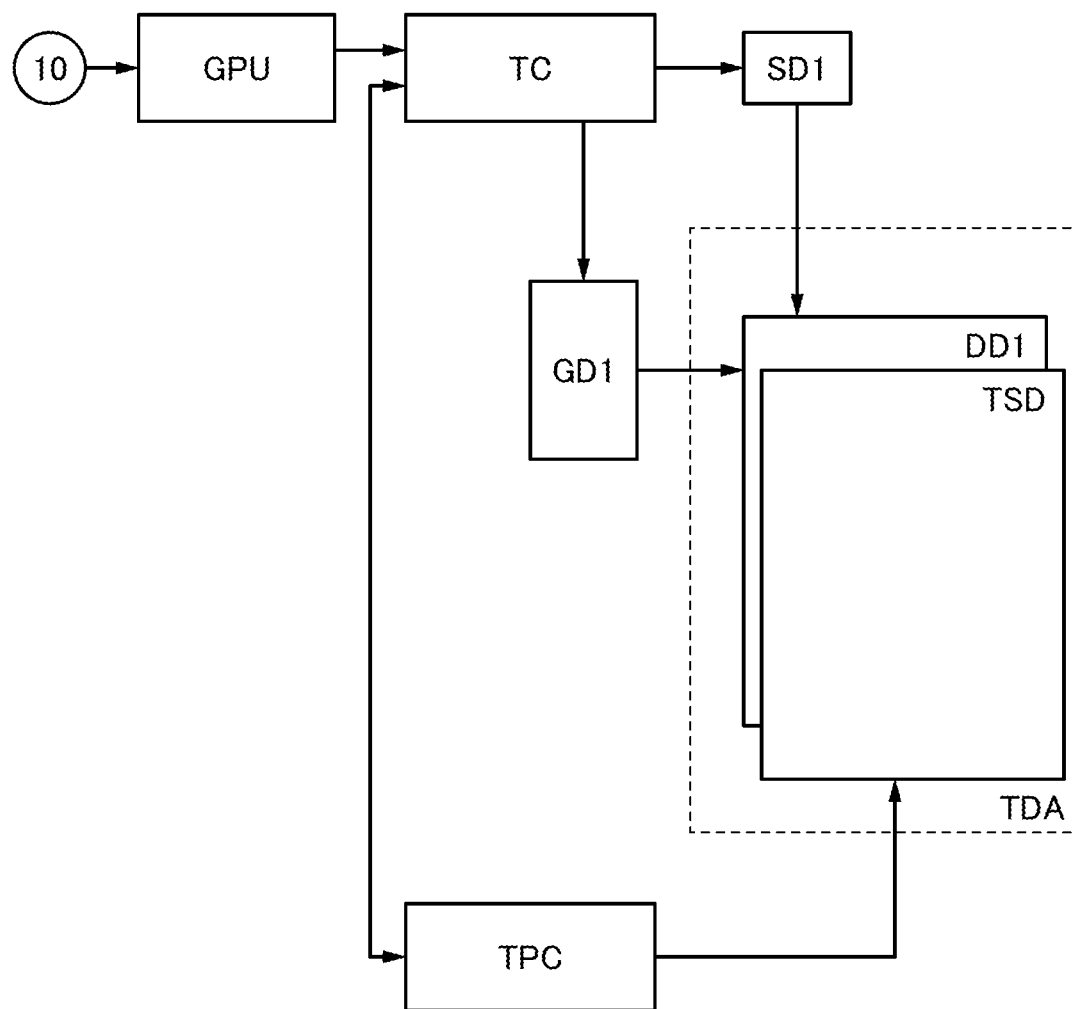
FIG. 6 is a block diagram illustrating a configuration example of an electronic device.

FIG. 6 is a block diagram illustrating a configuration example of an electronic device described in this embodiment.

An electronic device 101 is an electronic device which includes a first display device DD1 including a reflective liquid crystal element (or a transmissive liquid crystal element; hereinafter, the general term "liquid crystal element" will be used) and in which an OS FET is used as a transistor included in a pixel circuit. Note that unlike in Embodiment 1, a common electrode of the liquid crystal element and a touch sensor electrode in a touch sensor portion are separately provided. The electronic device 101 includes a graphics processing unit GPU, a timing controller TC, a touch panel controller TPC, a first gate driver GD1, a first source driver SD1, and a touch sensor display portion TDA.

The electronic device 101 has a configuration corresponding to that of the electronic device 100 in Embodiment 1 which does not include the second display device DD2, the second gate driver GD2, the second source driver SD2, and the common electrode potential setting circuit CEPC. Therefore, the description of the electronic device 100 can be referred to for the electrical connection in the electronic device 101. In the electronic device 101 illustrated in FIG. 6, the first gate driver GD1 and the first source driver SD1 represent a gate driver portion GD and a source driver portion SD, respectively.

The description of the graphics processing unit GPU in Embodiment 1 can be referred to for the graphics processing unit GPU here.

The timing controller TC has a function of scaling, in accordance with the number of pixels in the first display device DD1, image data transmitted from the graphics processing unit GPU. The scaled image data is transmitted to the first source driver SD1. Furthermore, the timing controller TC has a function of generating data control signals based on the image data transmitted from the graphics processing unit GPU. The data control signals are transmitted to the first source driver SD1 and the first gate driver GD1.

The first gate driver GD1 has a function of transmitting, in response to the data control signal transmitted from the timing controller TC, a selection signal of a display element to the first display device DD1 at a drive frequency based on the data control signal. Specifically, a selection signal from the first gate driver GD1 is transmitted to the first display device DD1 as a signal for selecting the liquid crystal element. Depending on the data control signal, the first gate driver GD1 can be brought into a resting state.

The first source driver SD1 has a function of transmitting the scaled image data (hereinafter referred to as an image signal) transmitted from the timing controller TC to the first display device DD1. The image signal is transmitted at a drive frequency based on the data control signal which is also transmitted from the timing controller TC. Specifically, an image signal from the first source driver SD1 is transmitted to the first display device DD1 as image data displayed by the liquid crystal element. Depending on the data control signal, the first source driver SD1 can be brought into a resting state.

The description of the touch panel controller TPC in Embodiment 1 can be referred to for the touch panel controller TPC here.

Configuration Example 2

Figure 7:
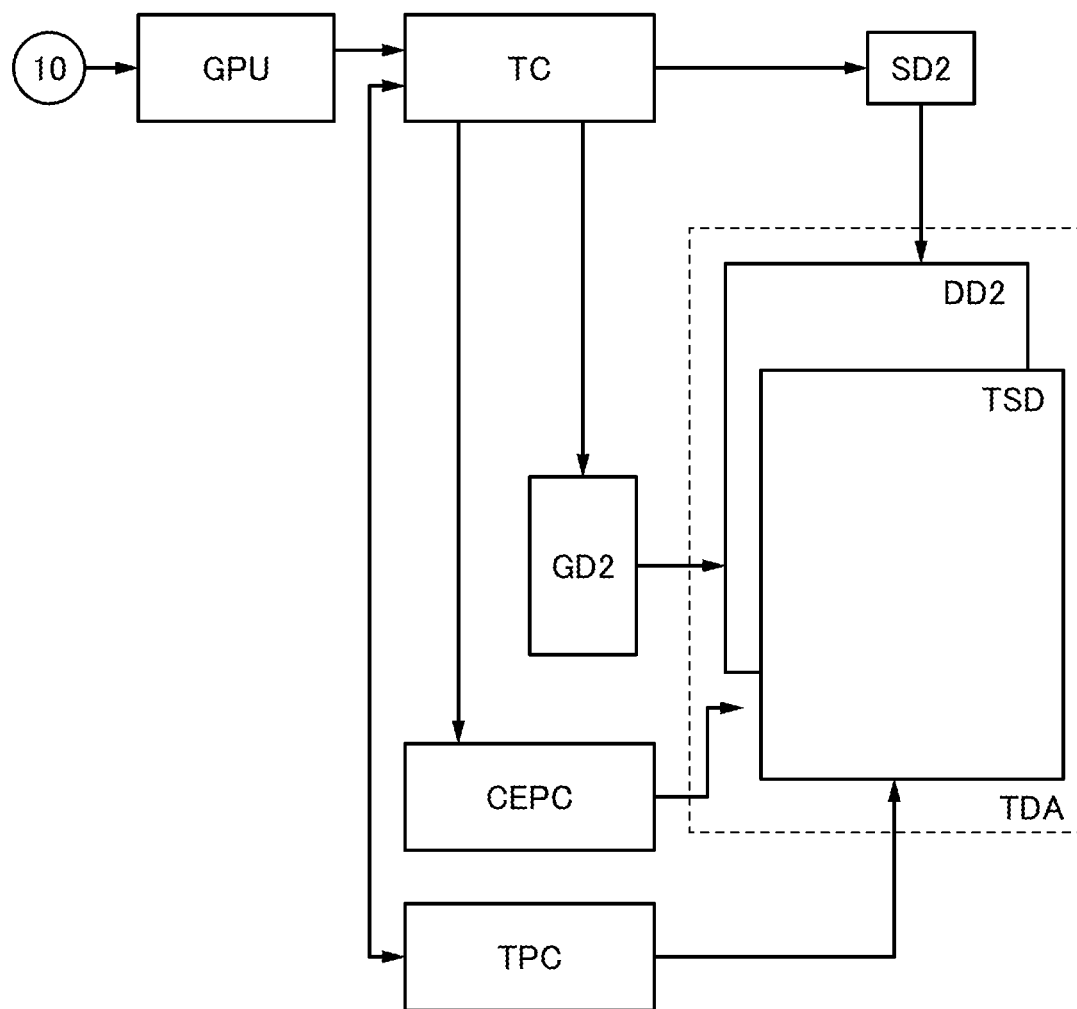
FIG. 7 is a block diagram illustrating a configuration example of an electronic device.

FIG. 7 is a block diagram illustrating a configuration example of an electronic device that is different from the electronic device 100 described in Embodiment 1 and the electronic device 101 described in Configuration Example 1 of this embodiment.

An electronic device 102 is an electronic device which includes a second display device DD2 including a light-emitting element and in which an OS FET is used as a transistor included in a pixel circuit. The electronic device 102 includes a graphics processing unit GPU, a timing controller TC, a touch panel controller TPC, a second gate driver GD2, a second source driver SD2, and a touch sensor display portion TDA.

The electronic device 102 has a configuration corresponding to that of the electronic device 100 in Embodiment 1 which does not include the first display device DD1, the first gate driver GD1, the first source driver SD1, and the common electrode potential setting circuit CEPC. Therefore, the description of the electronic device 100 can be referred to for the electrical connection in the electronic device 102. In the electronic device 102 illustrated in FIG. 7, the second gate driver GD2 and the second source driver SD2 represent a gate driver portion GD and a source driver portion SD, respectively.

The description of the graphics processing unit GPU in Embodiment 1 can be referred to for the graphics processing unit GPU here.

The timing controller TC has a function of scaling, in accordance with the number of pixels in the second display device DD2, image data transmitted from the graphics processing unit GPU. The scaled image data is transmitted to the second source driver SD2. Furthermore, the timing controller TC has a function of generating data control signals based on the image data transmitted from the graphics processing unit GPU. The data control signals are transmitted to the second source driver SD2 and the second gate driver GD2.

The second gate driver GD2 has a function of transmitting, in response to the data control signal transmitted from the timing controller TC, a selection signal of a display element to the second display device DD2 at a drive frequency based on the data control signal. Specifically, a selection signal from the second gate driver GD2 is transmitted to the second display device DD2 as a signal for selecting the light-emitting element. Depending on the data control signal, the second gate driver GD2 can be brought into a resting state.

The second source driver SD2 has a function of transmitting the scaled image data (hereinafter referred to as an image signal) transmitted from the timing controller TC to the second display device DD2. The image signal is transmitted at a drive frequency based on the data control signal which is also transmitted from the timing controller TC. Specifically, an image signal from the second source driver SD2 is transmitted to the second display device DD2 as image data displayed by the light-emitting element. Depending on the data control signal, the second source driver SD2 can be brought into a resting state.

The description of the touch panel controller TPC in Embodiment 1 can be referred to for the touch panel controller TPC here.

Operation Example 1

Figure 8:
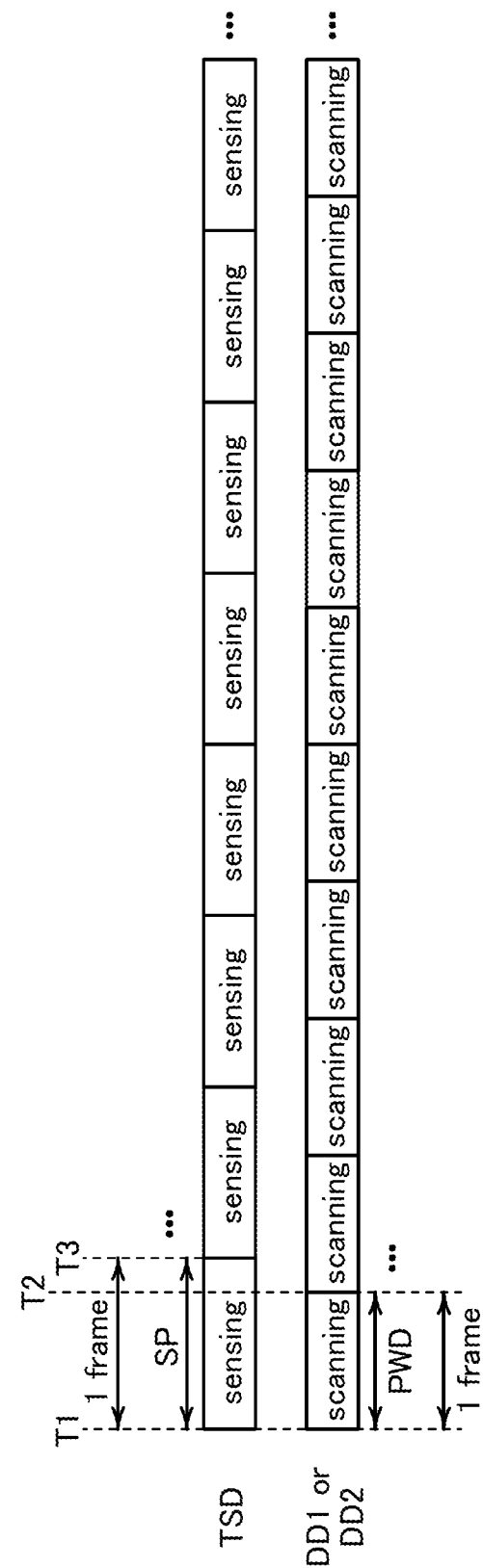
FIG. 8 illustrates an example of the timing of transition between a driving state and a resting state of an electronic device.

FIG. 8 illustrates an example of the timing for driving the display device (the first display device DD1 or the second display device DD2) and the touch sensor portion TSD which are included in the touch sensor display portion TDA of the electronic device 101 or the electronic device 102.

In the timing chart in FIG. 8, an image writing period PWD for one frame in the first display device DD1 or the second display device DD2 lasts from Time T1 to Time T2, and a sensing operation for one frame in the touch sensor portion TSD lasts from Time T1 to Time T3.

In the timing chart in FIG. 8, the first display device DD1 or the second display device DD2 and the touch sensor portion TSD each repeat the operation in one frame period without being brought into the resting state.

Note that in FIG. 8, the length of one frame period in which the first display device DD1 or the second display device DD2 is driven is different from the length of one frame period in which the touch sensor portion TSD is driven; however, these lengths may be equal to each other.

Operation Example 2

Next, the following case will be described: when no operation by the user, i.e. no touch, is sensed for a certain period, the touch sensor portion TSD driven on the basis of the timing in FIG. 8 transitions to the resting state (long suspended mode).

Figure 9A:
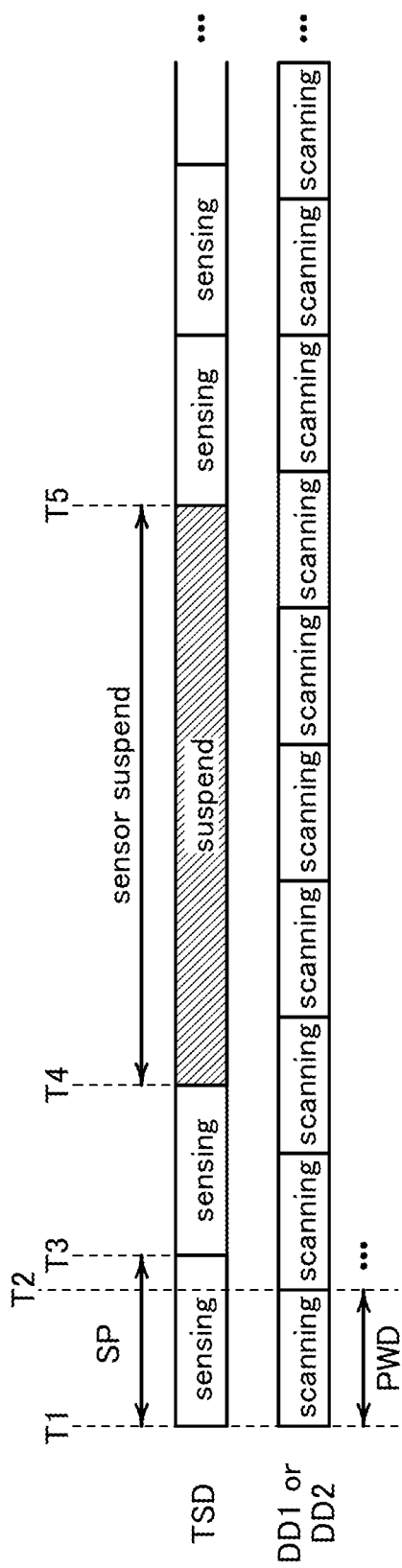
FIGS. 9A and 9B illustrate examples of the timing of transition between a driving state and a resting state of an electronic device.

FIG. 9A illustrates an example of the timing at which the touch sensor portion TSD transitions from the driving state to the long suspended mode in the case where no touch is sensed by the touch sensor portion TSD driven on the basis of the timing in FIG. 8.

In the examples of the driving timing illustrated in FIG. 8 and FIG. 9A, the touch sensor portion TSD performs the sensing operation once in one frame period. In FIG. 9A, the sensing operation is performed twice in a period from Time T1 to Time T4.

At this time, in the case where no operation by the user, i.e. no touch, is sensed for a certain period until Time T4, the touch sensor portion TSD transitions from the driving state to the long suspended mode at Time T4. Note that the length of the period in which the touch sensor portion TSD is in the long suspended mode may be arbitrarily determined by the user or preset in the electronic device 101 or the electronic device 102, for example. In FIG. 9A, the touch sensor portion TSD is in the long suspended mode from Time T4 to Time T5.

After Time T5, the touch sensor portion TSD repeats the operation in one frame period as in FIG. 8. In the case where no operation by the user, i.e. no touch, is sensed for a certain period, the touch sensor portion TSD transitions to the long suspended mode as in the period from Time T4 to Time T5 in FIG. 9A.

Figure 9B:
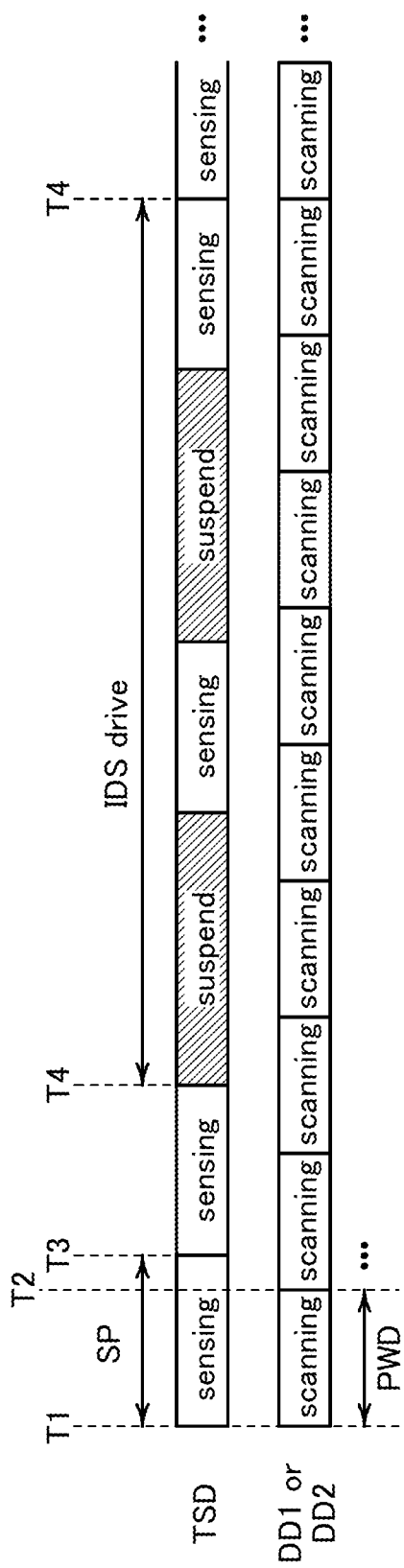

In FIG. 9A, the touch sensor portion TSD keeps the resting state for a long time from Time T4 to Time T5; however, the operation timing of one embodiment of the present invention is not limited thereto. For example, as illustrated in FIG. 9B, in the case where no operation by the user, i.e. no touch, is sensed for a certain period until Time T4, the touch sensor portion TSD may alternate between the resting state (or the long suspended mode) and the sensing operation after Time T4. That is, in FIG. 9B, the drive frequency of the sensing operation of the touch sensor portion TSD after Time T4 is lower than the drive frequency of the sensing operation before Time T4. In Operation Example 3 in Embodiment 1, the IDS driving of the first display device DD1 and/or the second display device DD2 is performed; in this operation example, the IDS driving of the touch sensor portion TSD is performed.

Operation Example 3

Next, the following case will be described: when operations by the user, i.e. touches, are constantly sensed and the IDS driving of the first display device DD1 or the second display device DD2 starts at Time T4, the touch sensor portion TSD driven on the basis of the timing in FIG. 8 transitions to the resting state (long suspended mode).

In the examples of the driving timing illustrated in FIG. 8 and FIG. 10A, the touch sensor portion TSD performs the sensing operation once in one frame period. In FIG. 10A, the sensing operation is performed three times in a period from Time T1 to Time T5.

Here, the following case will be described: when operations by the user, i.e. touches, are constantly sensed until Time T3 and the IDS driving of the first display device DD1 or the second display device DD2 starts at Time T4, the touch sensor portion TSD transitions to the long suspended mode. For example, the IDS driving of the first display device DD1 or the second display device DD2 can be triggered when the graphics processing unit GPU of the electronic device 101 illustrated in FIG. 6 or the electronic device 102 illustrated in FIG. 7 compares the previous frame with the present frame and finds no difference in grayscale or color tone in every pixel. In FIG. 10A, the IDS driving of the first display device DD1 or the second display device DD2 is performed from Time T4 to Time T7.

The operation of the touch sensor portion TSD transitions to the resting state (long suspended mode) after the IDS driving of the first display device DD1 or the second display device DD2 starts. In FIG. 10A, the resting state (long suspended mode) lasts from Time T5 to Time T6.

After Time T6, the touch sensor portion TSD repeats the operation in one frame period as in FIG. 8. In the case where operations by the user, i.e. touches, are constantly sensed and the IDS driving of the first display device DD1 or the second display device DD2 starts, the touch sensor portion TSD transitions to the long suspended mode as in the period from Time T5 to Time T6.

In FIG. 10A, the IDS driving of the first display device DD1 or the second display device DD2 is performed from Time T4 to Time T7; however, the operation timing of one embodiment of the present invention is not limited thereto. As illustrated in FIG. 10B, for example, it is sometimes possible not to perform image rewriting at all when the touch sensor portion TSD is in the long suspended mode, without performing the IDS driving of the first display device DD1 or the second display device DD2. That is, the first display device DD1 or the second display device DD2 may be in the resting state in that period. This operation method is effective in the case where the display element included in the first display device DD1 or the second display device DD2 can retain image data for a long time. In FIG. 10B, the first display device DD1 or the second display device DD2 is in the resting state from Time T4 to Time T7.

Like Operation Example 3 in Embodiment 1, this operation example is effectively used for, for example, applications in which operations by the user, i.e. touches, are constantly sensed and a displayed image does not change, such as e-book reader software, a browser, moving image reproduction software, and a file browser.

The power consumption for the sensing operation in the electronic device 101 or the electronic device 102 can be reduced by applying Operation Examples 1 to 3 to the operation of the electronic device 101 or the electronic device 102.

Note that the operation examples of the electronic device 101 and the electronic device 102 are described in this embodiment; however, the operation examples of this embodiment can also be applied to an on-cell electronic device including a hybrid display device and a touch sensor.

This embodiment can be combined with any of the other embodiments in this specification as appropriate.

Embodiment 3

Figure 11:
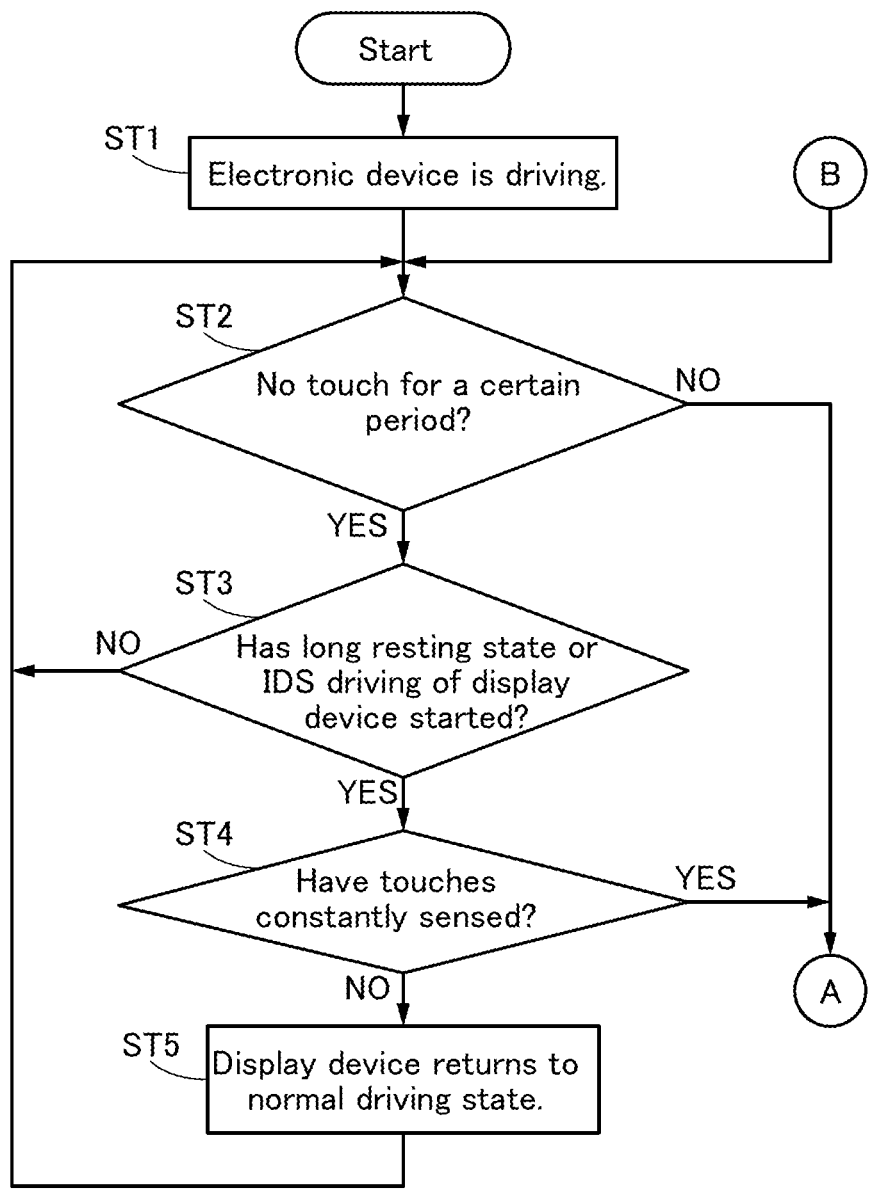
FIG. 11 is a flow chart illustrating an operation example of an electronic device.
Figure 12:
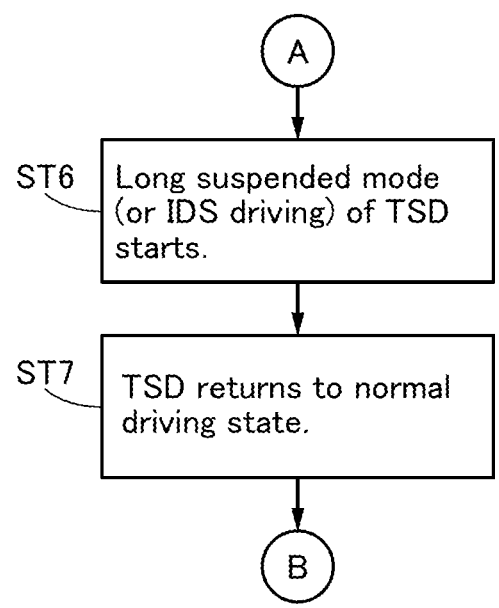
FIG. 12 is a flow chart illustrating an operation example of an electronic device.

The operation examples described in Embodiments 1 and 2 are summarized in flow charts in FIG. 11 and FIG. 12.

A method for driving any of the electronic devices 100 to 102 includes Steps ST1 to ST7. In this embodiment, the general term "electronic device" is used for the electronic devices 100 to 102, and the general term "display device" is used for the first display device DD1 and the second display device DD2 which are included in the electronic device.

Step ST1 includes a step in which the electronic device is driven. Here, the first display device DD1 and/or the second display device DD2 are driven in a normal driving state, and the touch sensor portion TSD is in a normal driving state. After Step ST1 is terminated, the process proceeds to Step ST2.

In Step ST2, whether no touch has been sensed by the touch sensor portion TSD for a certain period is judged. Here, as mentioned in the above embodiment, the certain period refers to time that is arbitrarily determined by the user, time that is preset in the electronic device, or the like. In the case where a touch has been sensed, the process proceeds to "A" in FIG. 11; in the case where no touch has been sensed, the process proceeds to Step ST3.

In Step ST3, whether the long resting state or the IDS driving of the display device has started is judged. As described in the above embodiment, the long resting state or the IDS driving of the display device can be triggered when the graphics processing unit GPU included in the electronic device compares the previous frame with the present frame and finds no difference in grayscale or color tone in every pixel. In the case where the long resting state or the IDS driving of the display device has started, the process proceeds to Step ST4; in the case where the long resting state or the IDS driving of the display device has not started, the process proceeds to Step ST2.

In Step ST4, whether touches have been constantly sensed by the touch sensor portion TSD since before the long resting state or the IDS driving of the display device starts. In the case where touches have been constantly sensed, the process proceeds to "A" in FIG. 11; in the case where no constant touch has been sensed, the process proceeds to Step ST5.

Step ST5 includes a step in which the display device returns from the long resting state or the IDS driving to the normal driving state. After Step ST5 is terminated, the process proceeds to Step ST2.

"A" in FIG. 11 means that the process proceeds to Step ST6 in FIG. 12.

Step ST6 includes a step in which the long suspended mode (or the IDS driving) of the touch sensor portion TSD starts. After Step ST6 is terminated, the process proceeds to Step ST7.

Step ST7 includes a step in which the touch sensor portion TSD returns from the long suspended mode (or the IDS driving) to the normal driving. After Step ST7 is terminated, the process proceeds to "B" in FIG. 12.

"B" in FIG. 12 means that the process proceeds to Step ST2 in FIG. 11.

In a flow chart in this specification and the like, the whole operation method is divided into a plurality of operations corresponding to steps that are independent of each other. However, it is difficult to divide an actual operation method into a plurality of operations; a plurality of operations may relate to one step, or one operation may relate to a plurality of steps. Thus, steps in a flow chart are not limited to operations described in the specification, and the steps can be expressed in a different way depending on the situation.

This embodiment can be combined with any of the other embodiments in this specification as appropriate.

Embodiment 4

In this embodiment, a display device which can be used for the electronic device 100 described in the above embodiment and electronic devices 5200A and 5200B described in Embodiment 5 will be described with reference to FIGS. 13A to 13D, FIGS. 14A to 14D, FIG. 15, FIG. 16, FIGS. 17A to 17D, FIG. 18, and FIG. 19. The display device of this embodiment includes a first display element that reflects visible light and a second display element that emits visible light.

For example, the first display device DD1 includes a matrix of first display elements, and the second display device DD2 includes a matrix of second display elements.

The display device of this embodiment has a function of displaying an image with the use of light reflected from the first display element and/or light emitted from the second display element.

As the first display element, an element which displays an image by reflecting external light can be used. Such an element does not include a light source; thus, power consumption for display can be significantly reduced.

As the first display element, typically, a reflective liquid crystal element can be used. Alternatively, as the first display element, a microelectromechanical systems (MEMS) shutter element, an optical interference type MEMS element, an element to which a microcapsule method, an electrophoretic method, an electrowetting method, or the like is applied, or the like can be used.

As the second display element, a light-emitting element is preferably used. Since the luminance and chromaticity of light emitted from such a display element are less affected by external light, a clear image that has high color reproducibility (wide color gamut) and a high contrast can be displayed.

As the second display element, a self-luminous light-emitting element such as an organic light-emitting diode (OLED), a light-emitting diode (LED), a quantum-dot light-emitting diode (QLED), or a semiconductor laser can be used. Although a self-luminous light-emitting element is preferably used as the second display element, the second display element is not limited thereto; for example, a transmissive liquid crystal element which is combined with a light source such as a backlight or a sidelight may be used.

The display device of this embodiment has a first mode in which an image is displayed using the first display element, a second mode in which an image is displayed using the second display element, and a third mode in which an image is displayed using both the first display element and the second display element. The first to third modes can be switched automatically or manually. The first to third modes will be described in detail below.

[First Mode]

In the first mode, an image is displayed using the first display element and external light. Since a light source is unnecessary in the first mode, power consumed in this drive mode is extremely low. When sufficient external light enters the display device (e.g., in a bright environment), for example, an image can be displayed using light reflected from the first display element. For example, the first mode is effective in the case where external light is white or near-white light with sufficient intensity. The first mode is suitable for displaying text. Furthermore, the use of reflected external light enables eye-friendly display in the first mode, which leads to an effect of reducing eyestrain. Note that the first mode may be referred to as reflective display mode (reflection mode) because display is performed using reflected light.

[Second Mode]

In the second mode, an image is displayed utilizing light emitted from the second display element. Thus, an extremely clear image (with high contrast and high color reproducibility) can be displayed regardless of the illuminance and chromaticity of external light. For example, the second mode is effective in the case where the illuminance is extremely low, e.g., during the night or in a dark room. When a bright image is displayed in a dark environment, a user may feel that the image is too bright. To prevent this, an image with reduced luminance is preferably displayed in the second mode. Thus, excessive brightness can be suppressed, and the power consumption can be reduced. The second mode is suitable for displaying a clear (still and moving) image or the like. Note that the second mode may be referred to as an emissive display mode (emission mode) because display is performed using light emission, i.e. emitted light.

[Third Mode]

In the third mode, display is performed utilizing both light reflected from the first display element and light emitted from the second display element. The display in which the first display element and the second display element are combined can be performed by driving the first display element and the second display element independently of each other in the same period. In this specification and the like, the display in which the first display element and the second display element are combined, i.e. the third mode, can be referred to as a hybrid display mode (HB display mode). Alternatively, the third mode may be referred to as a display mode in which an emissive display mode and a reflective display mode are combined (ER-hybrid mode).

The display in the third mode can be clearer than that in the first mode and can have lower power consumption than that in the second mode. For example, the third mode is effective when the illuminance is relatively low, e.g., under indoor illumination or in the morning or evening, or when the external light does not represent a white chromaticity. Furthermore, the use of mixed light of reflected light and emitted light enables an image like a painting to be displayed.

According to another embodiment of the present invention, for example, a subtitle can be displayed by the first display element, and an image can be displayed by the second display element. In order to display both the image and the subtitle, the display device is driven in the above-described third mode.

In the case where subtitles are not displayed, an image may be displayed by the second display element; thus, the display device may be driven in the above-described second mode. In the case where the illuminance is high, an image may be displayed by the first display element; thus, the display device may be driven not in the second mode but in the first mode.

<Specific Example of First to Third Modes>

Here, a specific example of the case where the above-described first to third modes are employed will be described with reference to FIGS. 13A to 13D and FIGS. 14A to 14D.

Note that the case where the first to third modes are switched automatically in accordance with the illuminance will be described below. In this case, for example, the display mode can be switched in accordance with data from an illuminance sensor or the like provided in the display device.

Figure 13A:
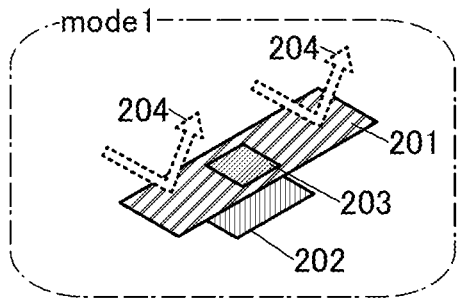
FIGS. 13A to 13D are schematic diagrams illustrating a configuration example of a display device.
Figure 13B:
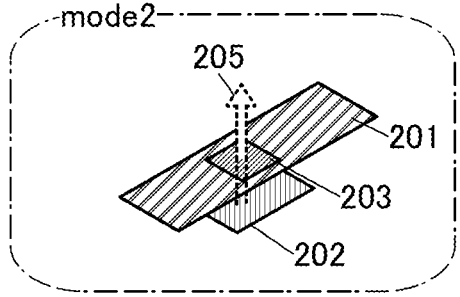
Figure 13C:
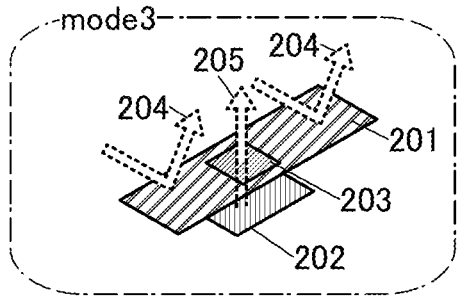

FIGS. 13A to 13C are schematic diagrams of a pixel for describing possible display modes of the display device of this embodiment.

FIGS. 13A to 13C illustrate a first display element 201, a second display element 202, an opening 203, reflected light 204 that is reflected from the first display element 201, and transmitted light 205 emitted from the second display element 202 through the opening 203. Note that FIG. 13A, FIG. 13B, and FIG. 13C are diagrams illustrating a first mode, a second mode, and a third mode, respectively.

FIGS. 13A to 13C illustrate the case where a reflective liquid crystal element is used as the first display element 201 and a self-luminous OLED is used as the second display element 202.

In the first mode illustrated in FIG. 13A, grayscale can be expressed by adjusting the intensity of reflected light with the use of the reflective liquid crystal element, i.e. the first display element 201. For example, as illustrated in FIG. 13A, the intensity of the reflected light 204 reflected from the reflective electrode of the reflective liquid crystal element, i.e. the first display element 201, is adjusted with the liquid crystal layer. In this manner, grayscale can be expressed.

In the second mode illustrated in FIG. 13B, grayscale can be expressed by adjusting the emission intensity of the self-luminous OLED, i.e. the second display element 202. Note that light emitted from the second display element 202 passes through the opening 203 and is extracted to the outside as the transmitted light 205.

The third mode illustrated in FIG. 13C is a display mode in which the first mode and the second mode described above are combined. For example, as illustrated in FIG. 13C, grayscale is expressed by adjusting the intensity of the reflected light 204 reflected from the reflective electrode of the reflective liquid crystal element, i.e. the first display element 201, with the liquid crystal layer. In a period in which the first display element 201 is driven, grayscale is expressed by adjusting the emission intensity of the self-luminous OLED, i.e. the second display element 202, namely the intensity of the transmitted light 205.

<State Transition of First to Third Modes>

Figure 13D:
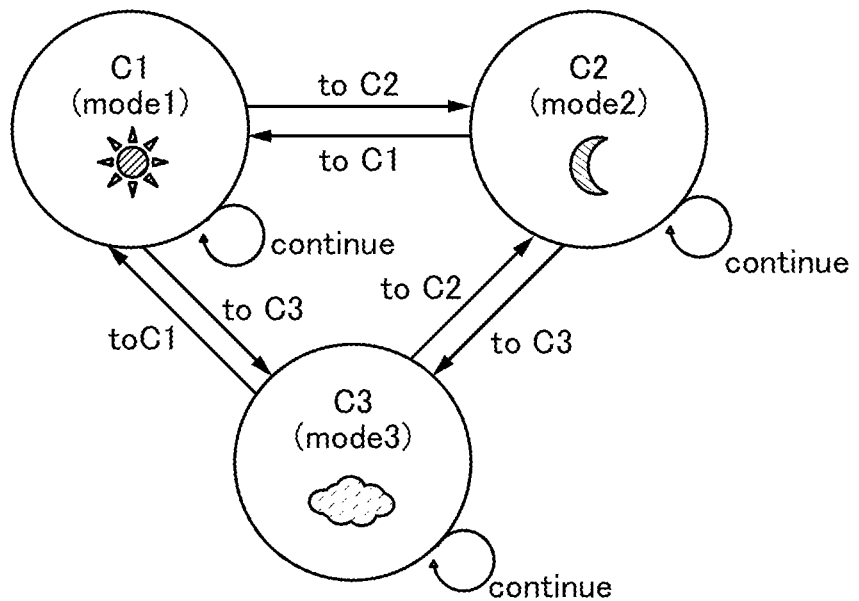

Next, the state transition of the first to third modes will be described with reference to FIG. 13D. FIG. 13D is a state transition diagram of the first mode, the second mode, and the third mode. In FIG. 13D, a state C1, a state C2, and a state C3 correspond to the first mode, the second mode, and the third mode, respectively.

As illustrated in FIG. 13D, the display mode can be selected from the states C1 to C3 in accordance with the illuminance. For example, under high illuminance such as in the day time, the state C1 can be selected. In the case where the illuminance decreases as time passes from day to night, the state C1 transitions to the state C2. Even in the day time, in the case where the illuminance becomes too low to sufficiently express grayscale with reflected light, the state C1 transitions to the state C3. Needless to say, transition from the state C3 to the state C1, transition from the state C2 to the state C3, transition from the state C3 to the state C2, or transition from the state C2 to the state C1 also occurs.

Note that FIG. 13D illustrates the sun, the moon, and a cloud as images representing the first mode, the second mode, and the third mode, respectively.

As illustrated in FIG. 13D, in the case where the illuminance does not change or slightly changes in the states C1 to C3, the present state may be maintained without transitioning to another state.

The above configuration in which the display mode is switched in accordance with the illuminance enables a reduction in the frequency at which grayscale is expressed by the intensity of light of the light-emitting element, which requires a relatively high power consumption. Accordingly, the power consumption of the display device can be reduced. Furthermore, the operation mode of the display device can be switched in accordance with the amount of remaining battery power, the display contents, or the ambient illuminance. Although the case where the display mode is automatically switched in accordance with the illuminance is described above as an example, one embodiment of the present invention is not limited thereto, and a user may switch the display mode manually.

<Operation Mode>

Next, operation modes which can be performed by the first display element and the second display element will be described with reference to FIGS. 14A to 14D.

A normal driving mode (normal mode) with a normal frame frequency (typically, higher than or equal to 60 Hz and lower than or equal to 240 Hz) and an IDS driving mode with a low frame frequency will be described below as examples.

Note that the IDS driving mode refers to a driving method in which after image data is written, rewriting of the image data is stopped. This increases the interval between writing of image data and subsequent writing of image data, thereby reducing the power that would be consumed by writing of image data in that interval. The IDS driving mode can be performed at a frame frequency which is 1/100 to 1/10 of that in the normal driving mode, for example.

Figure 14A:
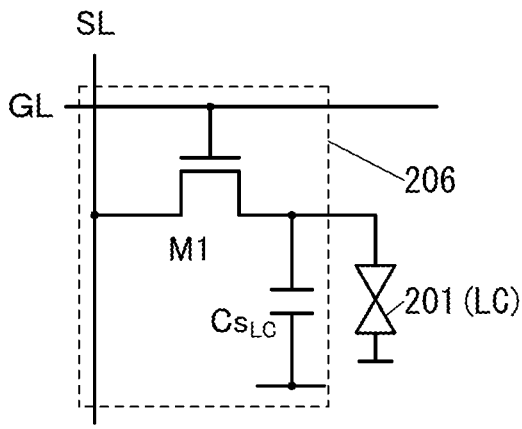
FIGS. 14A to 14D are circuit diagrams and timing charts illustrating a configuration example of a display device.
Figure 14B:
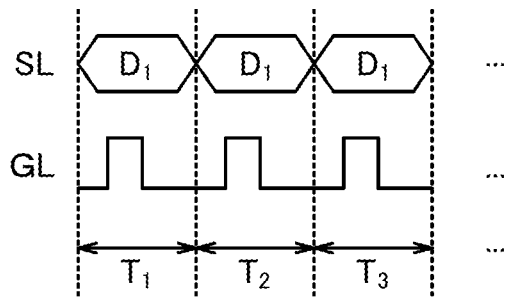
Figure 14C:
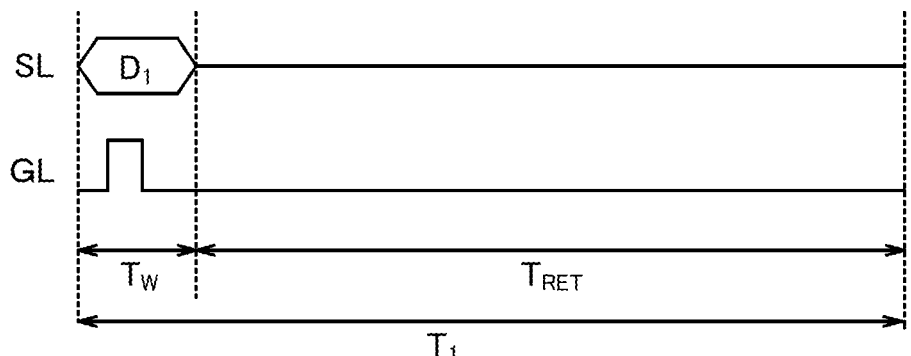

FIGS. 14A to 14C are a circuit diagram and timing charts which illustrate the normal driving mode and the IDS driving mode. Note that FIG. 14A illustrates the first display element 201 (here, a liquid crystal element) and a pixel circuit 206 electrically connected to the first display element 201. In the pixel circuit 206 in FIG. 14A, a signal line SL, a gate line GL, a transistor M1 connected to the signal line SL and the gate line GL, and a capacitor $C_{SLC}$ connected to the transistor M1 are illustrated.

A transistor including a metal oxide in a semiconductor layer is preferably used as the transistor M1. As a typical example of the transistor, a transistor including an oxide semiconductor which is a kind of metal oxide (OS transistor) will be described. The OS transistor has an extremely low leakage current in a non-conduction state (off-state current); therefore, by turning off the OS transistor, charge can be retained in a pixel electrode of the liquid crystal element.

FIG. 14B is a timing chart showing the waveforms of signals supplied to the signal line SL and the gate line GL in the normal driving mode. In the normal driving mode, a normal frame frequency (e.g., 60 Hz) is used for operation. Here, periods $T_1$ to $T_3$ each denote one frame period; in each frame period, a scanning signal is supplied to the gate line GL, and data $D_1$ is written from the signal line SL. This operation is performed both to write the same data $D_1$ in the periods T1 to T3 and to write different data in the periods T1 to T3.

FIG. 14C is a timing chart showing the waveforms of signals supplied to the signal line SL and the gate line GL in the IDS driving mode. In the IDS driving, a low frame frequency (e.g., 1 Hz) is used for operation. One frame period is denoted by a period T1 and includes a data writing period $T_W$ and a data retention period $T_{RET}$. In the IDS driving mode, a scanning signal is supplied to the gate line GL and the data $D_1$ of the signal line SL is written in the period $T_W$, and the gate line GL is fixed to a low-level voltage in the period $T_{RET}$ to turn off the transistor M1 and retain the written data $D_1$.

Note that IDS driving of the second display element can also be performed in some cases.

Figure 14D:
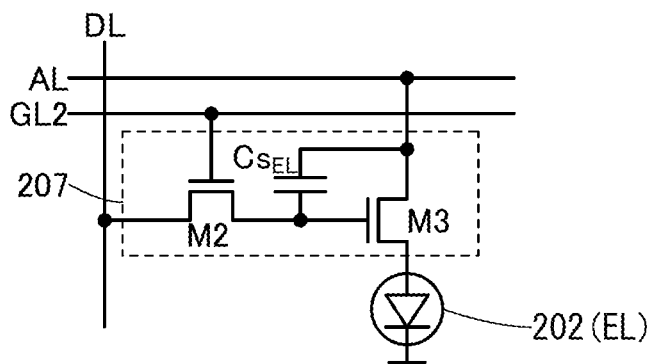

The IDS driving of the second display element will be described. FIG. 14D illustrates the second display element 202 (here, an organic EL element) and a pixel circuit 207 electrically connected to the second display element. In the pixel circuit 207 illustrated in FIG. 14D, a signal line DL, a gate line GL2, a current supply line AL, a transistor M2 electrically connected to the signal line DL and the gate line GL2, a capacitor $C_{SEL}$ electrically connected to the transistor M2 and the current supply line AL, and a transistor M3 electrically connected to the transistor M2, the capacitor $C_{SEL}$, the current supply line AL, and the second display element 202 are illustrated.

The transistor M2 is preferably an OS transistor like the transistor M1. The OS transistor has an extremely low leakage current in a non-conduction state (off-state current); therefore, charge accumulated in the capacitor $C_{SEL}$ can be retained by turning off the OS transistor. In other words, the gate-drain voltage of the transistor M3 can be kept constant, whereby the emission intensity of the second display element 202 can be constant.

Therefore, as in the IDS driving of the first display element, the IDS driving of the second display element is performed as follows: a scanning signal is supplied to the gate line GL2, data is written from the signal line DL, and then, the gate line GL2 is fixed to a low-level voltage to turn off the transistor M2 and retain the written data.

The transistor M3 is preferably formed using a material similar to that of the transistor M2. The use of the same material for the transistor M3 and the transistor M2 can shorten the fabrication process of the pixel circuit 207.

The combination of the IDS driving mode with the aforementioned first to third modes can enhance the effect of reducing the power consumption.

As described above, the display device of this embodiment can perform display by switching between the first to third modes. Thus, an all-weather display device or a highly convenient display device having high visibility regardless of the ambient brightness can be obtained.

The display device of this embodiment preferably includes a plurality of first pixels including first display elements and a plurality of second pixels including second display elements. The first pixels and the second pixels are each preferably arranged in a matrix.

Each of the first pixels and the second pixels can include one or more sub-pixels. The pixel can include, for example, one sub-pixel (e.g., a white (W) sub-pixel), three sub-pixels (e.g., red (R), green (G), and blue (B) sub-pixels), or four sub-pixels (e.g., red (R), green (G), blue (B), and white (W) sub-pixels, or red (R), green (G), blue (B), and yellow (Y) sub-pixels). Note that color elements included in the first and second pixels are not limited to the above examples and may be combined with cyan (C), magenta (M), or the like as necessary.

The display device of this embodiment can be configured to display a full color image with the use of either the first pixels or the second pixels. Alternatively, the display device of this embodiment can be configured to display a black-and-white image or a grayscale image with the use of the first pixels and display a full-color image with the use of the second pixels. The first pixels, which can be used for displaying a black-and-white image or a grayscale image, are suitable for displaying information that need not be displayed in color, such as text information.

<Schematic Perspective View of Display Device>

Figure 15:
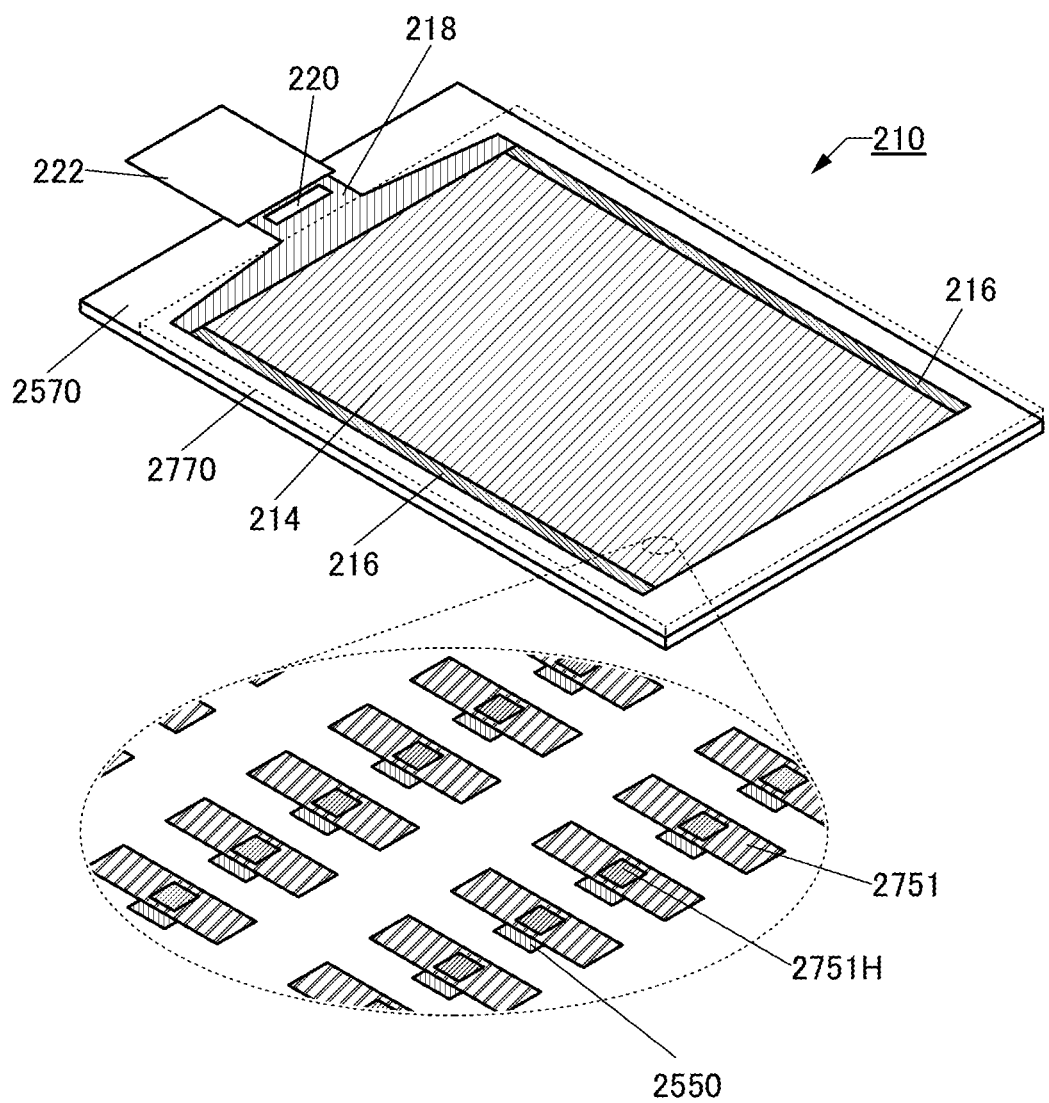
FIG. 15 is a perspective view illustrating an example of a display device.

Next, a display device of this embodiment will be described with reference to FIG. 15. FIG. 15 is a schematic perspective view of a display device 210.

In the display device 210, a substrate 2570 and a substrate 2770 are attached to each other. In FIG. 15, the substrate 2770 is denoted by a dashed line.

The display device 210 includes a display portion 214, a circuit 216, a wiring 218, and the like. FIG. 15 illustrates an example in which the display device 210 is provided with an IC 220 and an FPC 222. Thus, the structure illustrated in FIG. 15 can be regarded as a display module including the display device 210, the IC 220, and the FPC 222.

As the circuit 216, for example, a scan line driver circuit can be used.

The wiring 218 has a function of supplying signals and power to the display portion 214 and the circuit 216. The signals and the power are input to the wiring 218 from the outside through the FPC 222 or from the IC 220.

FIG. 15 illustrates an example in which the IC 220 is provided over the substrate 2570 by a chip on glass (COG)

method or the like. An IC including a scan line driver circuit, a signal line driver circuit, or the like can be used as the IC 220, for example. Note that the display device 210 is not necessarily provided with the IC 220. The IC 220 may be mounted on the FPC by a chip on film (COF) method or the like.

FIG. 15 also shows an enlarged view of part of the display portion 214. In the display portion 214, electrodes 2751 of a plurality of display elements are arranged in a matrix. Each of the electrodes 2751 has a function of reflecting visible light and serves as a reflective electrode of a liquid crystal element, i.e. a first display element 2750 (described later).

Furthermore, as illustrated in FIG. 15, the electrode 2751 includes a region 2751H as an opening. In addition, as a light-emitting element, the display portion 214 includes a second display element 2550 that is positioned closer to the substrate 2570 than the electrode 2751. Light from the second display element 2550 is emitted to the substrate 2770 side through the region 2751H of the electrode 2751. The area of a light-emitting region of the second display element 2550 may be equal to the area of the region 2751H. One of the area of the light-emitting region of the second display element 2550 and the area of the region 2751H is preferably larger than the other because a margin for misalignment can be increased.

<Cross-Sectional View of Input/Output Panel>

Next, a structure of an input/output panel in which a touch sensor is provided in the display device 210 illustrated in FIG. 15 will be described with reference to FIG. 16, FIGS. 17A to 17D, FIG. 18, and FIG. 19. Note that the input/output panel described below is a touch sensor display portion with a full-in-cell structure in which a common electrode of a reflective liquid crystal element serving as a first display element is also used as a touch sensor electrode. In addition, as the touch sensor, a projected capacitive (mutual capacitive) touch sensor is used.

Figure 16:
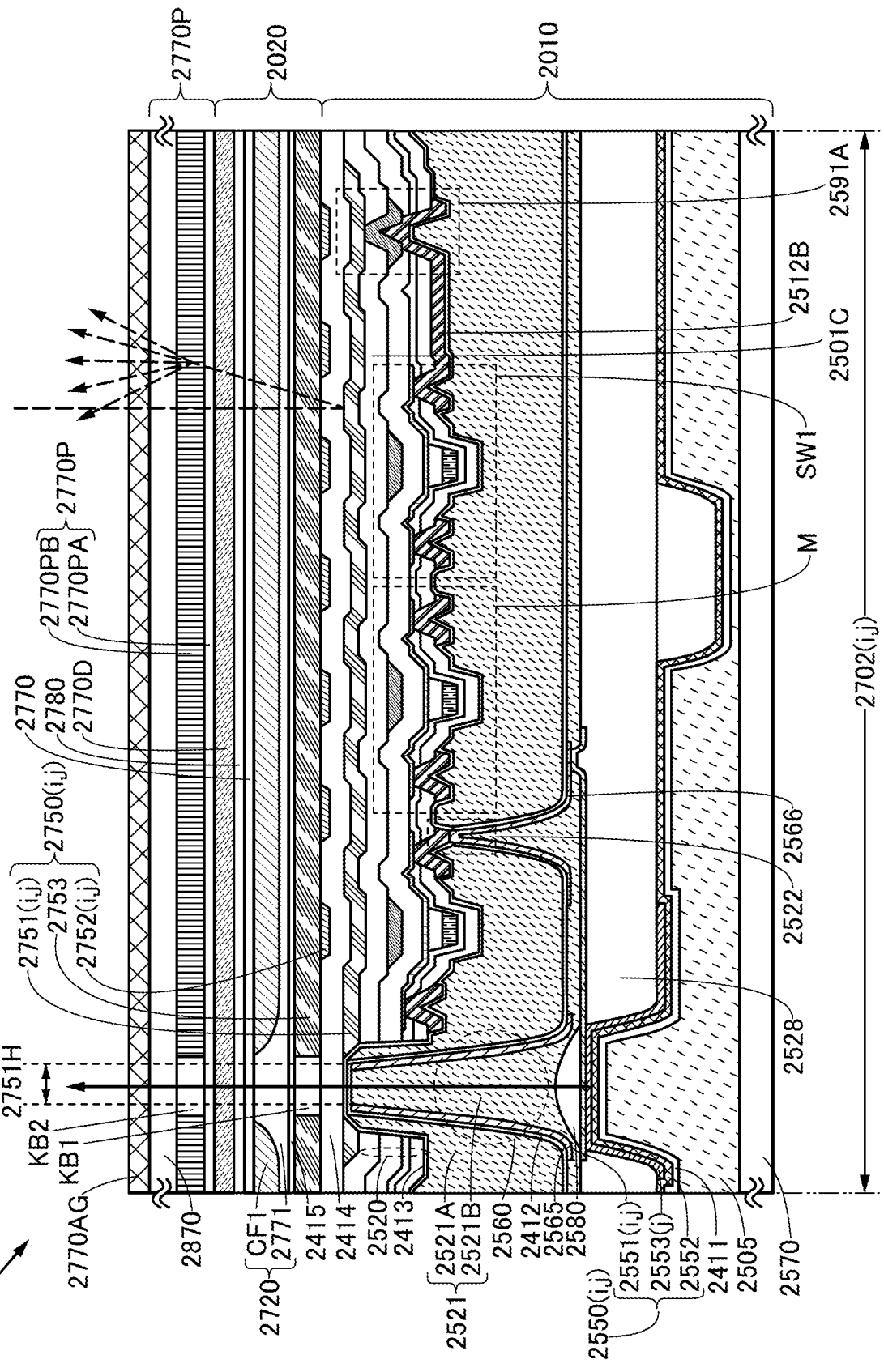
FIG. 16 is a cross-sectional view illustrating a structure example of an input/output panel.

FIG. 16 is a cross-sectional view of a pixel included in an input/output panel 2700TP3.

Figure 17:
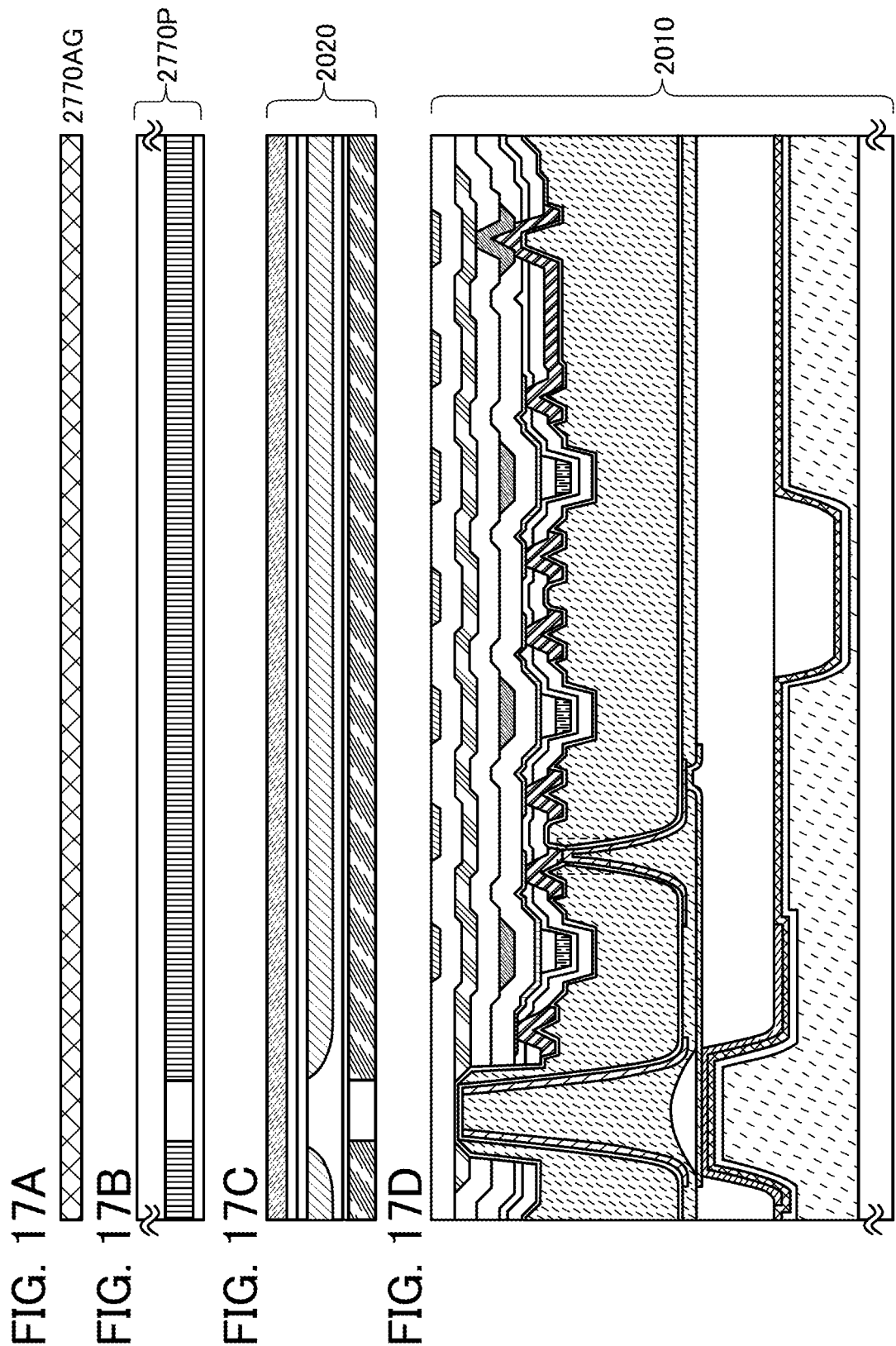
FIGS. 17A to 17D are cross-sectional views illustrating a structure example of an input/output panel.

FIGS. 17A to 17D illustrate the structure of the input/output panel of one embodiment of the present invention. FIG. 17A is a cross-sectional view of an antireflection film (e.g., an antiglare film or a film in which an antireflection film is combined with an antiglare film) illustrated in FIG. 16. FIG. 17B is a cross-sectional view illustrating the structure of a functional film in the input/output panel. FIG. 17C is a cross-sectional view illustrating the structure of a second unit. FIG. 17D is a cross-sectional view illustrating the structure of a first unit.

Figure 18:
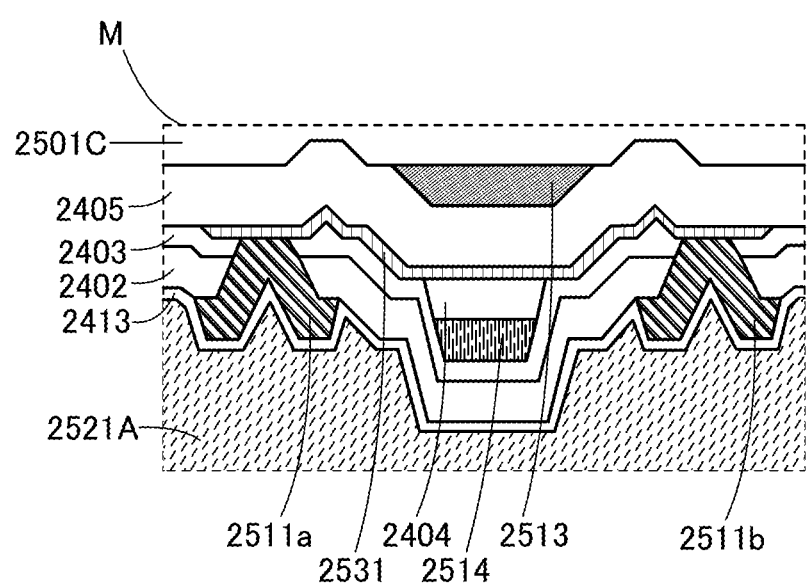
FIG. 18 is a cross-sectional view illustrating a structure example of a transistor included in an input/output panel.

FIG. 18 is an enlarged cross-sectional view of a transistor M included in the input/output panel 2700TP3 in FIG. 16.

Figure 19:
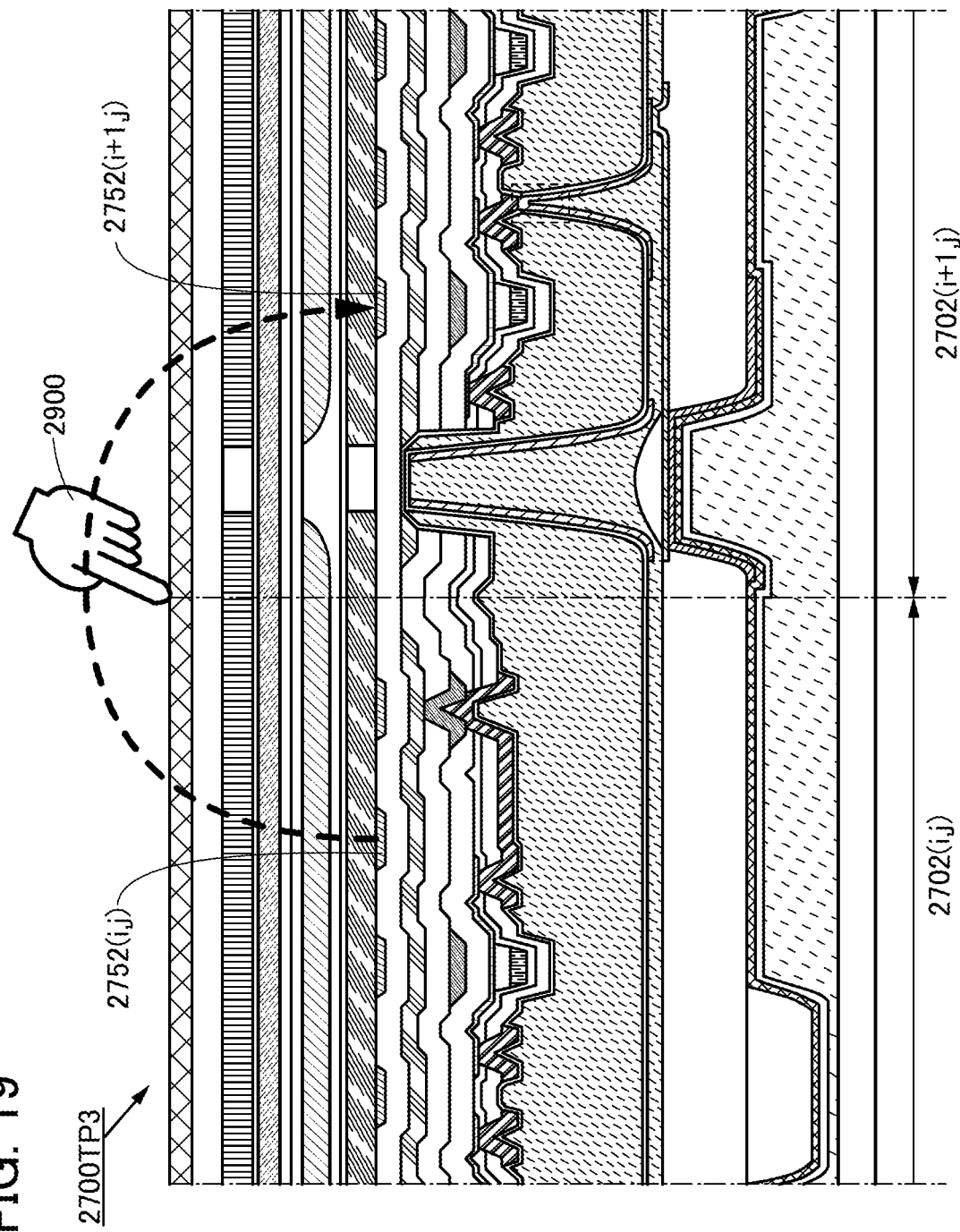
FIG. 19 is a cross-sectional view illustrating an operation example of a touch sensor of an input/output panel.

FIG. 19 is a cross-sectional view of the input/output panel 2700TP3 in FIG. 16 and illustrates the operation of a touch sensor portion included in the input/output panel 2700TP3.

The input/output panel 2700TP3 shown in this structure example includes a pixel $2702(i,j)$ (see FIG. 16). The input/output panel 2700TP3 includes a first unit 2010, a second unit 2020, and a functional film 2770P (see FIGS. 17A to 17D). The first unit 2010 includes a functional layer 2520, and the second unit 2020 includes a functional layer 2720.

<<Pixel $2702(i,j)$>>

The pixel $2702(i,j)$ includes part of the functional layer 2520, a first display element $2750(i,j)$, and a second display element $2550(i,j)$ (see FIG. 16).

The functional layer 2520 includes a first conductive film, a second conductive film, an insulating film 2501C, an insulating film 2413, and a pixel circuit (see FIG. 18). The pixel circuit includes the transistor M, for example. The functional layer 2520 includes an optical element 2560, a covering film 2565, an insulating film 2412, and a lens 2580. The functional layer 2520 includes part of an insulating film 2521. A stack of an insulating film 2521A and an insulating film 2521B can be used as the insulating film 2521.

For example, a material with a refractive index of approximately 1.55 can be used for the insulating film 2521A or the insulating film 2521B. Alternatively, a material with a refractive index of approximately 1.6 can be used for the insulating film 2521A or the insulating film 2521B. Alternatively, an acrylic resin or polyimide can be used for the insulating film 2521A or the insulating film 2521B.

The insulating film 2501C includes a region positioned between the first conductive film and the second conductive film and has an opening 2591A.

The first conductive film is electrically connected to the first display element $2750(i,j)$. Specifically, the first conductive film is electrically connected to an electrode $2751(i,j)$ of the first display element $2750(i,j)$. The electrode $2751(i,j)$ can be used as the first conductive film.

The second conductive film includes a region overlapping with the first conductive film. The second conductive film is electrically connected to the first conductive film in the opening 2591A. For example, the conductive film 2512B can be used as the second conductive film. The second conductive film is electrically connected to the pixel circuit. For example, a conductive film which functions as a source electrode or a drain electrode of a transistor used as a switch SW1 of the pixel circuit can be used as the second conductive film. Note that the first conductive film which is electrically connected to the second conductive film in the opening 2591A provided in the insulating film 2501C can be referred to as a through electrode.

The insulating film 2413 includes a region positioned between the pixel circuit and the insulating film 2521A and has an opening in a connection portion 2522.

It is preferable that the insulating film 2413 transmit light and have a function of preventing entry of an impurity which affects the pixel circuit, such as water or hydrogen. For the insulating film 2413, for example, silicon nitride or silicon nitride oxide is preferably used.

The insulating film 2412 includes a region positioned between the insulating film 2521A and the insulating film 2521B and has an opening in the connection portion 2522.

It is preferable that the insulating film 2412, which is positioned between the insulating film 2521A and the insulating film 2521B, transmit light and have a function of preventing entry of an impurity which affects the pixel circuit, such as water or hydrogen. For the insulating film 2412, for example, silicon nitride or silicon nitride oxide is preferably used.

A conductive film 2566 can be formed using the same material as the covering film 2565 described later.

The second display element $2550(i,j)$ is electrically connected to the pixel circuit. The second display element $2550(i,j)$ has a function of emitting light toward the functional layer 2520. For example, the second display element $2550(i,j)$ has a function of emitting light toward the lens 2580 or the optical element 2560.

The second display element $2550(i,j)$ is provided so that the display using the second display element $2550(i,j)$ can be perceived from part of a region from which the display using the first display element $2750(i)$ can be perceived. For example, the electrode $2751(i,j)$ of the first display element $2750(i,j)$ includes the region 2751H in which light emitted from the second display element $2550(i,j)$ is not blocked.

Note that dashed arrows in FIG. 16 denote the directions in which external light is incident on and reflected from the first display element $2750(i,j)$ that displays image data by controlling the intensity of external light reflection. In addition, a solid arrow in FIG. 16 denotes the direction in which the second display element $2550(i,j)$ emits light to the part of the region from which the display using the first display element $2750(i,j)$ can be perceived.

Accordingly, the display using the second display element can be perceived from the part of the region from which the display using the first display element can be perceived. Alternatively, a user can perceive the display without changing the orientation or the like of the input/output panel. Alternatively, an object color expressed by light reflected from the first display element and a light source color expressed by light emitted from the second display element can be combined. Alternatively, an object color and a light source color can be used to display an image like a painting. Thus, a novel input/output panel that is highly convenient or reliable can be provided.

For example, the first display element $2750(i,j)$ includes the electrode $2751(i,j)$, an electrode $2752(i,j)$, and layer 2753 containing a liquid crystal material. Note that the first display element $2750(i,j)$ includes an insulating film 2414, although its reference numeral is not written in the closing curly bracket denoting the first display element $2750(i,j)$. Specifically, a reflective liquid crystal element can be used as the first display element $2750(i,j)$.

The electrode $2752(i,j)$ is provided so that an electric field which extends in the direction intersecting the thickness direction of the layer 2753 containing a liquid crystal material is formed between the electrode $2751(i,j)$ and the electrode $2752(i,j)$. For example, the electrode $2752(i,j)$ can have a comb-like shape, in which case an electric field which extends in the direction intersecting the thickness direction of the layer 2753 containing a liquid crystal material can be formed between the electrode $2751(i,j)$ and the electrode $2752(i,j)$. Alternatively, as the first display element, a display element which operates in a vertical alignment in-plane-switching (VA-IPS) mode can be used, for example.

For example, a transparent conductive film with a refractive index of approximately 2.0 can be used for the electrode $2752(i,j)$ or the electrode $2751(i,j)$. Specifically, an oxide containing indium, tin, and silicon can be used for the electrode $2752(i,j)$ or the electrode $2751(i,j)$. Alternatively, a material with a refractive index of approximately 1.6 can be used for an alignment film. The dielectric anisotropy of the liquid crystal layer is preferably greater than or equal to 2 and less than or equal to 3.8, and the resistivity of the liquid crystal layer is preferably higher than or equal to $1.0 \times 10^{14}$ $\Omega \cdot cm$ and lower than or equal to $1.0 \times 10^{15}$ $\Omega \cdot cm$. In this case, the IDS driving can be performed, and the power consumption of the input/output panel can be reduced.

The insulating film 2414 includes a region positioned between the electrode $2751(i,j)$ and the electrode $2752(i,j)$. It is preferable that the insulating film 2414 transmit light and have a function of preventing entry of an impurity which affects the pixel circuit, such as water or hydrogen. For the insulating film 2414, for example, silicon nitride or silicon nitride oxide is preferably used.

For example, the second display element $2550(i,j)$ includes an electrode $2551(i,j)$, an electrode 2552, and a layer 25530) containing a light-emitting material. Note that the second display element $2550(i,j)$ includes an insulating film 2411, although its reference numeral is not written in the opening curly bracket denoting the second display element $2550(i,j)$. The electrode 2552 includes a region overlapping with the electrode $2551(i,j)$. The layer $2553(j)$ containing a light-emitting material includes a region positioned between the electrode $2551(i,j)$ and the electrode 2552. The electrode $2551(i,j)$ is electrically connected to the pixel circuit in the connection portion 2522. Specifically, an organic EL element can be used as the second display element $2550(i,j)$.

For example, a transparent conductive film with a refractive index of approximately 2.0 can be used for the electrode $2551(i,j)$. Specifically, an oxide containing indium, tin, and silicon can be used for the electrode $2551(i,j)$. Alternatively, a material with a refractive index of approximately 1.8 can be used for the layer $2553(j)$ containing a light-emitting material.

It is preferable that the insulating film 2411 transmit light and have a function of preventing entry of an impurity which affects the pixel circuit, such as water or hydrogen. For the insulating film 2411, for example, silicon nitride, silicon nitride oxide, or aluminum oxide is preferably used, and further preferably, a stacked film of any of these materials is used.

The optical element 2560 transmits light and includes a first region, a second region, and a third region.

The first region includes a region to which visible light is supplied from the second display element $2550(i,j)$, the second region includes a region in contact with the covering film 2565, and the third region has a function of emitting part of visible light. The third region has an area which is smaller than or equal to the area of the region of the first region to which visible light is supplied.

The covering film 2565 reflects visible light and has a function of reflecting part of visible light and supplying it to the third region.

For example, a metal can be used for the covering film 2565. Specifically, a material containing silver can be used for the covering film 2565. For example, a material containing silver, palladium, and the like or a material containing silver, copper, and the like can be used for the covering film 2565.

Note that a region between the first display element $2750(i,j)$ and the second display element $2550(i,j)$ has a thickness of less than 30 μm, preferably less than 10 μm, further preferably less than 5 μm.

<<Transistor M>>

The transistor M has a dual-gate structure including a first gate electrode and a second gate electrode (see FIG. 18).

The transistor M includes the insulating film 2521A, the insulating film 2413, a conductive film $2511a$, a conductive film $2511b$, an insulating film 2402, an insulating film 2403, a conductive film 2514, an insulating film 2404, a semiconductor film 2531, an insulating film 2405, a conductive film 2513, and the insulating film 2501C.

The insulating film 2521A, the insulating film 2413, and the insulating film 2501C are described in other parts of this specification; therefore, description of these films are omitted here.

The conductive film $2511a$ functions as one of a source electrode and a drain electrode of the transistor M, and the conductive film $2511b$ functions as the other of the source electrode and the drain electrode.

A metal such as aluminum, titanium, chromium, nickel, copper, yttrium, zirconium, molybdenum, silver, tantalum, or tungsten, or an alloy containing the metal as its main component can be used for the conductor film $2511a$ and the conductive film $2511b$. In particular, a metal nitride film such as a tantalum nitride film is preferable because it has a barrier property against hydrogen or oxygen and has a high oxidation resistance.

The conductive film 2511a and the conductive film 2511b can be formed using the same material as the conductive film 2512B or the second conductive film, for example.

Although the drawing illustrates a single-layer structure, the conductive film 2511a and the conductive film 2511b may each have a stacked structure of two or more layers. For example, a tantalum nitride film and a tungsten film may be stacked. Alternatively, a titanium film and an aluminum film may be stacked. Other examples include a two-layer structure in which an aluminum film is stacked over a tungsten film, a two-layer structure in which a copper film is stacked over a copper-magnesium-aluminum alloy film, a two-layer structure in which a copper film is stacked over a titanium film, and a two-layer structure in which a copper film is stacked over a tungsten film.

The conductive film 2514 functions as a first gate electrode (simply referred to as a gate electrode in some cases) of the transistor M, and the conductive film 2513 functions as a second gate electrode (referred to as a back gate electrode in some cases) of the transistor M.

The conductive film 2514 can be formed using, for example, a metal selected from aluminum, chromium, copper, tantalum, titanium, molybdenum, and tungsten, an alloy containing the metal as a component, or an alloy containing any of these metals in combination. In particular, a metal nitride film such as a tantalum nitride film is preferable because it has a barrier property against hydrogen or oxygen and has a high oxidation resistance. Furthermore, manganese and/or zirconium may be used. Alternatively, a semiconductor typified by polycrystalline silicon doped with an impurity element such as phosphorus, or a silicide such as nickel silicide may be used. Although the drawing illustrates a single-layer structure, a stacked structure of two or more layers may be employed.

For example, a two-layer structure in which a titanium film is stacked over an aluminum film is preferably employed. Other examples include a two-layer structure in which a titanium film is stacked over a titanium nitride film, a two-layer structure in which a tungsten film is stacked over a titanium nitride film, and a two-layer structure in which a tungsten film is stacked over a tantalum nitride film or a tungsten nitride film.

Another example is a three-layer structure in which a titanium film, an aluminum film, and a titanium film are stacked in this order. Alternatively, an alloy film or a nitride film which contains aluminum and one or more metals selected from titanium, tantalum, tungsten, molybdenum, chromium, neodymium, and scandium may be used.

The conductive film 2514 can also be formed using a light-transmitting conductive material such as indium tin oxide, indium oxide containing tungsten oxide, indium zinc oxide containing tungsten oxide, indium oxide containing titanium oxide, indium tin oxide containing titanium oxide, indium zinc oxide, or indium tin oxide to which silicon oxide is added. The conductive film 2514 can have a stacked structure containing any of the above light-transmitting conductive materials and any of the above metals.

As the conductive film 2513, for example, a metal film containing an element selected from molybdenum, titanium, tantalum, tungsten, aluminum, copper, chromium, neodymium, and scandium or a metal nitride film containing the element as a component (e.g., a tantalum nitride film, a titanium nitride film, a molybdenum nitride film, or a tungsten nitride film) can be used. In particular, a metal nitride film such as a tantalum nitride film is preferable because it has a barrier property against hydrogen or oxygen and is difficult to oxidize (has a high oxidation resistance). It is also possible to use a conductive material such as indium tin oxide, indium oxide containing tungsten oxide, indium zinc oxide containing tungsten oxide, indium oxide containing titanium oxide, indium tin oxide containing titanium oxide, indium zinc oxide, or indium tin oxide to which silicon oxide is added. Although the drawing illustrates a single-layer structure, a stacked structure of two or more layers may be employed.

Furthermore, the conductive film 2513 may be formed using the same material as a conductive film which electrically connects the first conductive film to the second conductive film in the opening 2591A.

The semiconductor film 2531 includes a region in which a channel of the transistor M is formed. A metal oxide described in Embodiment 6, particularly a CAC-OS, is preferably used for the semiconductor film 2531.

In the case where the semiconductor film 2531 includes a metal oxide, an insulating film containing oxygen, such as a silicon oxide film or a silicon oxynitride film, is preferably used as each of the insulating films 2402 to 2405. In particular, the insulating film 2403 is preferably formed using an insulator containing excess oxygen (containing oxygen in excess of that in the stoichiometric composition). When such an insulator containing excess oxygen is provided in contact with the semiconductor film 2531 which includes a metal oxide, oxygen vacancies in the semiconductor film 2531 can be compensated. Note that the insulating films 2402 to 2405 are not necessarily formed using the same material.

The insulating film 2404 can have a single-layer structure or a stacked structure using an insulator containing silicon oxide, silicon oxynitride, silicon nitride oxide, aluminum oxide, hafnium oxide, tantalum oxide, zirconium oxide, lead zirconate titanate (PZT), strontium titanate ($SrTiO_3$), (Ba, Sr)$TiO_3$ (BST), or the like. Alternatively, aluminum oxide, bismuth oxide, germanium oxide, niobium oxide, silicon oxide, titanium oxide, tungsten oxide, yttrium oxide, or zirconium oxide may be added to the insulator, for example. Alternatively, the insulator may be subjected to nitriding treatment. Silicon oxide, silicon oxynitride, or silicon nitride may be stacked over the above insulator.

As in the case of the insulating film 2403, an oxide insulator which contains more oxygen than the stoichiometric composition is preferably used for the insulating film 2404. When such an insulator containing excess oxygen is provided in contact with the semiconductor film 2531 which includes a metal oxide, oxygen vacancies in the semiconductor film 2531 can be reduced.

As the insulating film 2404, an insulating film which is formed of aluminum oxide, aluminum oxynitride, gallium oxide, gallium oxynitride, yttrium oxide, yttrium oxynitride, hafnium oxide, hafnium oxynitride, silicon nitride, or the like and has a barrier property against oxygen or hydrogen can be used. The insulating film 2404 formed of such a material functions as a layer that prevents release of oxygen from the semiconductor film 2531 which includes a metal oxide and entry of an impurity such as hydrogen from the outside.

Note that the insulating film 2404 may have a structure similar to that of the insulating film 2402, the insulating film 2403, or the insulating film 2405. Although the drawing illustrates a single-layer structure, the insulating films 2402 to 2405 may each have a stacked structure of two or more layers.

Note that the structure of the input/output panel 2700TP3 is not limited to the structure example illustrated in FIG. 16, FIGS. 17A to 17D, FIG. 18, and FIG. 19, in which the channel formation region of the transistor M includes a metal oxide. For example, a transistor whose channel formation region includes silicon may be used as the transistor M.

<<Lens 2580>>

A material that transmits visible light can be used for the lens 2580. Alternatively, a material with a refractive index of greater than or equal to 1.3 and less than or equal to 2.5 can be used for the lens 2580. For example, an inorganic material or an organic material can be used for the lens 2580.

For example, a material containing an oxide or a sulfide can be used for the lens 2580.

Specifically, cerium oxide, hafnium oxide, lanthanum oxide, magnesium oxide, niobium oxide, tantalum oxide, titanium oxide, yttrium oxide, zinc oxide, an oxide containing indium and tin, an oxide containing indium, gallium, and zinc, or the like can be used for the lens 2580. Alternatively, zinc sulfide or the like can be used for the lens 2580.

For example, a material containing a resin can be used for the lens 2580. Specifically, a resin into which chlorine, bromine, or iodine is introduced, a resin into which heavy metal atoms are introduced, a resin into which an aromatic ring is introduced, a resin into which sulfur is introduced, or the like can be used for the lens 2580. Alternatively, a stack of a resin and a resin having a higher refractive index than the resin can be used for the lens 2580. The resin having a higher refractive index may contain nanoparticles. Titanium oxide, zirconium oxide, or the like can be used for the nanoparticles.

<<Functional Layer 2720>>

The functional layer 2720 includes a region positioned between the substrate 2770 and an insulating film 2415. The functional layer 2720 includes an insulating film 2771 and a coloring film CF1.

The coloring film CF1 includes a region positioned between the substrate 2770 and the first display element 2750(i,j).

The insulating film 2771 includes a region positioned between the coloring film CF1 and the layer 2753 containing a liquid crystal material. The insulating film 2771 can reduce unevenness due to the thickness of the coloring film CF1. Furthermore, the insulating film 2771 can prevent impurities from diffusing from the coloring film CF1 or the like into the layer 2753 containing a liquid crystal material.

For example, an acrylic resin with a refractive index of approximately 1.55 can be used for the insulating film 2771.

The insulating film 2415 includes a region positioned between the insulating film 2771 and the layer 2753 containing a liquid crystal material.

It is preferable that the insulating film 2415 transmit light and have a function of preventing entry of an impurity which affects the pixel circuit, such as water or hydrogen. For the insulating film 2415, for example, silicon nitride or silicon nitride oxide is preferably used.

<<Substrate 2570, Substrate 2770, and Substrate 2870>>

The input/output panel described in this embodiment includes the substrate 2570, the substrate 2770, and a substrate 2870.

The substrate 2770 includes a region overlapping with the substrate 2570 and the substrate 2870. The substrate 2770 includes a region in which the functional layer 2520 is positioned between the substrate 2770 and the substrate 2570.

The substrate 2770 includes a region overlapping with the first display element 2750(i,j). For example, a material with low birefringence can be used for the region.

For example, a resin material with a refractive index of approximately 1.5 can be used for the substrate 2770.

The substrate 2870 includes a region in which functional films 2770P and 2770D are positioned between the substrate 2770 and the substrate 2870.

The substrate 2870 includes a region overlapping with the first display element 2750(i,j). For example, a material with low birefringence can be used for the region.

Note that the substrate 2870 is not necessarily provided in the input/output panel 2700TP3.

<<Bonding Layer 2505>>

The input/output panel described in this embodiment also includes a bonding layer 2505.

The bonding layer 2505 includes a region positioned between the functional layer 2520 and the substrate 2570 and has a function of bonding the functional layer 2520 and the substrate 2570 together.

<<Structure Body KB1 and Structure Body KB2>>

The input/output panel described in this embodiment also includes a structure body KB1 and a structure body KB2.

The structure body KB1 has a function of providing a certain space between the functional layer 2520 and the substrate 2770. The structure body KB1 includes a region overlapping with the region 2751H and has a light-transmitting property. Thus, light emitted from the second display element 2550(i,j) can be supplied to one surface of the structure body KB1 and extracted through the other surface of the structure body KB1.

Furthermore, the structure body KB1 includes a region overlapping with the optical element 2560 and is formed using a material whose refractive index is different from that of a material used for the optical element 2560 by 0.2 or less, for example. Thus, light emitted from the second display element can be efficiently utilized. The area of the second display element can be increased. The density of a current flowing to the organic EL element can be reduced.

The structure body KB2 has a function of controlling the thickness of a polarizing layer 2770PB to a predetermined thickness. The structure body KB2 includes a region overlapping with the second display element 2550(i,j) and has a light-transmitting property.

Alternatively, a material that transmits light of a predetermined color can be used for the structure body KB1 or the structure body KB2. Thus, the structure body KB1 or the structure body KB2 can be used as a color filter, for example. For example, a material that transmits blue, green, or red light can be used for the structure body KB1 or the structure body KB2. A material that transmits yellow light, white like, or the like can be used for the structure body KB1 or the structure body KB2.

Specifically, polyester, polyolefin, polyamide, polyimide, polycarbonate, polysiloxane, an acrylic resin, or the like, a composite material of a plurality of resins selected from these resins, or the like can be used for the structure body KB1 or the structure body KB2. Alternatively, a photosensitive material may be used.

For example, an acrylic resin with a refractive index of approximately 1.5 can be used for the structure body KB1. In addition, an acrylic resin with a refractive index of approximately 1.55 can be used for the structure body KB2.

<<Functional Film 2770D, Functional Film 2770P, Functional Film 2770AG, and the Like>>

The input/output panel 2700TP3 described in this embodiment includes the functional film 2770D, the functional film 2770P, and a functional film 2770AG.

The functional film 2770D includes a region overlapping with the first display element 2750(i,j). The functional film 2770D includes a region in which the first display element 2750(i,j) is positioned between the functional film 2770D and the functional layer 2520.

For example, a light diffusion film can be used as the functional film 2770D. Specifically, a material with a columnar structure having an axis along the direction intersecting a surface of a base can be used for the functional film 2770D. In this case, light can be easily transmitted in the direction along the axis and scattered in other directions. For example, light reflected from the first display element 2750(i,j) can be diffused.

A bonding layer 2780 includes a region positioned between the functional film 2770D and the substrate 2770. Thus, the second unit 2020 can be formed.

The functional film 2770P includes the polarizing layer 2770PB, a retardation film 2770PA, and the structure body KB2. The polarizing layer 2770PB includes an opening, and the retardation film 2770PA includes a region overlapping with the polarizing layer 2770PB. Note that the structure body KB2 is provided in the opening.

For example, a dichromatic pigment, a liquid crystal material, and a resin can be used for the polarizing layer 2770PB. The polarizing layer 2770PB has a polarization property. In this case, the functional film 2770P can be used as a polarizing plate.

The polarizing layer 2770PB includes a region overlapping with the first display element 2750(i,j), and the structure body KB2 includes a region overlapping with the second display element 2550(i,j). Thus, a liquid crystal element can be used as the first display element. For example, a reflective liquid crystal element can be used as the first display element. Light emitted from the second display element can be extracted efficiently. The density of a current flowing to the organic EL element can be reduced. The reliability of the organic EL element can be increased.

For example, an antireflection film, a polarizing film, or a retardation film can be used for the functional film 2770P. Specifically, a film containing a dichromatic pigment and a retardation film can be used for the functional film 2770P.

Furthermore, an antistatic film preventing the attachment of a foreign substance, a water repellent film suppressing the attachment of stain, a hard coat film suppressing a scratch in use, or the like can be used for the functional film 2770P.

For example, a material with a refractive index of approximately 1.6 can be used for the diffusion film. In addition, a material with a refractive index of approximately 1.6 can be used for the retardation film 2770PA.

For example, an antireflection film can be used as the functional film 2770AG. In the case where an antireflection film is used for the functional film 2770P, an antireflection film is not necessarily provided as the functional film 2770AG. Examples of the functional film 2770AG include an antiglare film and a film serving as both an antireflection film and an antiglare film. The functional film 2770AG is not necessarily provided in the input/output panel 2700TP3.

<<Operation Method of Touch Sensor>>

Next, a touch sensor function of the input/output panel 2700TP3 will be described.

As described above, in a full-in-cell touch sensor display portion, a sensing operation of a touch sensor is performed using a common electrode of a reflective liquid crystal element which is a first display element as a touch sensor electrode of a touch sensor portion.

A mutual capacitive touch sensor senses a touch by sensing a change in the capacitance value of a capacitor included in the touch sensor.

Here, a pair of touch sensor electrodes (common electrodes) of the capacitor corresponds to the electrode 2752(i,j) included in the pixel 2702(i,j) and an electrode 2752(i+1,j) included in a pixel 2702(i+1,j) (see FIG. 19).

In FIG. 19, an electric field formed by the electrode 2752(i,j) and the electrode 2752(i+1,j) is denoted by a thick dashed arrow. Here, the electrode 2752(i,j) has a higher potential than the electrode 2752(i+1,j), and the formed electric field is directed from the electrode 2752(i,j) to the electrode 2752(i+1,j).

To form such an electric field, a wiring which is electrically connected to the electrode 2752(i,j) and a wiring which is electrically connected to the electrode 2752(i+1,j) are preferably provided so as to extend in different directions. For example, the wiring which is electrically connected to the electrode 2752(i,j) and the wiring which is electrically connected to the electrode 2752(i+1,j) are preferably provided so to as to intersect at right angles. Note that a preferred wiring method will be described in detail in Embodiment 7.

FIG. 19 illustrates a state in which an object 2900 touches the input/output panel 2700TP3. In FIG. 19, a hand is illustrated as the object 2900, and a finger touches the input/output panel 2700TP3; however, the object 2900 may be a stylus pen or the like instead of the hand (finger).

Note that this embodiment can be combined with any of the other embodiments in this specification as appropriate.

Embodiment 5

In this embodiment, a method for operating a hybrid display device which is different from the method in Embodiment 4 will be described.

Operation Example 1

Figure 20A:
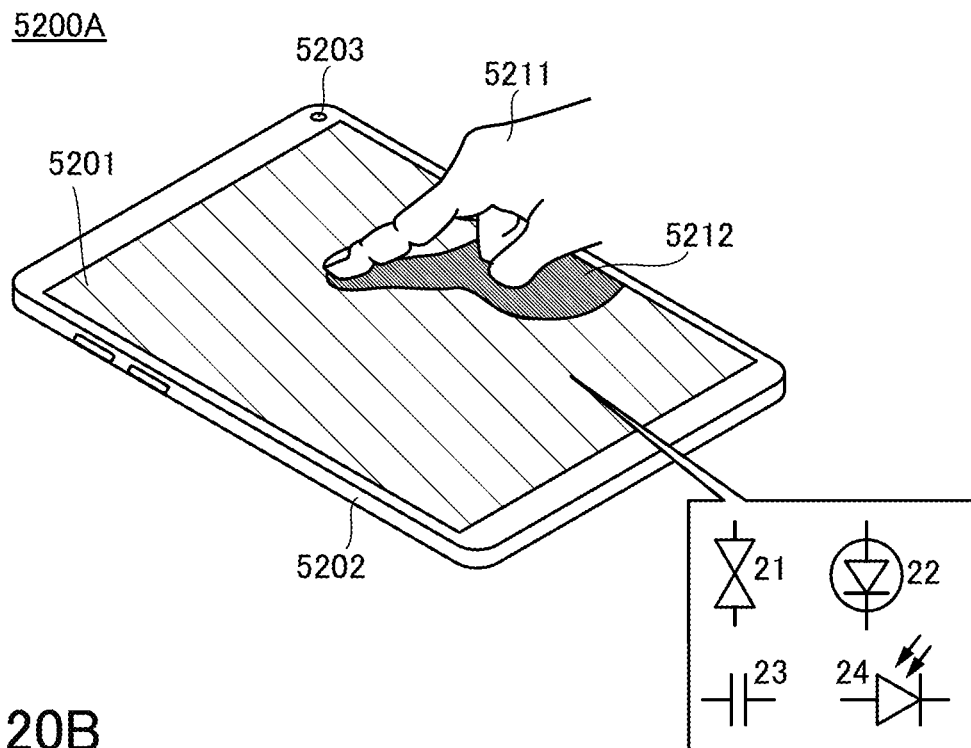
FIGS. 20A and 20B are perspective views illustrating electronic devices.

An electronic device including a hybrid display device and a touch sensor portion will be described. FIG. 20A illustrates a tablet information terminal as an example of the electronic device including a hybrid display device and a touch sensor portion.

The electronic device 5200A includes a display portion 5201, a housing 5202, and an illuminance sensor 5203. The display portion 5201 includes the touch sensor portion. Therefore, the display portion 5201 can be referred to as a touch sensor display portion. The illuminance sensor 5203 has a function of measuring the illuminance of external light and is provided for automatic switching between the first to third modes described in Embodiment 4.

The display portion 5201 further includes a reflective liquid crystal element 21 and a light-transmitting element 22 as components of the hybrid display device. In the case where the display portion 5201 includes a capacitive touch sensor portion, a capacitor 23 is provided.

The electronic device 5200A is operated in such a manner that an image content displayed on the display portion 5201 is touched with a finger, a stylus, or the like. For example, FIG. 20A illustrates a state in which a hand 5211 of a user operates the electronic device 5200A.

When the user operates the electronic device 5200A, however, a shadow 5212 of the hand 5211 of the user may be cast on the display portion 5201. In particular, when the electronic device 5200A is used in an environment with bright external light, i.e. either in the first mode or the third mode, the cast shadow 5212 may become darker.

When the shadow 5212 of the hand 5211 of the user is cast on the display portion 5201, an image displayed on the display portion 5201 is difficult to see in some cases. In contrast, when the hand 5211 hides the shadow 5212 from the user's eyes, the user does not mind the shadow 5212 cast on the display portion 5201 in some cases.

Thus, in a preferred configuration of the electronic device 5200A, a portion of an image displayed on the display portion 5201, which is in the shadow 5212 and is not perceived by the user, is not displayed or is displayed with an intentionally reduced quality. In this manner, a portion of an image which is in the shadow 5212 and is not perceived by the user is not displayed on the display portion 5201, or the luminance of the portion of the image in the shadow 5212 is reduced; accordingly, the power consumption of the electronic device 5200A can be reduced.

As a method for obtaining such a configuration, an illuminance sensor may be provided in a pixel of the display portion 5201.

Illuminance information for automatic switching between the first to third modes described in Embodiment 4 is obtained by the illuminance sensor 5203. However, the illuminance of the above-described portion in the shadow 5212 cast on the display portion 5201 is preferably measured by an illuminance sensor 24 in each pixel of the display portion 5201. Note that FIG. 20A illustrates a photodiode as the illuminance sensor. Then, the information on the shadow 5212 may be transmitted to a processor included in the electronic device 5200A, and the processor may generate an image so that a portion of the image in the shadow 5212 is not displayed or the luminance of the portion of the image in the shadow 5212 is reduced.

For example, in the case where the electronic device 5200A is driven in the first mode according to information on the illuminance measured by the illuminance sensor 5203, the electronic device 5200A may be driven in the following manner: in a portion of the display portion 5201, which is perceived as being in the shadow 5212 by the illuminance sensor 24 in each pixel, the image is not displayed or the luminance of the image is reduced.

For example, in the case where the electronic device 5200A is driven in the third mode according to information on the illuminance measured by the illuminance sensor 5203, the electronic device 5200A may be driven in the following manner: in a portion of the display portion 5201, which is perceived as being in the shadow 5212 by the illuminance sensor 24 in each pixel, the image is not displayed or the operation in the first mode is performed.

Operation Example 2

Next, an operation method that is different from the above-described operation method will be described. For the description of the different operation example, an electronic device that is different from the electronic device 5200A will be used. The electronic device 5200B illustrated in FIG. 20B has substantially the same structure as the electronic device 5200A, except that the illuminance sensor 24 in the pixel is not provided.

Figure 20B:
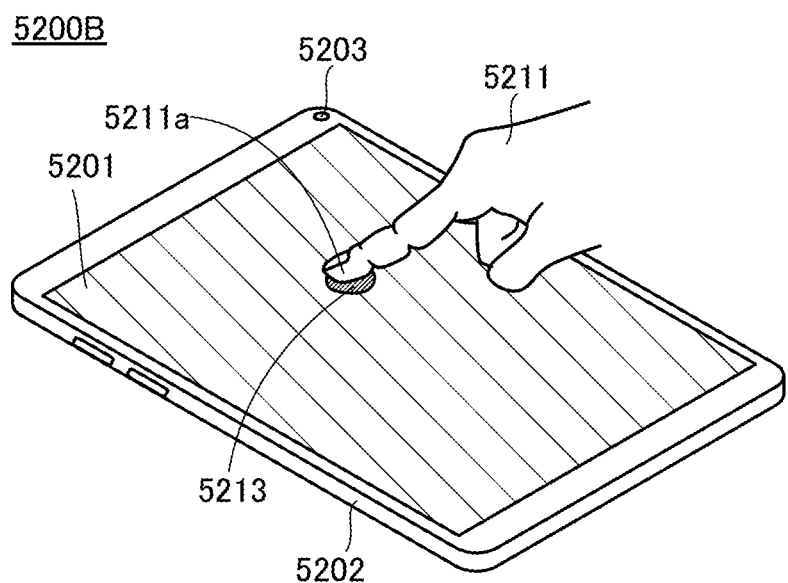

The electronic device 5200B is operated in such a manner that an image content displayed on the display portion 5201 is touched with a finger, a stylus, or the like. For example, FIG. 20B illustrates a state in which the hand 5211 of the user operates the electronic device 5200B.

When the user operates the electronic device 5200B, a region 5213 which is touched by a finger 5211*a* of the hand 5211 of the user is formed in the display portion 5201. Since the region 5213 is hidden by the finger 5211*a*, an image displayed in the region 5213 is not perceived by the user.

Thus, in a preferred configuration of the electronic device 5200B, a portion of an image displayed on the display portion 5201, which is in the region 5213 and is not perceived by the user, is not displayed or is displayed with an intentionally reduced quality. In this manner, a portion of an image which is in the region 5213 and is not perceived by the user is not displayed on the display portion 5201, or the luminance of the portion of the image in the region 5213 is reduced; accordingly, the power consumption of the electronic device 5200B can be reduced.

Such a configuration can be obtained using the touch sensor portion provided in the display portion 5201. During the operation of the electronic device 5200B, a region in which a touch is sensed by the touch sensor portion may be judged to be the region 5213, the information on the region 5213 may be transmitted to a processor or the like included in the electronic device 5200B, and the processor may generate an image so that the portion of the image in the region 5213 is not displayed or the luminance of the portion of the image in the region 5213 is reduced.

For example, in the case where the electronic device 5200B is driven in the first mode or the second mode according to information on the illuminance measured by the illuminance sensor 5203, the electronic device 5200B may be driven in the following manner: in a portion of the display portion 5201, which is perceived as the region 5213 by the touch sensor portion, the image is not displayed or the luminance of the image is reduced.

For example, in the case where the electronic device 5200B is driven in the third mode according to information on the illuminance measured by the illuminance sensor 5203, the electronic device 5200B may be driven in the following manner: in a portion of the display portion 5201, which is perceived as the region 5213 by the touch sensor portion, the image is not displayed or the operation in the first mode is performed.

Note that this embodiment can be combined with any of the other embodiments in this specification as appropriate.

Embodiment 6

Described in this embodiment is a metal oxide that can be used for a transistor disclosed in this specification. In particular, details about a metal oxide and a cloud-aligned composite (CAC) will be described below.

A CAC-OS or a CAC metal oxide has a conducting function in a part of the material and has an insulating function in another part of the material; as a whole material, the CAC-OS or the CAC metal oxide has a semiconductor function. In the case where the CAC-OS or the CAC metal oxide is used for a channel formation region of a transistor, the conducting function allows electrons (or holes) serving as carriers to flow, and the insulating function prevents electrons serving as carriers from flowing. By the complementary effects of the conducting function and the insulating function, the CAC-OS or the CAC metal oxide can have a switching function (on/off function). In the CAC-OS or the CAC metal oxide, separation of the functions can maximize each function.

The CAC-OS or the CAC metal oxide includes conductive regions and insulating regions. The conductive regions have the above-described conducting function, and the insulating regions have the above-described insulating function. In some cases, the conductive regions and the insulating regions in the material are separated at the nanoparticle level. In some cases, the conductive regions and the insulating regions are unevenly distributed in the material. In some cases, conductive regions which are connected together like clouds and the boundaries therebetween are blurred are observed.

Furthermore, in the CAC-OS or the CAC metal oxide, the conductive regions and the insulating regions each have a size of greater than or equal to 0.5 nm and less than or equal to 10 nm, preferably greater than or equal to 0.5 nm and less than or equal to 3 nm and are dispersed in the material, in some cases.

The CAC-OS or the CAC metal oxide includes components having different bandgaps. For example, the CAC-OS or the CAC metal oxide includes a component having a wide gap due to the insulating region and a component having a narrow gap due to the conductive region. In the case of such a composition, carriers mainly flow in the component having a narrow gap. The component having a narrow gap complements the component having a wide gap, and carriers also flow in the component having a wide gap in conjunction with the component having a narrow gap. Therefore, in the case where the above-described CAC-OS or the CAC metal oxide is used for a channel formation region of a transistor, the transistor in the on state can have a high current drive capability, that is, a high on-state current and a high field-effect mobility.

In other words, the CAC-OS or the CAC metal oxide can also be called a matrix composite or a metal matrix composite. Thus, the CAC-OS may also be called a cloud-aligned composite OS.

The CAC-OS is, for example, a metal oxide material with a composition in which elements are unevenly distributed in regions each having a size of greater than or equal to 0.5 nm and less than or equal to 10 nm, preferably greater than or equal to 1 nm and less than or equal to 2 nm, or a similar size. In the following description of a metal oxide, the state in which one or more metal elements are unevenly distributed in regions each having a size of greater than or equal to 0.5 nm and less than or equal to 10 nm, preferably greater than or equal to 1 nm and less than or equal to 2 nm, or a similar size and the regions including the metal element(s) are mixed is referred to as a mosaic pattern or a patch-like pattern.

Note that the metal oxide preferably contains at least indium. In particular, indium and zinc are preferably contained. In addition, one or more elements selected from aluminum, gallium, yttrium, copper, vanadium, beryllium, boron, silicon, titanium, iron, nickel, germanium, zirconium, molybdenum, lanthanum, cerium, neodymium, hafnium, tantalum, tungsten, magnesium, and the like may be contained.

As an example of the CAC-OS, an In—Ga—Zn oxide with the CAC composition (such an In—Ga—Zn oxide may be particularly referred to as CAC-IGZO) will be described. The CAC-IGZO has a composition with a mosaic pattern in which materials are separated into indium oxide ($InO_{X1}$, where X1 is a real number greater than 0) or indium zinc oxide ($In_{X2}Zn_{Y2}O_{Z2}$, where X2, Y2, and Z2 are each a real number greater than 0) and gallium oxide ($GaO_{X3}$, where X3 is a real number greater than 0) or gallium zinc oxide ($Ga_{X4}Zn_{Y4}O_{Z4}$, where X4, Y4, and Z4 are each a real number greater than 0), for example. Furthermore, $InO_{X1}$ or $In_{X2}Zn_{Y2}O_{Z2}$ forming the mosaic pattern is evenly distributed in the film. This composition is also referred to as a cloud-like composition.

That is, the CAC-OS is a composite metal oxide with a composition in which a region including $GaO_{X3}$ as a main component and a region including $In_{X2}Zn_{Y2}O_{Z2}$ or $InO_{X1}$ as a main component are mixed. In this specification, for example, when the atomic ratio of In to an element M in a first region is larger than the atomic ratio of In to the element M in a second region, the first region has a higher In concentration than the second region.

Note that a compound containing In, Ga, Zn, and O is known as IGZO. Typical examples of IGZO include a crystalline compound represented by $InGaO_3(ZnO)_{m1}$ (m1 is a natural number) and a crystalline compound represented by $In_{(1+x0)}Ga_{(1-x0)}O_3(ZnO)_{m0}$ ($-1 \le x0 \le 1$; m0 is a given number).

The above crystalline compounds have a single crystal structure, a polycrystalline structure, or a c-axis-aligned crystalline (CAAC) structure. Note that the CAAC structure is a crystal structure in which a plurality of IGZO nanocrystals has c-axis alignment and is connected in the a-b plane direction without alignment.

On the other hand, the CAC-OS relates to the material composition of a metal oxide. In part of the material composition of a CAC-OS containing In, Ga, Zn, and O, nanoparticle regions including Ga as a main component and nanoparticle regions including In as a main component are observed. These nanoparticle regions are randomly dispersed in a mosaic pattern. Therefore, the crystal structure is a secondary element for the CAC-OS.

Note that the CAC-OS does not include a stacked structure of two or more films with different compositions. For example, a two-layer structure of a film including In as a main component and a film including Ga as a main component is not included.

A boundary between the region including $GaO_{X3}$ as a main component and the region including $In_{X2}Zn_{Y2}O_{Z2}$ or $InO_{X1}$ as a main component is not clearly observed in some cases.

In part of the composition of a CAC-OS which contains, instead of gallium, one or more metal elements selected from aluminum, yttrium, copper, vanadium, beryllium, boron, silicon, titanium, iron, nickel, germanium, zirconium, molybdenum, lanthanum, cerium, neodymium, hafnium, tantalum, tungsten, magnesium, and the like, nanoparticle regions including the metal element(s) as a main component(s) and nanoparticle regions including In as a main component are observed. These nanoparticle regions are randomly dispersed in a mosaic pattern.

The CAC-OS can be formed by a sputtering method under conditions where a substrate is not heated intentionally, for example. In the case of forming the CAC-OS by a sputtering method, one or more gases selected from an inert gas (typically, argon), an oxygen gas, and a nitrogen gas may be used as a deposition gas. The ratio of the flow rate of an oxygen gas to the total flow rate of the deposition gas at the time of deposition is preferably as low as possible; for example, the flow ratio of an oxygen gas is preferably higher than or equal to 0% and lower than 30%, further preferably higher than or equal to 0% and lower than or equal to 10%.

The CAC-OS is characterized in that no clear peak is observed in measurement using θ/2θ scan by an out-of-plane method, which is an X-ray diffraction (XRD) measurement method. That is, XRD shows no alignment in the a-b plane direction and the c-axis direction in a measured region.

In an electron diffraction pattern of the CAC-OS which is obtained by irradiation with an electron beam with a probe diameter of 1 nm (also referred to as a nanometer-sized electron beam), a ring-like region with high luminance and a plurality of bright spots in the ring-like region are observed. Therefore, the electron diffraction pattern indicates that the crystal structure of the CAC-OS includes a nanocrystal (nc) structure with no alignment in the plan-view direction and the cross-sectional direction.

For example, an energy dispersive X-ray spectroscopy (EDX) mapping image confirms that an In—Ga—Zn oxide with the CAC composition has a structure in which regions including $GaO_{X3}$ as a main component and regions including $In_{X2}Zn_{Y2}O_{Z2}$ or $InO_{X1}$ as a main component are unevenly distributed and mixed.

The CAC-OS has a structure and characteristics different from those of an IGZO compound in which metal elements are evenly distributed. That is, in the CAC-OS, regions including $GaO_{X3}$ or the like as a main component and regions including $In_{X2}Zn_{Y2}O_{Z2}$ or $InO_{X1}$ as a main component are phase-separated from each other in a mosaic pattern.

The conductivity of the region including $In_{X2}Zn_{Y2}O_{Z2}$ or $InO_{X1}$ as a main component is higher than that of the region including $GaO_{X3}$ or the like as a main component. In other words, when carriers flow through the region including $In_{X2}Zn_{Y2}O_{Z2}$ or $InO_{X1}$ as a main component, the oxide semiconductor exhibits conductivity. Accordingly, when the regions including $In_{X2}Zn_{Y2}O_{Z2}$ or $InO_{X1}$ as a main component are distributed like clouds in the oxide semiconductor, a high field-effect mobility ($\mu$) can be achieved.

In contrast, the insulating property of the region including $GaO_{X3}$ or the like as a main component is higher than that of the region including $In_{X2}Zn_{Y2}O_{Z2}$ or $InO_{X1}$ as a main component. In other words, when the regions including $GaO_{X3}$ or the like as a main component are distributed in the oxide semiconductor, leakage current can be suppressed and favorable switching operation can be achieved.

Accordingly, when a CAC-OS is used for a semiconductor element, the insulating property derived from $GaO_{X3}$ or the like and the conductivity derived from $In_{X2}Zn_{Y2}O_{Z2}$ or $InO_{X1}$ complement each other, whereby a high on-state current ($I_{on}$) and a high field-effect mobility ($\mu$) can be achieved.

A semiconductor element including a CAC-OS has a high reliability. Thus, the CAC-OS is suitably used for a variety of semiconductor devices typified by a display.

This embodiment can be combined with any of the other embodiments in this specification as appropriate.

Embodiment 7

Figure 21:
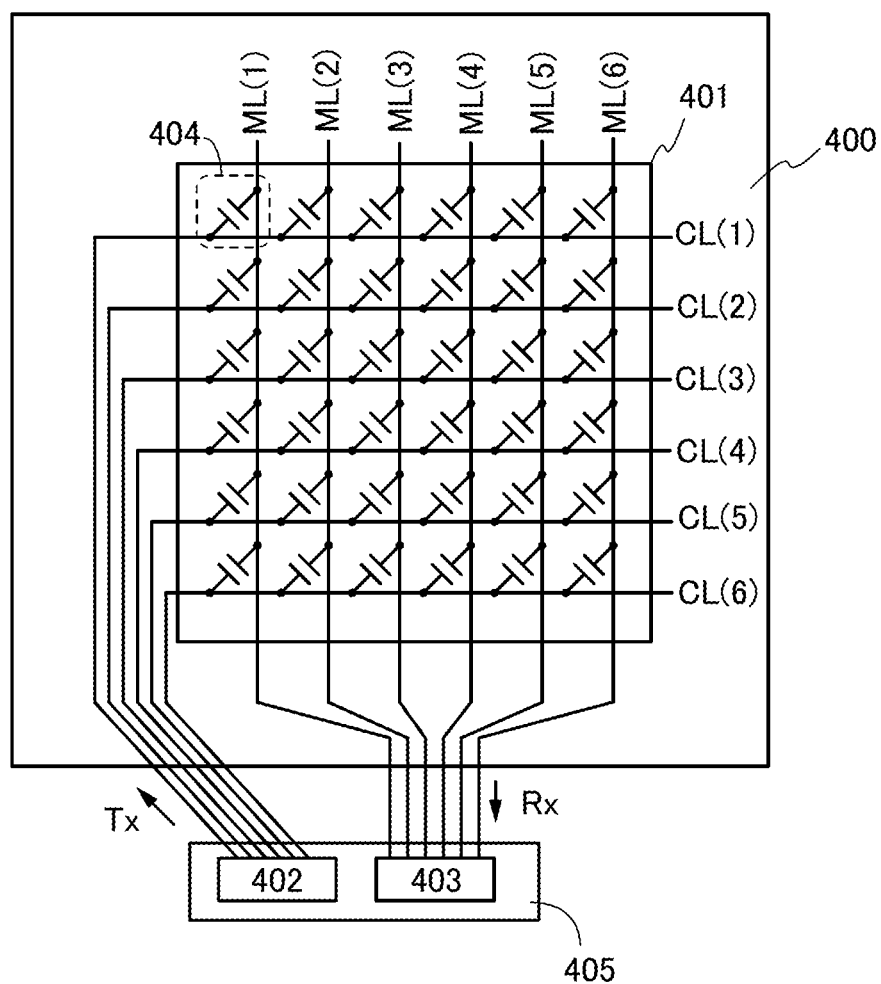
FIG. 21 is a circuit block diagram illustrating a configuration example of a touch panel.

In this embodiment, a configuration example of the touch sensor portion (also referred to as a touch sensor, a touch panel, or the like in some cases) mentioned in the above embodiment will be described. Note that in this embodiment, a projected capacitive (mutual capacitive) touch panel will be described.
<Block Diagram>
FIG. 21 is a block diagram illustrating a configuration example of a touch panel 400 that is a mutual capacitive touch panel. The touch panel 400 includes a sensing region 401. The sensing region 401 includes a wiring CL and a wiring ML.

In FIG. 21, for example, six wirings CL(1) to CL(6) represent the wiring CL to which a pulse voltage is applied, and six wirings ML(1) to ML(6) represent the wiring ML which senses a change in current. Note that the number of wirings is not limited thereto. FIG. 21 also illustrates a capacitor 404 that is formed of the wiring CL and the wiring ML which overlap with each other or are arranged close to each other.

When an object (e.g., a finger or a stylus) approaches or touches the sensing region 401, the capacitance value of the capacitor 404 changes; thus, the touch panel 400 senses a touch.

The touch panel 400 is electrically connected to a touch panel IC 405 through the wiring CL and the wiring ML. The touch panel IC 405 includes a driver circuit 402 and a sensing circuit 403.

The driver circuit 402 is electrically connected to the touch panel 400 through the wiring CL. The driver circuit 402 has a function of outputting a signal Tx. As the driver circuit 402, a shift register circuit and a buffer circuit can be used in combination, for example.

The sensing circuit 403 is electrically connected to the touch panel 400 through the wiring ML. The sensing circuit 403 senses a signal Rx to determine whether the touch panel 400 has been touched. The sensing circuit 403 can include an amplifier circuit and an analog-digital converter (ADC), for example. The sensing circuit 403 has a function of converting an analog signal output from the touch panel 400 to a digital signal and outputting the digital signal to an application processor.
<Top View>
Next, a specific configuration example of the touch panel 400 will be described with reference to FIGS. 22A to 22C and FIGS. 23A and 23B.

Figure 22A:
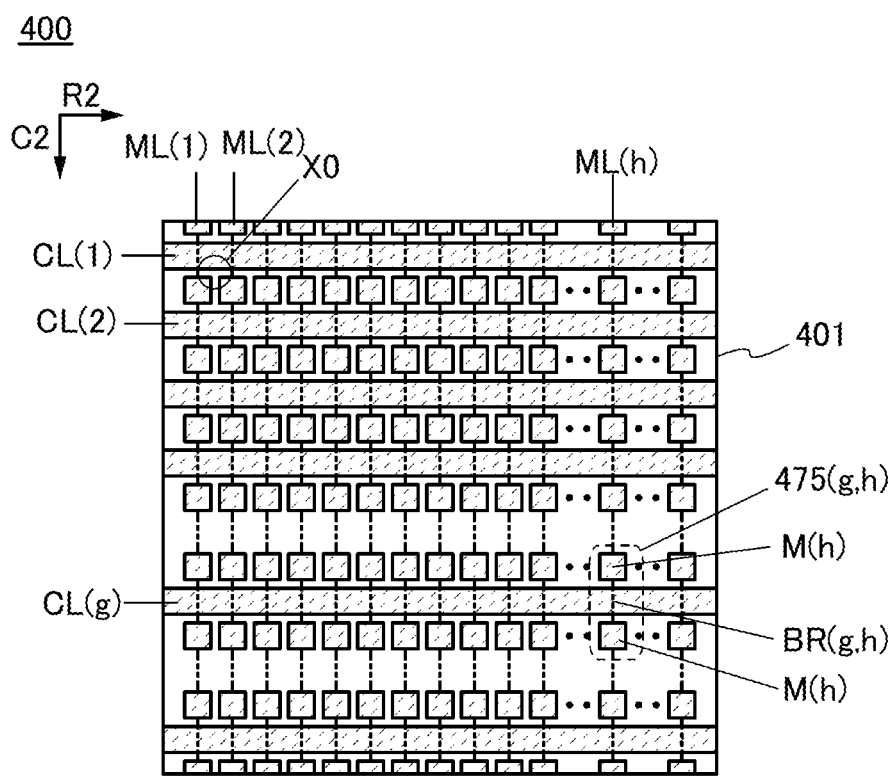
FIGS. 22A to 22C are a top view and perspective views illustrating a configuration example of a touch panel.
Figure 22B:
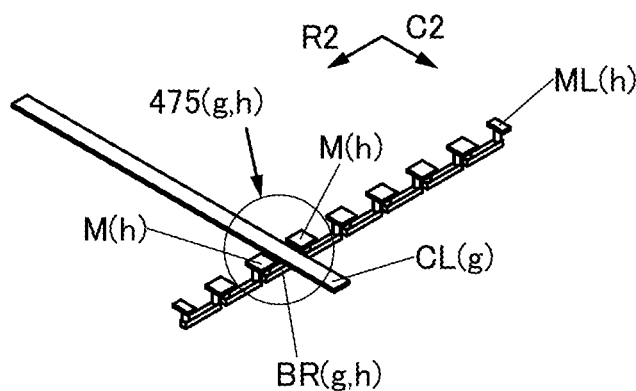
Figure 22C:
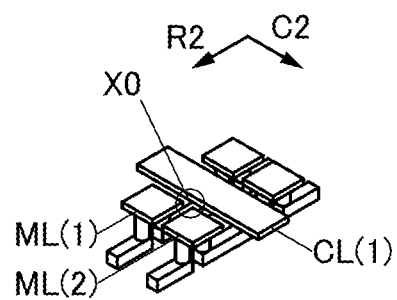

FIG. 22A is a top view of the touch panel 400. FIGS. 22B and 22C are each a perspective view illustrating part of FIG. 22A.

Figure 23A:
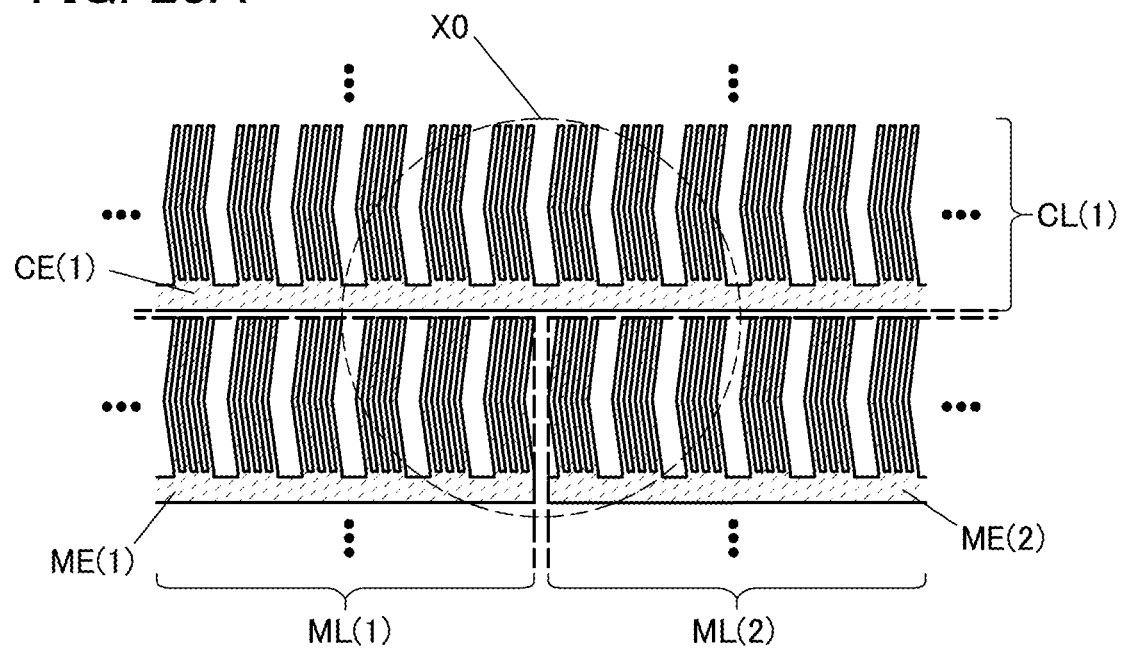
FIGS. 23A and 23B are a top view and a perspective view illustrating a configuration example of a touch panel.
Figure 23B:
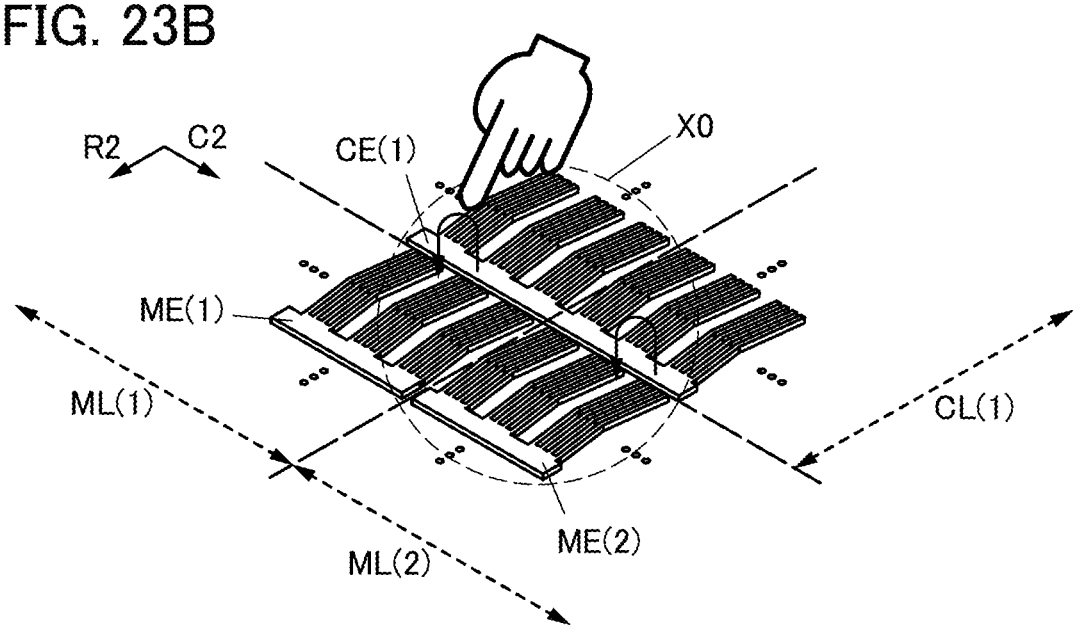

FIG. 23A is a top view of a portion in which a control line and a sensing signal line are adjacent to each other. FIG. 23B is a perspective view that schematically illustrates an electric field generated in the adjoining portion.

The touch panel 400 includes the sensing region 401. The sensing region 401 includes a wiring CL(g), a wiring ML(h), and a conductive film (see FIG. 22A). Note that g and h are each an integer of 2 or more.

For example, a conductive film divided into a plurality of regions can be used for the sensing region 401 (see FIG. 22A). This enables the same potential or different potentials to be supplied to the plurality of regions.

Specifically, a conductive film can be divided into a conductive film that can be used as the wiring CL(g) and a conductive film that can be used as the wiring ML(h) to be used for the sensing region 401. The conductive films obtained by dividing a conductive film into a plurality of regions can each have a comb-like shape, for example (see an electrode CE(1), an electrode ME(1), and an electrode ME(2) in FIGS. 23A and 23B). In this manner, the divided conductive films can be used as electrodes of sensing elements.

For example, a conductive film that can be used as the wiring CL(1), a conductive film that can be used as the wiring ML(1), and a conductive film that can be used as the wiring ML(2), which are obtained by dividing a conductive film, are adjacent to each other in an adjoining portion X0 (see FIGS. 22A and 22C and FIGS. 23A and 23B).

A sensing element 475(g,h) is electrically connected to the wiring CL(g) and the wiring ML(h) (see FIG. 22A).

The wiring CL(g) has a function of supplying a control signal (Tx), and the wiring ML(h) has a function of receiving a sensing signal (Rx).

The wiring ML(h) includes a conductive film BR(g,h) (see FIG. 22B). The conductive film BR(g,h) includes a region overlapping with the wiring CL(g).

Note that the sensing element 475(g,h) includes an insulating film. The insulating film includes a region positioned between the wiring ML(h) and the conductive film BR(g,h). Thus, a short circuit between the wiring ML(h) and the conductive film BR(g,h) can be prevented.

The electrode CE(1) is electrically connected to the wiring CL(1), and the electrode ME(1) is electrically connected to the wiring ML(1) (FIGS. 23A and 23B).

In a similar manner, an electrode CE(g) is electrically connected to the wiring CL(g), and an electrode ME(h) is electrically connected to the wiring ML(h).

A sensing element 475(1,1) senses a touch by detecting a change in the value of the capacitance formed between the electrode CE(1) and the electrode ME(1) (see FIGS. 23A and 23B).

In a similar manner, the sensing element 475(g,h) senses a touch by detecting a change in the value of the capacitance formed between the electrode CE(g) and the electrode ME(h).

Conductive films which can be formed in the same process can be used as the wiring CL(1) and the electrode CE(1). Conductive films which can be formed in the same process can be used as the wiring ML(1) and the electrode ME(1) (see FIGS. 23A and 23B).

In a similar manner, conductive films which can be formed in the same process can be used as the wiring CL(g) and the electrode CE(g). Conductive films which can be formed in the same process can be used as the wiring ML(h) and the electrode ME(h).

For example, a light-transmitting conductive film can be used as each of the electrodes CE(g) and ME(h). Alternatively, a conductive film having an opening or a comb-like shape in a region overlapping with the pixel can be used as each of the wirings CL(g) and ML(h). Accordingly, an object that approaches the region overlapping with the display panel can be sensed without disturbing display on the display panel.

Note that this embodiment can be combined with any of the other embodiments in this specification as appropriate.

Embodiment 8

In this embodiment, structure examples of the touch panel described in Embodiment 7 will be described. Note that in this embodiment, a projected capacitive (mutual capacitive) touch panel will be described.

FIGS. 24A to 24D, FIGS. 25A and 25B, FIGS. 26A and 26B, and FIGS. 27A and 27B are each a schematic cross-sectional view of a touch sensor including the touch panel 400 and a display panel. Note that the schematic cross-sectional views in FIGS. 24A to 24D, FIGS. 25A and 25B, FIGS. 26A and 26B, and FIGS. 27A and 27B illustrate only components that are necessary for the description of the operation of the touch sensor. For example, an element such as a transistor or a light-transmitting element may be provided over a substrate 411 but is omitted in these drawings.

Figure 24A:
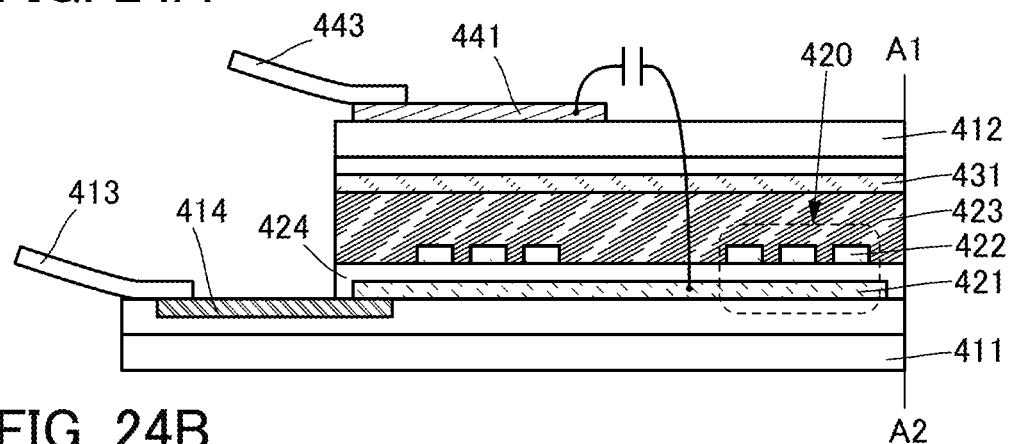
FIGS. 24A to 24D are schematic cross-sectional views illustrating configuration examples of a touch sensor.

The touch sensor illustrated in FIG. 24A includes the substrate 411, a substrate 412, an FPC 413, a conductive film 414, a liquid crystal element 420, a coloring film 431, a conductive film 441, and the like.

The liquid crystal element 420 includes a conductive film 421, a conductive film 422, and a liquid crystal 423. The conductive film 422 is provided over the conductive film 421 with an insulating film 424 positioned therebetween.

The conductive film 421 functions as a common electrode of the liquid crystal element 420, and the conductive film 422 functions as a pixel electrode.

The conductive film 421 and the conductive film 422 are arranged such that an electric field which intersects the thickness direction (the direction A1-A2 in the drawing) of the liquid crystal 423 is formed. As the liquid crystal 423, a liquid crystal material which operates in an in-plane-switching (IPS) mode, a fringe field switching (FFS) mode, or a vertical alignment in-plane-switching (VA-IPS) mode can be used.

The touch sensor can perform sensing by utilizing the capacitance formed between the conductive film 441 provided on the substrate 412 side and the conductive film 421 functioning as one of a pair of electrodes of the liquid crystal element 420.

The conductive film 441 is provided over a surface of the substrate 412 on the display surface side (the side opposite to the substrate 411). In addition, the conductive film 441 is electrically connected to an FPC 443 provided on the substrate 412 side. Through the conductive film 414, the conductive film 421 is electrically connected to the FPC 413 provided on the substrate 411 side.

Figure 24B:
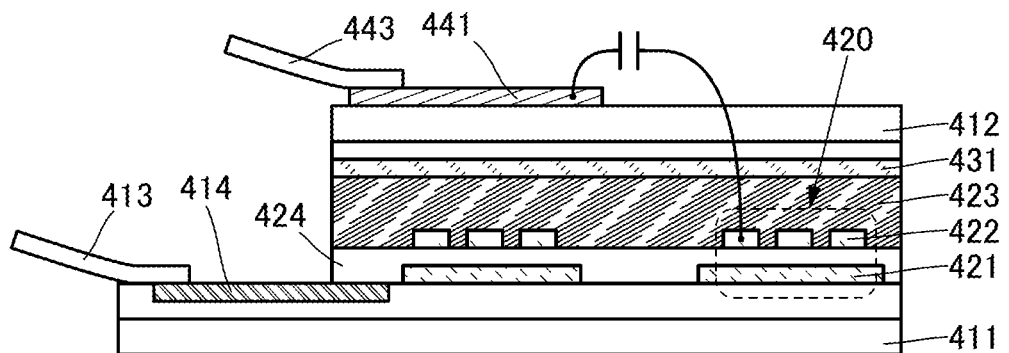

In the touch sensor illustrated in FIG. 24A, the conductive film 421 and the conductive film 422 may serve as a pixel electrode and a common electrode, respectively, and a touch may be sensed by utilizing the capacitance formed between the conductive film 441 and the conductive film 422. FIG. 24B is a schematic view illustrating the case.

Figure 24C:
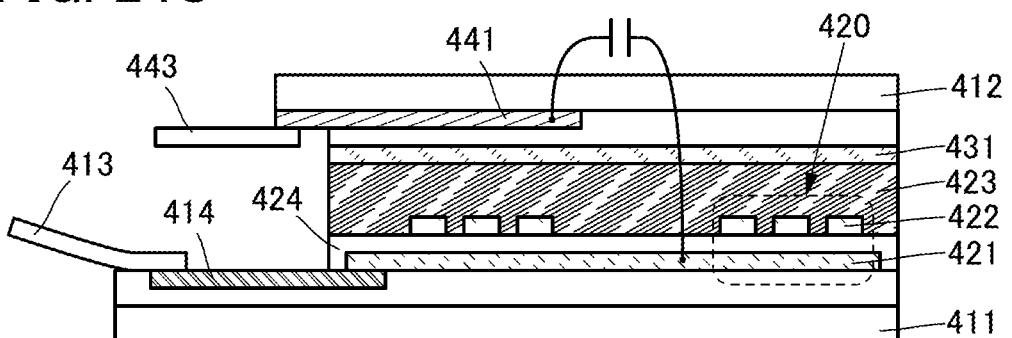

In the touch sensor illustrated in FIG. 24A, the conductive film 441 may be provided between the substrate 412 and the liquid crystal 423. FIG. 24C is a schematic view illustrating the case.

Figure 24D:
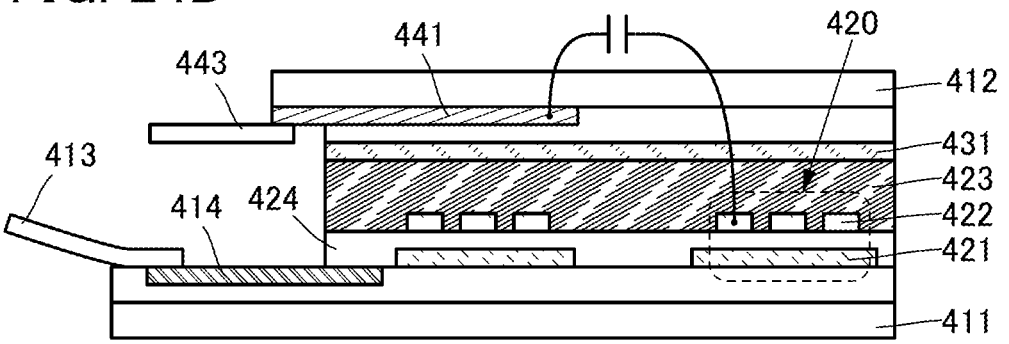

In the touch sensor illustrated in FIG. 24B, the conductive film 441 may be provided between the substrate 412 and the liquid crystal 423. FIG. 24D is a schematic view illustrating the case.

In the structures illustrated in FIGS. 24A to 24D, one electrode of the liquid crystal element 420 can also serve as one of a pair of electrodes of the touch sensor. Consequently, the process can be simplified and the manufacturing cost can be reduced.

Figure 25A:
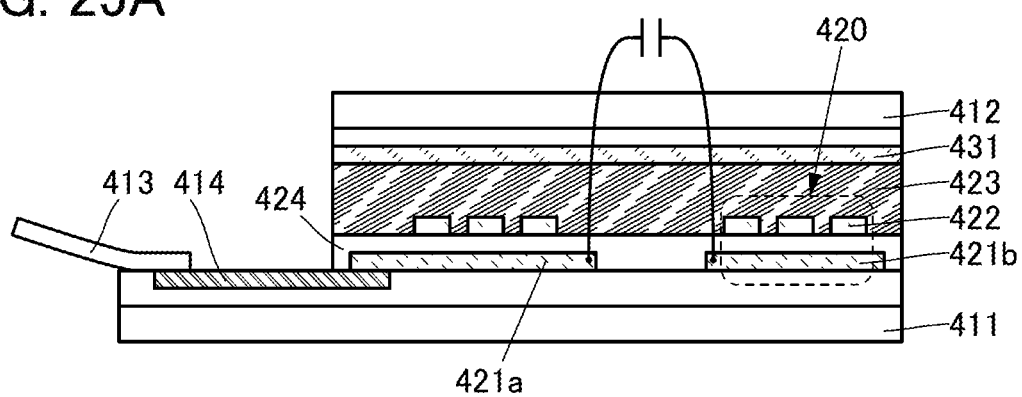
FIGS. 25A and 25B are schematic cross-sectional views illustrating configuration examples of a touch sensor.

In the touch sensor illustrated in FIG. 24A, the conductive film 441 and the FPC 443 are not necessarily provided. FIG. 25A is a schematic view illustrating the case.

In FIG. 25A, conductive films 421a and 421b each serving as a common electrode of the liquid crystal element 420 also serve as the pair of electrodes of the touch sensor.

Figure 25B:
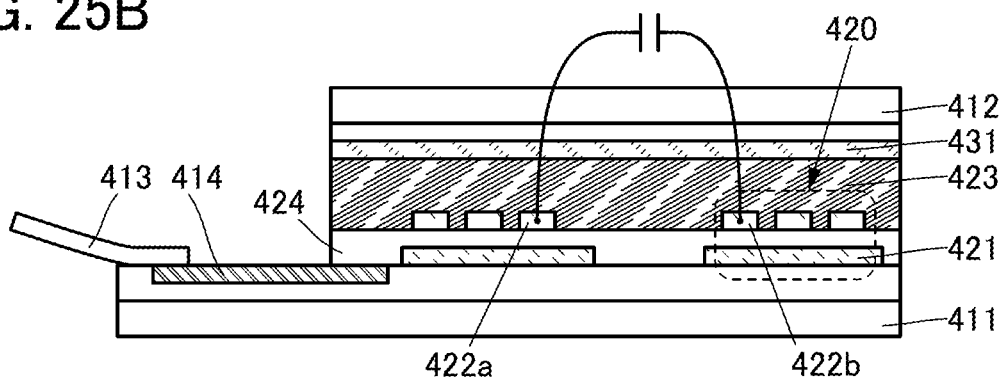

In the touch sensor illustrated in FIG. 25A, the conductive film 422 may be used as a common electrode. FIG. 25B is a schematic cross-sectional view illustrating the case. In FIG. 25B, a conductive film 422a and a conductive film 422b serve as the pair of electrodes of the touch sensor.

In the structure illustrated in FIG. 25A or 25B, one electrode of the liquid crystal element 420 can serve as both of the pair of electrodes of the touch sensor. Accordingly, the manufacturing process can be simplified as compared with the cases in FIGS. 24A and 24B.

Figure 26A:
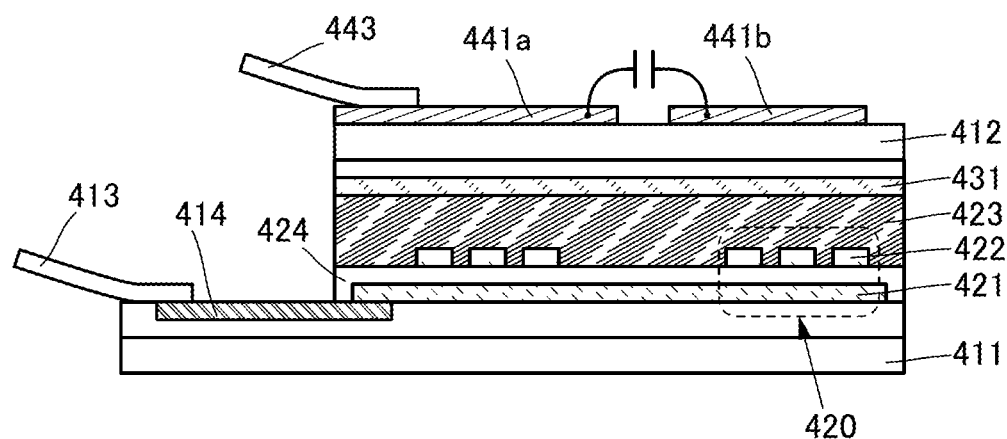
FIGS. 26A and 26B are schematic cross-sectional views illustrating configuration examples of a touch sensor.

In the touch sensor illustrated in FIG. 24A, the pair of electrodes of the touch sensor may be formed of only the conductive film 441. FIG. 26A is a schematic cross-sectional view illustrating the case.

In FIG. 26A, a conductive film 441a and a conductive film 441b which are provided over the substrate 412 serve as the pair of electrodes of the touch sensor.

Figure 26B:
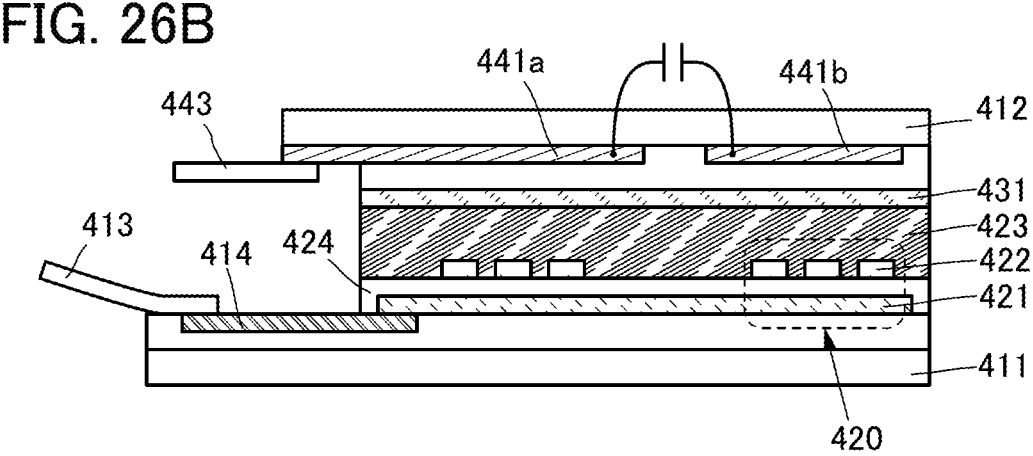

In the touch sensor illustrated in FIG. 26A, the conductive film 441a and the conductive film 441b may be provided between the substrate 412 and the liquid crystal 423. FIG. 26B is a schematic cross-sectional view illustrating the case.

In FIG. 26A or 26B, the conductive film 441a and the conductive film 441b are spaced apart from the electrodes of the liquid crystal element 420 (the conductive film 421 and the conductive film 422). Therefore, an electric field formed by the conductive film 441a and the conductive film 441b does not interfere with an electric field formed by the liquid crystal element 420. Furthermore, the conductive film 441a and the conductive film 441b are spaced apart from a wiring, a transistor, and the like which are formed over the substrate 411 and might serve as noise generation sources. Therefore, the touch sensor illustrated in FIG. 26A or 26B can have a high touch sensitivity.

Figure 27A:
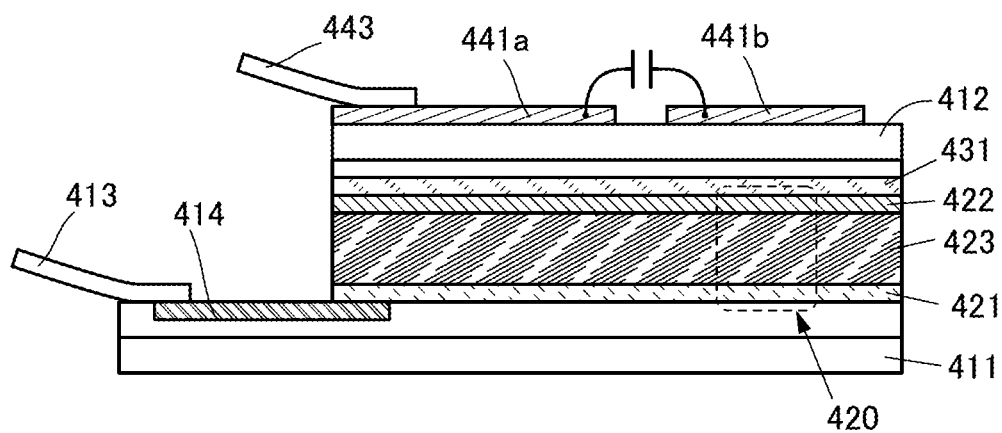
FIGS. 27A and 27B are schematic cross-sectional views illustrating configuration examples of a touch sensor.
Figure 27B:
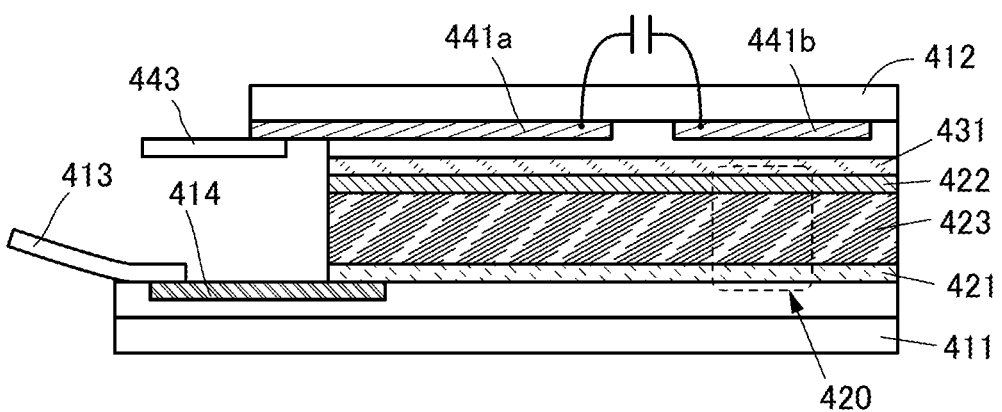

In the case where the electrodes of the touch sensor are arranged as in FIG. 26A or 26B, a liquid crystal that enables display by application of an electric field perpendicular to the substrate 411 can be used as the liquid crystal 423. FIGS. 27A and 27B are schematic cross-sectional views illustrating the case.

In FIGS. 27A and 27B, the conductive film 421 and the conductive film 422 are vertically stacked with the liquid crystal 423 positioned therebetween. Also in this case, an electric field formed by the conductive film 441a and the conductive film 441b does not interfere with an electric field formed by the liquid crystal element 420. The liquid crystal 423 can employ a twisted nematic (TN) mode, a vertical alignment (VA) mode, a multi-domain vertical alignment (MVA) mode, an optically compensated birefringence (OCB) mode, or the like.

Note that this embodiment can be combined with any of the other embodiments in this specification as appropriate.

Embodiment 9

In this embodiment, examples of an electronic device in which the display device described in the above embodiment can be used will be described.

<Laptop Personal Computer>

Figure 28A:
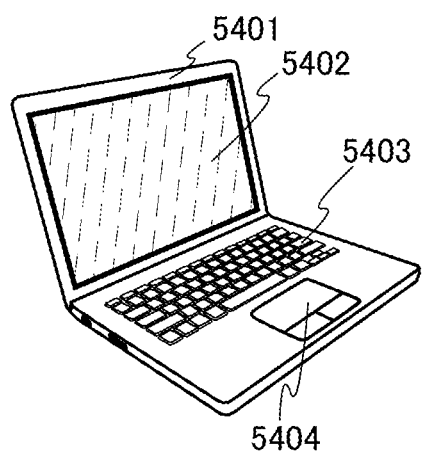
FIGS. 28A to 28F are perspective views illustrating examples of electronic devices.

FIG. 28A illustrates a laptop personal computer including a housing 5401, a display portion 5402, a keyboard 5403, a pointing device 5404, and the like. The display device of one embodiment of the present invention can be used for the display portion 5402.

<Smart Watch>

Figure 28B:
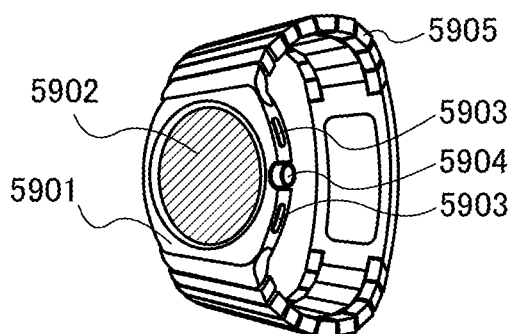

FIG. 28B illustrates a smart watch which is one of wearable terminals. The smart watch includes a housing 5901, a display portion 5902, operation buttons 5903, an operator 5904, a band 5905, and the like. The display device of one embodiment of the present invention can be used for the smart watch. A display device with a position input function may be used for the display portion 5902. The position input function can be added by providing a touch panel in the display device. Alternatively, the position input function can be added by providing a photoelectric conversion element called a photosensor in a pixel portion of the display device. As the operation buttons 5903, any of a power switch for starting the smart watch, a button for operating an application of the smart watch, a volume control button, a switch for turning on or off the display portion 5902, and the like can be provided. Although the smart watch illustrated in FIG. 28B includes two operation buttons 5903, the number of operation buttons included in the smart watch is not limited to two. The operator 5904 functions as a crown for time adjustment of the smart watch. The operator 5904 may be used as an input interface for operating an application of the smart watch as well as the crown for time adjustment. Although the smart watch illustrated in FIG. 28B includes the operator 5904, one embodiment of the present invention is not limited thereto and the operator 5904 is not necessarily provided.

<Video Camera>

Figure 28C:
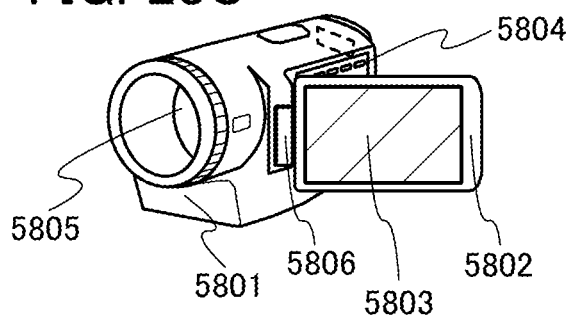

FIG. 28C illustrates a video camera including a first housing 5801, a second housing 5802, a display portion 5803, operation keys 5804, a lens 5805, a joint 5806, and the like. The display device of one embodiment of the present invention can be used for the video camera. The operation keys 5804 and the lens 5805 are provided in the first housing 5801, and the display portion 5803 is provided in the second housing 5802. The first housing 5801 and the second housing 5802 are connected to each other with the joint 5806, and the angle between the first housing 5801 and the second housing 5802 can be changed with the joint 5806. Images displayed on the display portion 5803 may be switched in accordance with the angle at the joint 5806 between the first housing 5801 and the second housing 5802.

<Mobile Phone>

Figure 28D:
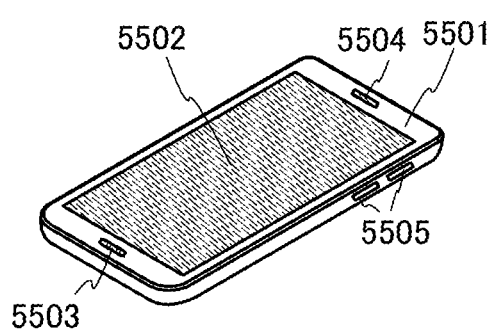

FIG. 28D illustrates a mobile phone serving as an information terminal. The mobile phone includes a housing 5501, a display portion 5502, a microphone 5503, a speaker 5504, and operation buttons 5505. The display device of one embodiment of the present invention can be used for the mobile phone. A display device with a position input function may be used for the display portion 5502. The position input function can be added by providing a touch panel in the display device. Alternatively, the position input function can be added by providing a photoelectric conversion element called a photosensor in a pixel area of the display device. As operation buttons 5505, any of a power switch for starting the mobile phone, a button for operating an application of the mobile phone, a volume control button, a switch for turning on or off the display portion 5502, and the like can be provided.

Although the mobile phone illustrated in FIG. 28D includes two operation buttons 5505, the number of operation buttons included in the mobile phone is not limited to two. Although not illustrated, a light-emitting device may be included in the mobile phone illustrated in FIG. 28D to be used as a flashlight or a lighting device.

<Television Device>

Figure 28E:
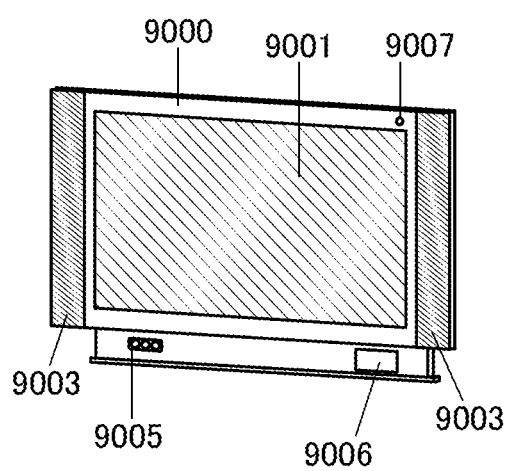

FIG. 28E is a perspective view illustrating a television device. The television device includes a housing 9000, a display portion 9001, a speaker 9003, an operation key 9005 (including a power switch or an operation switch), a connection terminal 9006, a sensor 9007 (a sensor having a function of measuring force, displacement, position, speed, acceleration, angular velocity, rotational frequency, distance, light, liquid, magnetism, temperature, chemical substance, sound, time, hardness, electric field, current, voltage, electric power, radiation, flow rate, humidity, gradient, oscillation, odor, or infrared rays), and the like. The television device can include the display portion 9001 having a large screen size of, for example, 50 inches or more or 100 inches or more.

<Moving Vehicle>

Figure 28F:
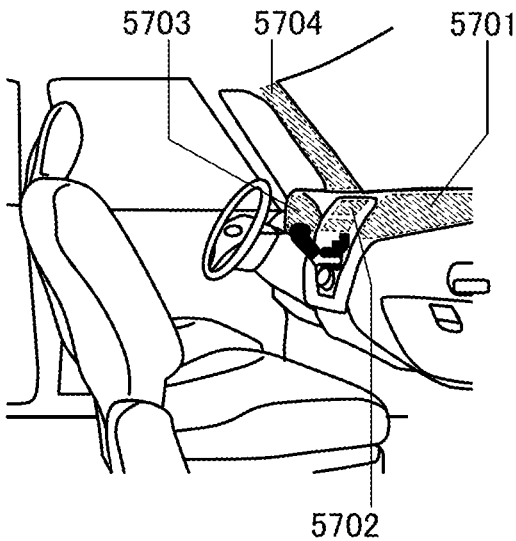

The above-described display device can also be used around a driver's seat in an automobile, which is a moving vehicle. FIG. 28F illustrates a front glass and its vicinity inside an automobile, for example. FIG. 28F illustrates a display panel 5701, a display panel 5702, and a display panel 5703 which are attached to a dashboard, and a display panel 5704 attached to a pillar.

The display panels 5701 to 5703 can display a variety of kinds of information such as navigation information, a speedometer, a tachometer, a mileage, a fuel meter, a gear-shift indicator, and air-condition setting. The content, layout, and the like of the display on the display panels can be changed freely to suit the user's preferences, so that the design can be improved. The display panels 5701 to 5703 can also be used as lighting devices.

The display panel 5704 can compensate for the view obstructed by the pillar (blind areas) by showing an image taken by an imaging unit provided in the car body. That is, by displaying an image taken by the imaging unit provided on the outside of the automobile, blind areas can be eliminated and safety can be increased. In addition, showing an image so as to compensate for the area which the driver cannot see makes it possible for the driver to confirm safety easily and comfortably. The display panel 5704 can also be used as a lighting device.

Although not illustrated, a microphone and a speaker may be included in each of the electronic devices illustrated in FIGS. 28A, 28B, 28E, and 28F. The electronic devices with this structure can have an audio input function, for example.

Although not illustrated, a camera may be included in each of the electronic devices illustrated in FIGS. 28A, 28B, 28D to 28F.

Although not illustrated, a sensor (a sensor having a function of measuring force, displacement, position, speed, acceleration, angular velocity, rotational frequency, distance, light, liquid, magnetism, temperature, chemical substance, sound, time, hardness, electric field, current, voltage, electric power, radiation, flow rate, humidity, gradient, oscillation, odor, infrared rays, or the like) may be included inside the housing of each of the electronic devices illustrated in FIGS. 28A to 28F. In particular, when the mobile phone illustrated in FIG. 28D is provided with a sensing device which includes a sensor for sensing inclination, such as a gyroscope sensor or an acceleration sensor, the orientation of the mobile phone (the orientation of the mobile phone with respect to the vertical direction) can be determined to automatically change the display on the screen of the display portion 5502 in accordance with the orientation of the mobile phone.

Although not illustrated, a device for obtaining biological information such as information on fingerprints, veins, iris, voice prints, or the like may be included in each of the electronic devices illustrated in FIGS. 28A to 28F. The electronic devices with this structure can each have a biometric identification function.

A flexible base may be used for the display portion of each of the electronic devices illustrated in FIGS. 28A to 28F. Specifically, the display portion may have a structure in which a transistor, a capacitor, a display element, and the like are provided over a flexible base. With this structure, an electronic device with a housing having a curved surface can be obtained as well as an electronic device with a housing having a flat surface, such as the electronic devices illustrated in FIGS. 28A to 28F.

This embodiment can be combined with any of the other embodiments in this specification as appropriate.

(Notes on Description of this Specification and the Like)

The following are notes on the description of the structures in the above embodiments.

<Notes on One Embodiment of the Present Invention Described in Embodiments>

One embodiment of the present invention can be constituted by appropriately combining the structure described in an embodiment with any of the structures described in the other embodiments. In addition, in the case where a plurality of structure examples is described in one embodiment, some of the structure examples can be combined as appropriate.

Note that a content (or part thereof) described in one embodiment can be applied to, combined with, or replaced with another content (or part thereof) described in the embodiment and/or a content (or part thereof) described in another embodiment or other embodiments.

Note that in each embodiment, a content described in the embodiment is a content described with reference to a variety of diagrams or a content described with text disclosed in this specification.

Note that by combining a diagram (or part thereof) described in one embodiment with another part of the diagram, another diagram (or part thereof) described in the embodiment, and/or a diagram (or part thereof) described in another embodiment or other embodiments, much more diagrams can be formed.

<Notes on Ordinal Numbers>

In this specification and the like, ordinal numbers such as "first", "second", and "third" are used to avoid confusion among components. Thus, the terms do not limit the number or order of components. In this specification and the like, for example, a "first" component in one embodiment can be referred to as a "second" component in another embodiment or a claim. Furthermore, in this specification and the like, for example, a "first" component in one embodiment can be omitted in another embodiment or a claim.

<Notes on the Description of Drawings>

Embodiments are described with reference to drawings. However, the embodiments can be implemented in various modes. It is readily appreciated by those skilled in the art that modes and details can be changed in various ways without departing from the spirit and scope of the present invention. Thus, the present invention should not be interpreted as being limited to the description of the embodiments. Note that in the structures of the embodiments of the invention, the same portions or portions having similar functions are denoted by the same reference numerals in different drawings, and the description of such portions is not repeated.

In this specification and the like, terms for describing arrangement, such as "over" and "under", are used for convenience to describe the positional relation between components with reference to drawings. The positional relation between components is changed as appropriate depending on the direction in which each component is described. Therefore, terms for describing arrangement are not limited to those used in this specification and can be changed to other terms as appropriate depending on the situation.

The term "over" or "under" does not necessarily mean that a component is placed directly over or directly under and in direct contact with another component. For example, the expression "an electrode B over an insulating layer A" does not necessarily mean that the electrode B is formed over and in direct contact with the insulating layer A and can include the case where another component is provided between the insulating layer A and the electrode B.

In the drawings, the size, the layer thickness, or the region is determined arbitrarily for description convenience. Therefore, the scale is not necessarily limited to that illustrated in the drawings. Note that the drawings are schematically illustrated for clarity, and shapes or values are not limited to those illustrated in the drawings. For example, variation in signal, voltage, or current due to noise or difference in timing can be included.

In a drawing such as a perspective view, some components might not be illustrated for clarity of the drawing.

In the drawings, the same components, components having similar functions, components formed of the same material, or components formed at the same time, or the like are denoted by the same reference numerals in some cases, and the description thereof is not repeated in some cases.

<Notes on Expressions that can be Rephrased or Reworded>

In this specification and the like, in description of the connection relation of a transistor, the terms "one of a source and a drain" (or a first electrode or a first terminal) and "the other of the source and the drain" (or a second electrode or a second terminal) are used. This is because a source and a drain of a transistor are interchangeable depending on the structure, operation conditions, or the like of the transistor. Note that the source or the drain of the transistor can also be referred to as a source (or drain) terminal, a source (or drain) electrode, or the like as appropriate depending on the situation. In this specification and the like, two terminals except a gate may be referred to as a first terminal and a second terminal or as a third terminal and a fourth terminal. In this specification and the like, in the case where a transistor has two or more gates (such a structure is referred to as a dual-gate structure in some cases), these gates may be referred to as a first gate and a second gate or a front gate and a back gate. In particular, the term "front gate" can be replaced with a simple term "gate". The term "back gate" can be replaced with a simple term "gate". Note that a "bottom gate" refers to a terminal which is formed before a channel formation region in manufacture of a transistor, and a "top gate" refers to a terminal which is formed after a channel formation region in manufacture of a transistor.

A transistor includes three terminals called a gate, a source, and a drain. A gate is a terminal that controls the conduction state of a transistor. Depending on the channel type of the transistor or the levels of potentials supplied to the terminals, one of terminals (an input terminal or an output terminal) functions as a source and the other functions as a drain. Therefore, the terms "source" and "drain" are interchangeable in this specification and the like. In this specification and the like, the two terminals except the gate may be referred to as a first terminal and a second terminal or as a third terminal and a fourth terminal.

In this specification and the like, the term "electrode" or "wiring" does not limit the function of a component. For example, an "electrode" is used as part of a "wiring" in some cases, and vice versa. Furthermore, the term "electrode" or "wiring" can also mean a combination of a plurality of "electrodes" or "wirings" formed in an integrated manner.

In this specification and the like, "voltage" and "potential" can be replaced with each other. The term "voltage" refers to a potential difference from a reference potential. When the reference potential is a ground potential, for example, "voltage" can be replaced with "potential". The ground potential does not necessarily mean 0 V. Note that a potential is a relative value, and a potential supplied to wirings or the like may be changed depending on the reference potential.

In this specification and the like, the terms "film", "layer", and the like can be replaced with each other depending on the circumstances or situation. For example, the term "conductive layer" can be changed into the term "conductive film" in some cases. Moreover, the term "insulating film" can be changed into the term "insulating layer" in some cases. Alternatively, another term can be used instead of a term including "film" or "layer" depending on the circumstances or situation. For example, the term "conductive layer" or "conductive film" can be changed into the term "conductor" in some cases. For example, the term "insulating layer" or "insulating film" can be changed into the term "insulator" in some cases.

In this specification and the like, the terms "wiring", "signal line", "power supply line", and the like can be replaced with each other depending on the circumstances or situation. For example, the term "wiring" can be changed into the term "signal line" or "power supply line" in some cases. The term "signal line", "power supply line", or the like can be changed into the term "wiring" in some cases. The term "power supply line" or the like can be changed into the term "signal line" or the like in some cases, and vice versa. The term "potential" that is supplied to a wiring can be changed into the term "signal" or the like depending on the circumstances or situation, and vice versa.

<Notes on Definitions of Terms>

The following are definitions of the terms mentioned in the above embodiments.

<<Impurity in Semiconductor>>

Impurities in a semiconductor refer to, for example, elements other than the main components of a semiconductor layer. For example, an element with a concentration of lower than 0.1 atomic % is an impurity. When an impurity is contained, the density of states (DOS) may be formed in a semiconductor, the carrier mobility may be decreased, or the crystallinity may be decreased, for example. In the case where the semiconductor is an oxide semiconductor, examples of an impurity which changes the characteristics of the semiconductor include the Group 1 elements, the Group 2 elements, the Group 13 elements, the Group 14 elements, the Group 15 elements, and transition metals other than the main components of the semiconductor, specifically, hydrogen (including that contained in water), lithium, sodium, silicon, boron, phosphorus, carbon, nitrogen, and the like. In the case of an oxide semiconductor, an oxygen vacancy may be formed by entry of an impurity such as hydrogen. In the case where the semiconductor is a silicon layer, examples of an impurity which changes the characteristics of the semiconductor include oxygen, the Group 1 elements except hydrogen, the Group 2 elements, the Group 13 elements, and the Group 15 elements.

<<Transistor>>

In this specification, a transistor is an element having at least three terminals: a gate, a drain, and a source. The transistor has a channel formation region between the drain (a drain terminal, a drain region, or a drain electrode) and the source (a source terminal, a source region, or a source electrode). When a potential difference is applied between the gate and the source, a current can flow through the channel formation region.

Furthermore, functions of a source and a drain may be switched when transistors having different polarities are employed or the direction of current flow is changed in circuit operation, for example. Therefore, the terms "source" and "drain" can be replaced with each other in this specification and the like.

<<Switch>>

In this specification and the like, a switch is conducting or not conducting (is turned on or off) to determine whether current flows therethrough or not. Alternatively, a switch is an element having a function of selecting and changing a current path.

For example, an electrical switch or a mechanical switch can be used. That is, the switch is not limited to a certain element as long as it can control a current.

A transistor (e.g., a bipolar transistor or a MOS transistor), a diode (e.g., a PN diode, a PIN diode, a Schottky diode, a metal-insulator-metal (MIM) diode, a metal-insulator-semiconductor (MIS) diode, or a diode-connected transistor), a logic circuit in which such elements are combined, or the like can be used as an electrical switch.

When a transistor is used as a switch, an "on state" of the transistor refers to a state in which a source electrode and a drain electrode of the transistor are electrically short-circuited. Furthermore, an "off state" of the transistor refers to a state in which the source electrode and the drain electrode of the transistor are electrically disconnected. If the transistor operates just as a switch, there is no particular limitation on the polarity (conductivity type) of the transistor.

An example of a mechanical switch is a switch formed using a microelectromechanical systems (MEMS) technology, such as a digital micromirror device (DMD). Such a switch includes an electrode which can be moved mechanically, and its conduction and non-conduction is controlled by the movement of the electrode.

<<Connection>>

In this specification and the like, the expression "X and Y are connected" can mean that X and Y are electrically connected, that X and Y are functionally connected, and that X and Y are directly connected. Accordingly, without being limited to a predetermined connection relation, for example, a connection relation other than that shown in a drawing or text is also possible.

Here, X, Y, and the like each denote an object (e.g., a device, an element, a circuit, a wiring, an electrode, a terminal, a conductive film, or a layer).

For example, in the case where X and Y are electrically connected, one or more elements that enable electrical connection between X and Y (e.g., a switch, a transistor, a capacitor, an inductor, a resistor, a diode, a display element, a light-emitting element, and/or a load) can be connected between X and Y. A switch is controlled to be on or off. That is, a switch is conducting or not conducting (is turned on or off) to determine whether a current flows therethrough or not.

For example, in the case where X and Y are functionally connected, one or more circuits that enable functional connection between X and Y (e.g., a logic circuit such as an inverter, a NAND circuit, or a NOR circuit; a signal converter circuit such as a DA converter circuit, an AD converter circuit, or a gamma correction circuit; a potential level converter circuit such as a power supply circuit (e.g., a step-up circuit and a step-down circuit) or a level shifter circuit for changing the potential level of a signal; a voltage source; a current source; a switching circuit; an amplifier circuit such as a circuit that can increase the signal amplitude, the amount of current, or the like, an operational amplifier, a differential amplifier circuit, a source follower circuit, or a buffer circuit; a signal generation circuit; a memory circuit; and/or a control circuit) can be connected between X and Y. For example, even when another circuit is interposed between X and Y, X and Y are functionally connected if a signal output from X is transmitted to Y.

Note that the explicit expression "X and Y are electrically connected" can mean that X and Y are electrically connected (i.e., X and Y are connected with another element or another circuit positioned therebetween), that X and Y are functionally connected (i.e., X and Y are functionally connected with another circuit positioned therebetween), and that X and Y are directly connected (i.e., X and Y are connected without another element or another circuit positioned therebetween). That is, the explicit expression "X and Y are electrically connected" is the same as the explicit simple expression "X and Y are connected".

For example, any of the following expressions can be used for the case where a source (or a first terminal or the like) of a transistor is electrically connected to X through (or not through) Z1 and a drain (or a second terminal or the like) of the transistor is electrically connected to Y through (or not through) Z2, or the case where a source (or a first terminal or the like) of a transistor is directly connected to one part of Z1 and another part of Z1 is directly connected to X while a drain (or a second terminal or the like) of the transistor is directly connected to one part of Z2 and another part of Z2 is directly connected to Y.

Examples of the expressions include, "X, Y, a source (or a first terminal or the like) of a transistor, and a drain (or a second terminal or the like) of the transistor are electrically connected to each other, and X, the source (or the first terminal or the like) of the transistor, the drain (or the second terminal or the like) of the transistor, and Y are electrically connected to each other in this order", "a source (or a first terminal or the like) of a transistor is electrically connected to X, a drain (or a second terminal or the like) of the transistor is electrically connected to Y, and X, the source (or the first terminal or the like) of the transistor, the drain (or the second terminal or the like) of the transistor, and Y are electrically connected to each other in this order", and "X is electrically connected to Y through a source (or a first terminal or the like) and a drain (or a second terminal or the like) of a transistor, and X, the source (or the first terminal or the like) of the transistor, the drain (or the second terminal or the like) of the transistor, and Y are provided to be connected in this order". When the connection order in a circuit configuration is defined by an expression similar to the above examples, a source (or a first terminal or the like) and a drain (or a second terminal or the like) of a transistor can be distinguished from each other to specify the technical scope. Note that one embodiment of the present invention is not limited to these expressions that are just examples. Here, X, Y, Z1, and Z2 each denote an object (e.g., a device, an element, a circuit, a wiring, an electrode, a terminal, a conductive film, and a layer).

Even when independent components are electrically connected to each other in a circuit diagram, one component has functions of a plurality of components in some cases. For example, when part of a wiring also functions as an electrode, one conductive film functions as the wiring and the electrode. Thus, "electrical connection" in this specification includes in its category such a case where one conductive film has functions of a plurality of components.

<<Parallel and Perpendicular>>

In this specification, the term "parallel" indicates that the angle formed between two straight lines is greater than or equal to −10° and less than or equal to 10°, and accordingly also includes the case where the angle is greater than or equal to −5° and less than or equal to 5°. In addition, the term "substantially parallel" indicates that the angle formed between two straight lines is greater than or equal to −30° and less than or equal to 30°. In addition, the term "perpendicular" indicates that the angle formed between two straight lines is greater than or equal to 80° and less than or equal to 100°, and accordingly also includes the case where the angle is greater than or equal to 85° and less than or equal to 95°. In addition, the term "substantially perpendicular" indicates that the angle formed between two straight lines is greater than or equal to 60° and less than or equal to 120°.

This application is based on Japanese Patent Application Serial No. 2016-206479 filed with Japan Patent Office on Oct. 21, 2016, the entire contents of which are hereby incorporated by reference.

What is claimed is:

1. A method for operating an electronic device comprising a display device and a touch sensor, the method comprising a first step and a second step,
   wherein the first step comprises:
      a first judgment step of judging whether the touch sensor has sensed a touch in a first period in a normal driving state of the display device;
      a second judgment step of judging whether touches are constantly sensed; and
      proceeding to the second step in the case where the first judgment step confirms that no touch has been sensed or the second judgment step confirms touches are constantly sensed, and
   wherein the second step comprises:
      bringing the touch sensor into a resting state or reducing a drive frequency of the touch sensor.

2. The method for operating an electronic device according to claim 1, wherein the display device comprises a reflective liquid crystal element and at least one of a light-emitting element or a transmissive liquid crystal element.

3. The method for operating an electronic device according to claim 1,
   wherein the display device comprises a reflective liquid crystal element, and
   wherein the reflective liquid crystal element and the touch sensor share one electrode.

4. The method for operating an electronic device according to claim 1, wherein the display device comprises a transistor comprising an oxide semiconductor in a channel formation region.

5. The method for operating an electronic device according to claim 1, wherein the second judgment step is performed in a state where the display device is brought into a resting state or a drive frequency of the display device is reduced.

6. A method for operating an electronic device comprising a display device and a touch sensor, the method comprising a first step, a second step, and a third step,
   wherein the first step comprises:
      a first judgment step of judging whether the display device has been brought into a resting state or a drive frequency of the display device has been reduced; and
      proceeding to the second step in the case where the first judgment step confirms that the display device has been brought into the resting state or the drive frequency of the display device has been reduced,
   wherein the second step comprises:
      a second judgment step of judging whether touches have been constantly sensed; and
      proceeding to the third step in the case where the second judgment step confirms that touches have been constantly sensed, and
   wherein the third step comprises:
      bringing the touch sensor into a resting state or reducing a driving frequency of the touch sensor.

7. The method for operating an electronic device according to claim 6, wherein the display device comprises a reflective liquid crystal element and one of a light-emitting element and a transmissive liquid crystal element.

8. The method for operating an electronic device according to claim 6,
   wherein the display device comprises a reflective liquid crystal element, and
   wherein the reflective liquid crystal element and the touch sensor share one electrode.

9. The method for operating an electronic device according to claim 6, wherein the display device comprises a transistor comprising an oxide semiconductor in a channel formation region.

* * * * *